US011821452B2

(12) United States Patent
McCarthy et al.

(10) Patent No.: US 11,821,452 B2
(45) Date of Patent: Nov. 21, 2023

(54) INTEGRATED BELT AND SENSOR FOR ALARM FOR PATIENT FURNITURE

(71) Applicant: TIDI Products, LLC, Neenah, WI (US)

(72) Inventors: Samantha McCarthy, Libertyville, IL (US); Roy Seizo Carr, Fontana, CA (US); Brian Young, Lombard, IL (US); Brittany Johnson, Salem, WI (US)

(73) Assignee: TIDI Products, LLC, Neenah, WI (US)

( * ) Notice: Subject to any disclaimer, the term of this patent is extended or adjusted under 35 U.S.C. 154(b) by 0 days.

(21) Appl. No.: 17/552,257

(22) Filed: Dec. 15, 2021

(65) Prior Publication Data

US 2022/0170491 A1   Jun. 2, 2022

Related U.S. Application Data

(63) Continuation of application No. 17/190,167, filed on Mar. 2, 2021, now abandoned, and a
(Continued)

(51) Int. Cl.
*F16B 2/08* (2006.01)
*F16B 2/00* (2006.01)
*A41F 9/00* (2006.01)

(52) U.S. Cl.
CPC ............... *F16B 2/08* (2013.01); *A41F 9/002* (2013.01); *F16B 2/00* (2013.01)

(58) Field of Classification Search
CPC ...... F16B 13/00; F16B 13/002; F16B 13/009; F16B 13/02; F16B 13/025; F16B 2/02;
(Continued)

(56) References Cited

U.S. PATENT DOCUMENTS 558,641 A    4/1896  Ensign
3,182,338 A  5/1965  Shirrod
(Continued)

FOREIGN PATENT DOCUMENTS

CN    105361347 A    3/2016
CN    205729594 U   11/2016
(Continued)

OTHER PUBLICATIONS

NPL Search (Feb. 7, 2023).*
(Continued)

*Primary Examiner* — Van T Trieu
(74) *Attorney, Agent, or Firm* — Amundsen Davis, LLC

(57) ABSTRACT

Systems and methods for monitoring the location of a patient using an integrated belt and sensor for alarm for patient furniture. The belt may include at least one strap and a slider configured to be releasably attached to one another and an alarm system that is triggered when the slider is disengaged from the other strap or straps. By doing so, the amount of time it takes to remove the belt can be increased, which provides medical personnel additional time to reach a patient. Additionally, the system may include additional components to allow a patient to move side-to-side relative to the furniture or device. For instance, where the furniture is a bed, side-to-side movement is desired for added comfort. The system may include a slider enabling the belt to be adjustable for patients of any number of different sizes.

25 Claims, 28 Drawing Sheets

Related U.S. Application Data continuation-in-part of application No. 17/088,277, filed on Nov. 3, 2020, now Pat. No. 11,319,976, which is a continuation of application No. 16/443,389, filed on Jun. 17, 2019, now abandoned, which is a continuation-in-part of application No. 16/054,183, filed on Aug. 3, 2018, now Pat. No. 10,321,854, application No. 17/552,257, filed on Dec. 15, 2021 is a continuation-in-part of application No. PCT/US2020/038080, filed on Jun. 17, 2020.

(60) Provisional application No. 62/984,604, filed on Mar. 3, 2020, provisional application No. 62/540,879, filed on Aug. 3, 2017.

(58) Field of Classification Search
CPC .......... F16B 2/08; F16B 17/00; F16B 17/004; F16B 17/006; F16B 17/008; Y01T 24/14; Y01T 24/141; Y01T 24/1418; Y01T 24/1469; Y01T 24/148; Y01T 24/21; B65B 1/00; B65B 1/002; B65B 1/006; B65B 1/008; A61B 5/1115; A61B 5/1117; A61B 5/1126; A61F 5/37; A61F 5/3723; A41F 9/002; A47D 13/02; A47D 13/025
See application file for complete search history.

(56) References Cited

U.S. PATENT DOCUMENTS

| | | |
|---|---|---|
| 4,132,229 A | 1/1979 | Morrison |
| 4,226,007 A | 10/1980 | Duenser |
| 4,417,572 A | 11/1983 | Green |
| 4,608,973 A | 9/1986 | Green et al. |
| 4,777,944 A | 10/1988 | Green et al. |
| 5,076,288 A | 12/1991 | Millard et al. |
| 5,161,545 A | 11/1992 | McCarthy |
| 5,492,285 A | 2/1996 | Hamrick |
| 5,494,046 A | 2/1996 | Cross |
| 5,585,789 A | 12/1996 | Haneda |
| 5,627,520 A | 5/1997 | Grubbs et al. |
| 5,651,376 A | 7/1997 | Thompson |
| 5,654,694 A | 8/1997 | Newham |
| 5,785,011 A | 7/1998 | Gitterman, III |
| 5,844,488 A | 12/1998 | Musick |
| D404,845 S | 1/1999 | McIntyre et al. |
| 6,078,261 A | 6/2000 | Davsko |
| 6,119,314 A | 9/2000 | Freed |
| 6,239,704 B1 | 5/2001 | Olson |
| 6,311,374 B1 | 11/2001 | Anscher |
| 6,557,557 B2 | 5/2003 | Hamama |
| 6,561,987 B2 | 5/2003 | Pail |
| 6,778,090 B2 | 8/2004 | Newham |
| 6,796,007 B1 | 9/2004 | Anscher |
| 6,917,293 B2 | 7/2005 | Beggs |
| 7,282,031 B2 | 10/2007 | Hendrich |
| 7,319,400 B2 | 1/2008 | Smith et al. |
| 7,412,899 B2 | 8/2008 | Mian et al. |
| 7,420,472 B2 | 9/2008 | Tran |
| 7,557,719 B1 | 7/2009 | Long |
| 7,682,308 B2 | 3/2010 | Hendrich |
| 7,768,949 B2 | 8/2010 | Perkins et al. |
| 7,836,529 B2 | 11/2010 | Cherubini et al. |
| 7,916,036 B1 | 3/2011 | Pope et al. |
| 7,924,163 B1 | 4/2011 | Long et al. |
| 7,938,121 B2 | 5/2011 | McKnight et al. |
| 8,085,154 B2 | 12/2011 | Williams et al. |
| 8,203,454 B2 | 6/2012 | Knight et al. |
| 8,211,014 B2 | 7/2012 | David et al. |
| D680,900 S | 4/2013 | Grimm |
| 8,449,471 B2 | 5/2013 | Tran |
| 8,451,129 B2 | 5/2013 | Hamdan |
| 8,477,039 B2 | 7/2013 | Gleckler et al. |
| 8,500,636 B2 | 8/2013 | Tran |
| 8,521,490 B2 | 8/2013 | Hardigan |
| 8,529,448 B2 | 9/2013 | McNair |
| D701,139 S | 3/2014 | Kadoishi |
| 8,708,903 B2 | 4/2014 | Tran |
| 8,866,620 B2 | 10/2014 | Amir |
| D717,206 S | 11/2014 | Iannello et al. |
| 8,886,334 B2 | 11/2014 | Ghaffari et al. |
| 8,968,195 B2 | 3/2015 | Tran |
| 9,064,482 B2 | 6/2015 | Henriques |
| 9,165,449 B2 | 10/2015 | Ribble et al. |
| D749,462 S | 2/2016 | Paik et al. |
| 9,311,540 B2 | 4/2016 | Ecker et al. |
| 9,314,159 B2 | 4/2016 | Lyon et al. |
| 9,386,863 B1 * | 7/2016 | Antunovic .......... A47D 13/025 |
| 9,466,204 B2 | 10/2016 | Olson |
| 9,468,399 B2 | 10/2016 | Shinozuka et al. |
| 9,480,307 B2 | 11/2016 | Makley |
| 9,558,641 B2 | 1/2017 | Brasch et al. |
| D778,779 S | 2/2017 | Fujii |
| 9,770,144 B2 | 9/2017 | Rife et al. |
| 9,795,321 B2 | 10/2017 | Shimizu |
| 9,808,194 B2 | 11/2017 | Bhat et al. |
| 9,814,637 B2 | 11/2017 | Sazonov |
| 9,940,807 B1 | 4/2018 | Brasch et al. |
| 9,940,810 B2 | 4/2018 | Derenne et al. |
| 10,020,075 B2 | 7/2018 | Perlman et al. |
| 10,188,296 B2 | 1/2019 | Al-Ali et al. |
| 10,357,197 B2 | 7/2019 | Smith et al. |
| 10,438,475 B2 | 10/2019 | Williams |
| 10,438,496 B2 | 10/2019 | Panzer |
| 10,470,685 B2 | 11/2019 | Son et al. |
| 10,470,689 B2 | 11/2019 | Kilcran et al. |
| 10,517,511 B2 | 12/2019 | Charna |
| 10,593,185 B2 | 3/2020 | Brasch et al. |
| 10,646,171 B2 | 5/2020 | Brasch et al. |
| 10,674,940 B2 | 6/2020 | Kilcran et al. |
| 10,722,146 B2 | 7/2020 | Kilcran et al. |
| 10,799,153 B2 | 10/2020 | Kilcran et al. |
| 10,806,377 B2 | 10/2020 | Kilcran et al. |
| 11,020,046 B2 | 6/2021 | Lee et al. |
| 11,083,418 B2 | 8/2021 | Ferber |
| 11,141,030 B2 | 10/2021 | Newham |
| 2002/0068883 A1 | 6/2002 | Hamama |
| 2005/0076920 A1 | 4/2005 | Dubats |
| 2005/0080360 A1 | 4/2005 | Katz et al. |
| 2005/0150503 A1 | 7/2005 | Votel |
| 2008/0205311 A1 | 8/2008 | Perkins et al. |
| 2011/0034845 A1 | 2/2011 | Polliack et al. |
| 2011/0133935 A1 | 6/2011 | Beltmann et al. |
| 2012/0032808 A1 | 2/2012 | Cherubini |
| 2013/0019882 A1 | 1/2013 | Durham et al. |
| 2013/0178893 A1 | 7/2013 | Hathorn |
| 2014/0221876 A1 | 8/2014 | Eddy |
| 2014/0224262 A1 | 8/2014 | Parent et al. |
| 2014/0232556 A1 | 8/2014 | Williams |
| 2015/0039794 A1 | 2/2015 | Williams |
| 2015/0125837 A1 * | 5/2015 | Zhang .................. A61B 5/1127 434/258 |
| 2015/0157488 A1 | 6/2015 | Grunden et al. |
| 2016/0082217 A1 | 3/2016 | McLaren et al. |
| 2016/0196733 A1 | 7/2016 | Brasch et al. |
| 2016/0198809 A1 | 7/2016 | Grunden et al. |
| 2016/0307429 A1 | 10/2016 | Hood et al. |
| 2017/0236398 A1 | 8/2017 | Eddy et al. |
| 2017/0362004 A1 | 12/2017 | Prevot et al. |
| 2018/0168459 A1 | 6/2018 | Tran |
| 2019/0038183 A1 | 2/2019 | Carr |
| 2019/0046084 A1 | 2/2019 | Kilcran et al. |
| 2019/0110761 A1 | 4/2019 | Brasch et al. |
| 2019/0304283 A1 | 10/2019 | Carr et al. |
| 2020/0020240 A1 | 1/2020 | Panzer |
| 2020/0113487 A1 | 4/2020 | Charna |

FOREIGN PATENT DOCUMENTS

| | | |
|---|---|---|
| CN | 208049218 U | 11/2018 |
| CN | 109310167 A | 2/2019 |
| CN | 106999300 B | 2/2020 |
| EP | 0985375 A2 | 3/2000 |
| EP | 2384726 A1 | 11/2011 |

(56) References Cited

FOREIGN PATENT DOCUMENTS

| KR | 101585364 B1 | 1/2016 |
|---|---|---|
| TW | M542454 U | 6/2017 |
| WO | 2020257475 A1 | 12/2020 |

OTHER PUBLICATIONS

AliMed Roll Control Belt With Alarm, Website, retrieved from the internet at least as early as Jun. 17, 2019; 1 page, https://www.alimed.com/alimed-roll-control-belt-with-alarm.html.
DeRoyal Double-Lock Security Cuffs, Leather Limb Holders, and Fixed Position Cuffs, retrieved at least as early as Nov. 18, 2017; 10 pages.
E.M. Adams Company Limb Holder Application Instruction, retrieved at least as early as Nov. 16, 2017; 5 pages.
E-Z Release Seat Belts w/Alarm by Alimed, retrieved from the internet at least at early as Jul. 10, 2017; Website, 1 page, www.medline.com.
International Search Report for PCT/US2018/045121, "Predictive Double-Release Alarm Belt" dated Oct. 22, 2018; 2 pages.
MDT5500 Patient Alarm Belt Replacement, retrieved from the internet at least as early as Jul. 10, 2017, Website, 1 page, www.medline.com.
Parasol Wireless Fall Prevention System Instructional Video, YouTube video, May 23, 2017, Parasol Medical, https://youtu.be/6zNgyqHUcao, 135 pages filed herewith.
Posey Healthcare Products Guide 1996; 2 pages.
Posey Patient Safety Aids—1985 Edition—Product Catalog; 6 pages.
Posey Patient Safety Aids—1989-1990 Product Line; 4 pages.
Posey Self-Releasing Chair Belt Sensors, retrieved at least as early as Jun. 17, 2019, Instruction sheet, 2 pages, Posey Company.
Search Report for PCT Patent Application No. PCT/US2020/038080, "Integrated Belt and Sensor for Alarm for Patient Furniture" dated Sep. 3, 2020.
Smart Caregiver TL-2109 Early Warning Chair Belts, retrieved from the internet at least as early as Jul. 10, 2017, Website, 1 page, www.quickmedical.com.
Smart Caregiver TL-2109V Early Warning Chair Belts, retrieved from the internet at least as early as Jul. 10, 2017, Website, 1 page, www.quickmedical.com.
Alimed, "IQ Cordless Sensor Alarm", available on the internet on or before Oct. 21, 2018 at https://www.alimed.com/alimed-iq-cordless-sensor-alarm.html, 2 pages filed herewith.
Alimed, "Patient Alarm/Transmitter Unit", available on the internet on or before Oct. 21, 2018 at https://www.alimed.com/replacement-patient-alarm-transmitter-unit.html?pid=155769, 2 pages filed herewith.
Alimed, "Remote Receiver Alarm Unit", available on the internet on or before Oct. 21, 2018 at https://www.alimed.com/remote-receiver-alarm-unit.html, 2 pages filed herewith.
Indigo Care, "Wireless Fall Prevention", available on the internet on or before Oct. 21, 2018 at http://www.indigocare.com.au/pages/fall_prevention_products_wireless.html, 2 pages filed herewith.
Medguard, "Ramblegard Wireless Systems", retrieved from the internet on or before Oct. 21, 2018 at https://www.medguard.ie/ramblegard-wireless-bedgard-chair-pad-with-wireless-jack.html, 5 pages filed herewith.
S&E CareTrade, "Medical Fall Prevention Equipment Wireless", available on the internet on or before Oct. 21, 2018 at https://www.secaretrade.com/category/MedicalFallPreventionEquipmentWireless, 4 pages filed herewith.
Smart Caregiver, "Wireless Fall Prevention", available on the internet on or before Oct. 21, 2018 at https://web.archive.org/web/20170224222108/http://smartcaregiver.com/wireless-call-system-with-caregiver-paging, 2 pages filed herewith.
Unified Alerts, "How do silent bed and chair sensors work" YouTube video, available on the internet on or before Oct. 21, 2018 at https://www.youtube.com/watch?v=Ps8YRhcf870, 68 pages filed herewith.
Office Action and Search Report for 2020800579573, "Integrated Belt and Sensor for Alarm for Patient Furniture" dated Aug. 10, 2023, 14 pages filed herewith (including Google translations).

* cited by examiner

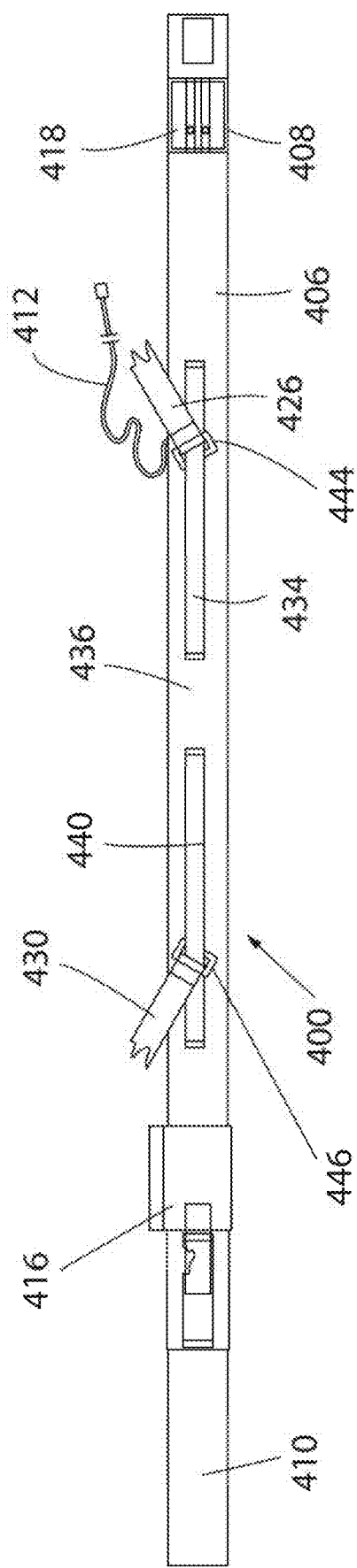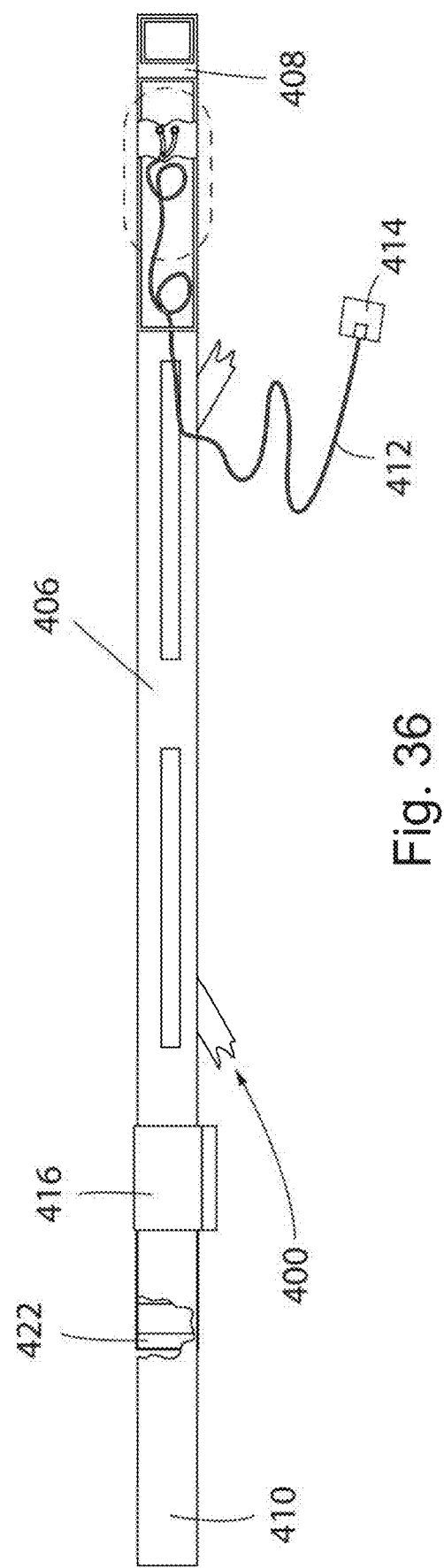
Fig. 35
Fig. 36

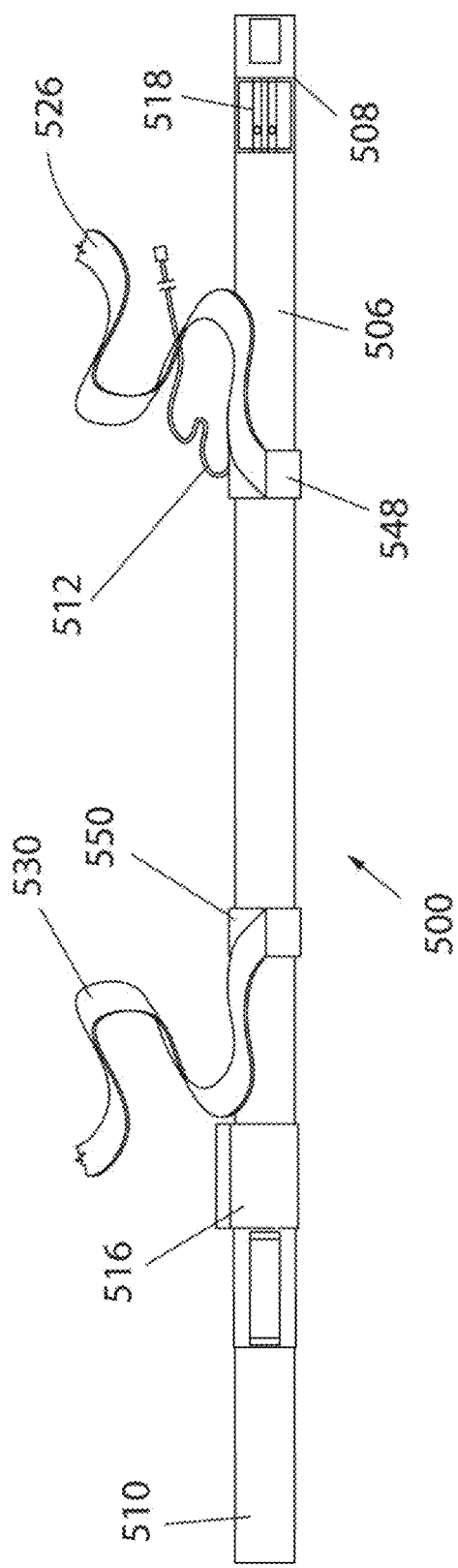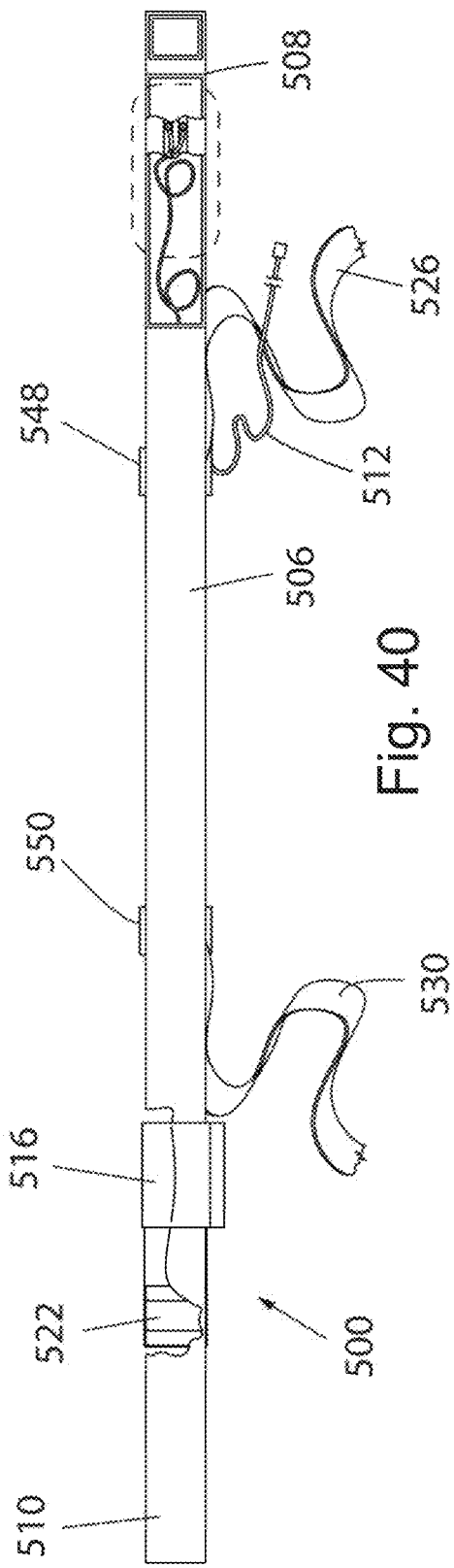

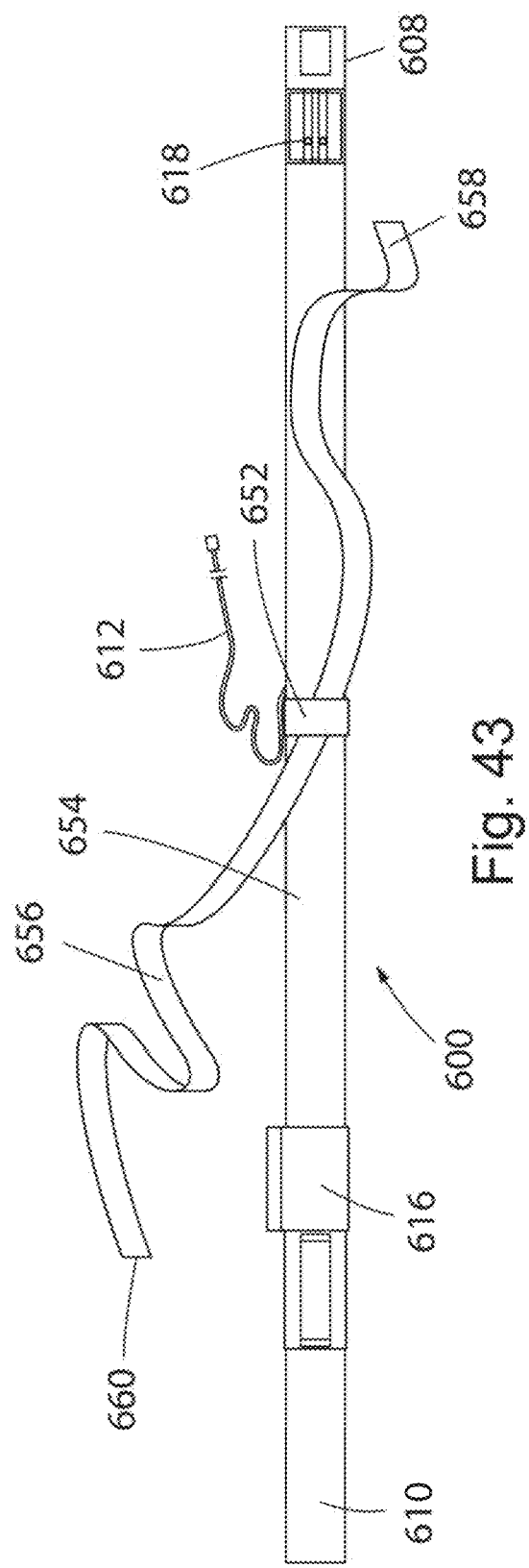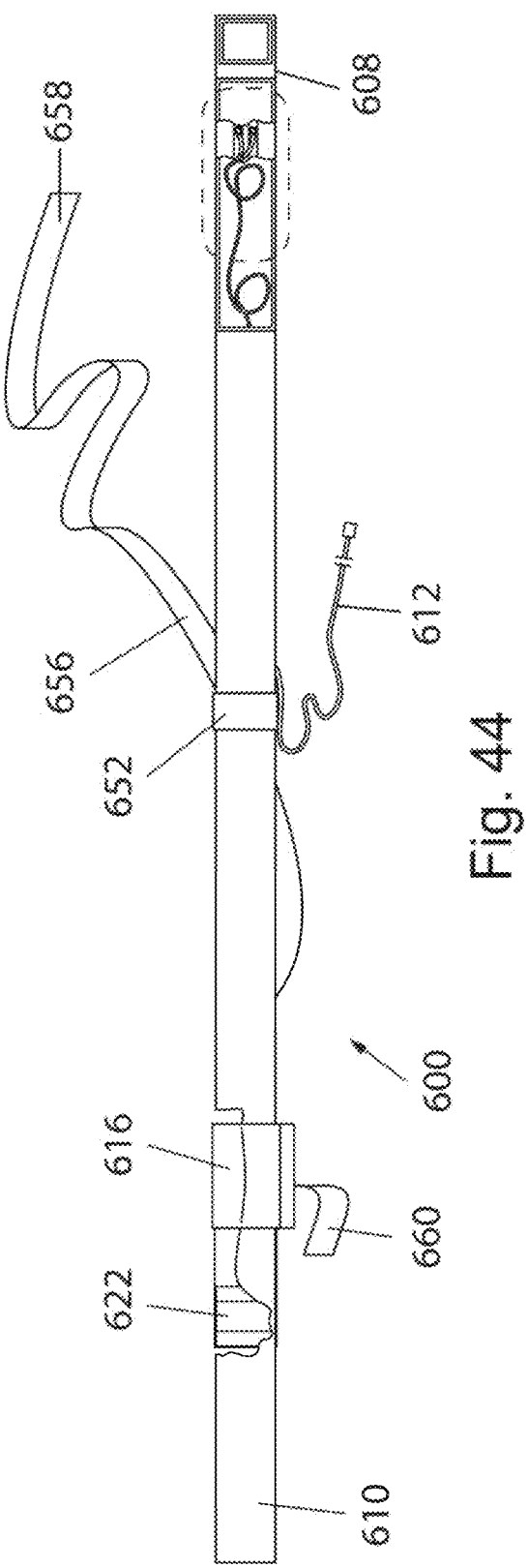

INTEGRATED BELT AND SENSOR FOR ALARM FOR PATIENT FURNITURE

CROSS-REFERENCE TO RELATED APPLICATIONS

The present application is a continuation of U.S. Non-Provisional application Ser. No. 17/190,167, filed on Mar. 2, 2021 and titled Integrated Belt and Sensor for Alarm for Patient Furniture, which claims the benefit of U.S. Provisional Patent Application Ser. No. 62/984,604 filed on Mar. 3, 2020, now abandoned, and titled Integrated Audible Reminder Belt for Bed or Other Furniture; and, the present application claims priority on U.S. Non-Provisional application Ser. No. 17/088,277, filed on Nov. 3, 2020, now U.S. Pat. No. 11,319,976, which is a continuation of U.S. Non-Provisional application Ser. No. 16/443,389, filed on Jun. 17, 2019, now abandoned, which is a continuation-in-part of U.S. Non-Provisional application Ser. No. 16/054,183, filed on Aug. 3, 2018, now U.S. Pat. No. 10,321,854, which claims the benefit of U.S. Provisional Patent Application Ser. No. 62/540,879 filed on Aug. 3, 2017 and titled Predictive Double Release Alarm Belt; and, the entirety of each of which is incorporated by reference herein. The present application is also a continuation in part of PCT Application No. PCT/US20/38080, filed on Jun. 17, 2020 and titled Integrated Belt and Sensor for Alarm for Patient Furniture.

BACKGROUND OF THE INVENTION

1. Field of the Invention

The present invention relates, in general, to the field of fall prevention devices. More particularly, the present invention relates to a device that allows medical personnel to monitor the location of various patients. Specifically, a preferred embodiment of the present invention relates to a belt that can be secured about a device on which a patient sits or lays that alerts medical personnel when the belt is removed or partially removed. Additionally, a preferred embodiment of the present invention relates to a belt that allows the patient to move relative to the device on which the patient sits or lays to increase comfort, while also alerting medical personnel when the belt is removed or partially removed.

2. Discussion of the Related Art

Falls and fall-related injuries pose significant health issues, especially for elderly individuals. Incidence of falls in hospitalized patients ranges from 2.6-7.0 falls per 1,000 patient days. 23-42% of these falls result in some type of injury. To address these health issues, various fall-prevention equipment is commonly used in hospitals, assist care facilities, nursing homes, senior citizen facilities, and any other locations to protect patients and residents. For instance, various sensors, alarms, and other devices are used to monitor the location and movement of individuals. By way of example, many pieces of furniture, including chairs, beds, wheelchairs, toilets, and the like, feature sensors that alert medical personnel when an individual exits these pieces of furniture. In the event an individual stands up, the sensor can trip an alarm that alerts medical personnel. Once the alarm is sounded, appropriate attention can be given to the individual who may not be steady on his or her feet.

One such type of fall-prevention equipment relates to belts that are wrapped around a patient who is sitting in a chair or lying in a bed. In the event the individual wishes to get up from the chair or bed, he or she must disengage the belt. Once the fastener of the belt is disengaged, an alarm is sounded to alert the medical staff.

While these fall-prevention belts are helpful, further improvements are desired. For instance, current fall-prevention belts resemble traditional belts, which can be disengaged quickly and easily by simply separating the first end and the second end at a single release point. Once the first end and the second end are disengaged about the single release point such that the belt is completely separated, an alarm is sounded. As a result, once the alarm is sounded, the patient is able to immediately stand up and move around as desired. This means that the medical personnel must act immediately, and even then, the patient may have stood up, moved, or fallen down.

Additionally, traditional fall-prevention belts are expensive, requiring them to be reused. In many settings, such as household settings, this is not an issue. However, in hospital settings, sterility concerns require extensive cleaning before a fall-prevention belt is ready to be reused. This also adds to the cost of using and maintaining fall prevention belts.

Another issue with many fall-prevention belts is that they unnecessarily restrict the patient's movements. This can cause discomfort for the patient. This is especially true in situations where a patient is in the same position for extended periods of time. For instance, when a patient is on bedrest, if a fall-prevention belt is used that unnecessarily restricts the patient's movements, the patient may experience bed sores due to prolonged contact with the bed.

What is needed, therefore, is a fall-prevention alarm belt that further addresses at least the issues outlined above. More specifically, an alarm belt that provides medical personnel with additional time to reach the patient before the patient is able to stand up is needed. Similarly, an alarm belt that requires additional time for a patient to disengage is further needed. Further, what is needed is an affordable, disposable fall-prevention belt that can be installed to a chair, a bed, or another piece of furniture on which a patient is sitting or lying. Further still, what is needed is a fall-prevention belt that allows a patient to move side-to-side relative to a device such as a bed without falsely tripping the alarm.

SUMMARY AND OBJECTS OF THE INVENTION

By way of summary, the present invention is directed to a double-release alarm belt that is used with a device that holds or supports a patient. A primary object of the invention is to provide an apparatus that allows medical personnel to monitor the location of the patient relative to the device. Another object of the invention is to provide an apparatus that is affordable and disposable for industries where sterility concerns are prevalent.

In accordance with a first aspect of the invention, these objects are achieved by providing an apparatus having at least three straps, a cord configured to detect movement of at least one of the straps, and an alarm system connected to the cord. The at least three straps may be releasably secured to one another around the device and the patient. For instance, the at least three straps may include a first elongated strap, a second elongated strap releasably attached to the first elongated strap, a third elongated strap, and a fourth elongated strap releasably attached to the third elongated strap.

The at least three straps may be disengaged from the device and the patient by moving a first strap in a first direction and then moving a second strap in a second direction. Once the first strap is moved in the first direction, the cord may provide a transmission to the alarm system that results in the sounding of the alarm system. For instance, the third elongated strap may be disengaged from the fourth elongated strap by pulling the third elongated strap in the first direction. Once this occurs, the alarm system may be triggered. Thereafter, the first elongated strap may be disengaged from the second elongated strap by pulling the second elongated strap in the second direction opposite the first direction.

The apparatus may also include first, second, third, and fourth fasteners. For instance, the first fastener may be located on an upper side of the first elongated strap. The second fastener may be located on an underside of the second elongated strap, such that the second fastener is configured to releasably fasten to the first fastener. Additionally, the third fastener may be located on an underside of the third elongated strap. Finally, the fourth fastener may be located on an upper side of the fourth elongated strap, such that the first fastener is configured to releasably fasten to the third fastener. Also, a bond between the third fastener and the fourth fastener may be weaker than a bond between the first fastener and the second fastener.

Further still, the apparatus may include first and second handles. The first handle may be mounted to an upper side of the third elongated strap. This allows the third elongated strap to be disengaged from the fourth elongated strap by pulling on the first handle. The second handle may be mounted to an upper side of the second elongated strap to allow the second elongated strap to be disengaged from the first elongated strap.

In accordance with another aspect of the invention, these objects are achieved by providing an apparatus comprising an inventive double-release alarm belt with a first elongated strap, a second elongated strap, a shortened strap, a cord, and an alarm system. The first elongated strap, the second elongated strap, the shortened strap, and the cord can be disposable, or they can be reusable.

The first elongated strap may have a first end, a second end, a midportion located between the first and the second end, an upper side, and an underside. The first elongated strap may also have a hook mechanism that is attached to the first end of the first elongated strap. The hook mechanism may be used to engage a second end of the second elongated strap. More specifically, the hook mechanism may comprise a first ring and a second ring where the second end of the second elongated strap is threaded through the first ring and the second ring. Additionally, the first elongated strap may have a first fastener extending along the underside of the second end of the first elongated strap.

The shortened strap may also have a first end, a second end, an upper side, and an underside. The shortened strap may be attached to the midportion of the first elongated strap about the first end of the shortened strap. Additionally, a second fastener may extend along the upper side of the shortened strap from the first end of the shortened strap to the second end of the shortened strap.

Similarly, the second elongated strap may have a first end, a second end, an intermediate portion located between the first end and the second end, an upper side, and an underside. A third fastener may extend along the underside of the first end of the second elongated strap and a fourth fastener may extend along the upper side of the intermediate portion.

The first fastener may be releasably engaged by the fourth fastener, and the second fastener may be releasably engaged by the third fastener. More specifically, the first fastener may be releasably held together with the fourth fastener by a first bond and the second fastener may be releasably held together with the second fastener by a second bond. The first bond may be weaker than the second bond. This allows the bond between the first fastener and the fourth fastener to be easily broken. It is more difficult to break the bond between the second fastener and the third fastener. In this way, a patient can easily break the first bond, but it will be more difficult to break the second bond. Also, the first fastener is disengaged from the fourth fastener using a first force and the second fastener is disengaged from the fourth fastener using a second force. The first force is less than the second force. Each of the fasteners may be selected from one of a hook fastener and a loop fastener.

The cord is associated with the first elongated strap, the second elongated strap, and the shortened strap and is in communication with an alarm system. If the first fastener is disengaged from the fourth fastener as monitored by the cord, the alarm system will generate an audible sound. This will notify medical personnel that there is risk that the patient is preparing to leave the device before the patient is actually able to leave the device. To disengage the various fasteners, the first fastener is disengaged from the fourth fastener when the first fastener is pulled in a first direction. Next, the second fastener may be disengaged from the third fastener by pulling in a second direction, which is opposite to the first direction. By requiring the patient to pull in the first direction and then the second direction, it takes additional time to disengage the double-release alarm belt in comparison to previous belts.

The inventive double-release belt may also include a first handle that is mounted to the upper side of the second end of the first elongated strap. Thus, the first handle is used to disengage the first fastener from the fourth fastener. The double-release belt also may include a second handle mounted to the upper side of the first end of the second elongated strip. Therefore, the second handle is used to disengage the first fastener from the fourth fastener.

The double-release belt preferably may also include a fifth fastener. The fifth fastener may be associated with the second end of the second elongated strap. The fifth fastener may be used to secure the first elongated strap, the second elongated strap, and the shortened strap in a wrapped position. Additionally, the fifth fastener may be used to secure the second end of the second elongated strap to the double-release belt once installed.

In accordance with another aspect of the invention, these objects are achieved by providing a method of using the double-release alarm belt with a device holding a patient. The first step of the method is wrapping the double-release arm belt around the patient. Next, the double-release alarm belt is wrapped around the device. A first end of the double-release alarm belt is then engaged with a second end of the double-release alarm belt to secure the first and second ends to one another. Next, an alarm system is connected to the double-release alarm belt by a cord.

The method may include additional steps. The first elongated strap may be disengaged from the second elongated strap about a first portion. For instance, a first handle can be pulled to disengage the first elongated strap from the second elongated strap about a first portion. When this occurs, an audible alarm can be created by the alarm system. Additionally, the first elongated strap may be disengaged from the second elongated strap about a second portion. For instance, a second handle can be pulled to disengage the first elongated strap from the second elongated strap about a second portion. When this occurs, the patient is released so that he or she can move away from the device. Also, the first end of the double-release alarm belt may be threaded through a first ring and a second ring associated with the second end of the double-release belt. When this occurs, the belt is snug about the patient. Additionally, the first end of the double-release alarm belt can be secured in place using a hook and loop fastener.

In accordance with another aspect of the invention, a double-release alarm belt for use with a device holding a patient may include a first elongated strap, a shortened strap, a second elongated strap, and an alarm system. The shortened strap may extend from the first elongated strap. The second elongated strap may be configured to be releasably attached to the first elongated strap and to be releasably attached to the shortened strap. The alarm system is triggered when the second elongated strap is disengaged from the first elongated strap. The second elongated strap may be disengaged from the first elongated strap by pulling the first elongated strap in a first direction. The second elongated strap may also be disengaged from the shortened strap by pulling the second elongated strap in a second direction opposite the first direction.

In accordance with another aspect of the invention, an integrated belt and sensor for alarm system for use with a device holding a patient is described. The system may include at least one strap having a first end and a second end, where the first end and second end are releasably secured to one another around the patient. Additionally, the system may include a cord that is configured to detect movement of the first end relative to the second end. An alarm system is then connected to the cord. The alarm system may be activated when the first end and the second end are separated.

In accordance with yet another aspect of the invention, the at least one strap may include a first elongated strap and a second shortened strap. The second shortened strap is configured to be releasably attached to the first elongated strap. The second shortened strap may be disengaged from the first elongated strap by pulling the second shortened strap in a first direction, after which the alarm system will be triggered. The second shortened strap may be slidably adjustable relative to the first elongated strap. Additionally, the system may have multiple fasteners. For instance, the system may include a first fastener on an upper side of the first elongated strap and a second fastener on an underside of the second shortened strap. The second fastener may be configured to releasably fasten to the first fastener, and the alarm system may be triggered when the first fastener is separated from the second fastener.

In accordance with another aspect of the invention, the system may include at least one securement strap that is configured to secure the system to the device, while also allowing the patient to move side-to-side relative to the device. For instance, the system may include a first securement strap extending from the first elongated strap that is configured to be secured to the first side of the device. Additionally, the system may include a second securement strap extending from the first elongated strap that is configured to be secured to a second side of the device. The securement straps may be secured to various components associated with the system. For instance, the straps may be mounted to hooks that are slidable relative to tracks mounted to the first elongated strap. For instance, a first track may be mounted to an outer side of the first elongated strap at a first end and a second track may be mounted to the outer side of the first elongated strap at a second end. In such an embodiment, a first hoop may be mounted to the first securement strap, where the first hoop travels along the first track.

Similarly, a second hoop may be mounted to the second securement strap, where the second hoop travels along the first track. In another embodiment, the securement straps are mounted to sliders that are wrapped around the first elongated strap. For instance, a first slider may be wrapped around a first end of the elongated strap and a second slider may be wrapped around a second end of the elongated strap. In such an embodiment, the first slider is configured for slidable movement along the first end and the second slider is configured for slidable movement along the second end. The first securement strap may extend from the first slider and the second securement strap may extend from the second slider. In yet another embodiment, the system may include a loop mounted on a back of the first elongated strap. A single securement strap having first and second ends may be threaded through the loop, with either side of the securement strap being fastened to either side of the device. Alternatively still, the system may include a first strap wrapped around the body of the patient, and second and third securement straps extending from opposite ends of the first strap. These securement straps may wrap around the back of the patient, for instance in a crisscross configuration.

In yet another embodiment, the at least one strap may include a first elongated strap having a first end, a second end, a middle portion located therebetween, and an opening formed in the middle portion. The at least one strap may also include a second elongated strap that extends through the opening formed in the first elongated strap.

In accordance with yet another aspect of the invention, a method is provided. The method may include first wrapping at least one strap temporarily around the patient. When this occurs, a first end of the at least one strap is engaged with a second end of the at least one strap. An alarm system is then connected to the at least one strap. At least one securement strap that extends from the at least one patient strap is then secured to a side of the device, which in turn enables side-to-side movement of the patient relative to the device. When the first end and the second end are separated from one another, the alarm system may be enabled. After the alarm system is enabled, the system must be further disengaged before the patient can exit the device.

According to another aspect of the present invention, an integrated belt and sensor for alarm or audible reminder systems for us with a device holding a patient is provided including at least one strap, a cord, and an audible system. The at least one strap has a first end and a second end, where the first end is releasably secured to the first end around the patient. The cord is configured to detect movement of the first end relative to the second end, and the audible reminder system is activated before the first end and the second end are separated. The at least one strap may further include a first elongated strap that has a first end, a second end, and a middle portion, as well as a slider that is wrapped around the first elongated strap. The slider is further slidable relative to the middle portion of the first elongated strap. The slider is releasably disengageable from the first elongated strap by pulling the slider in a first direction, at which point the slider is disengaged from the first elongated strap. Additionally, the first end and the second end of the first elongated strap may be releasable from one another after the slider is disengaged from the first elongated strap and once the audible reminder system has been triggered. Further still, the slider is slidably adjustable relative to the first elongated strap.

According to yet another aspect of the invention, the integrated belt and sensor may further include a first fastener on an upper side of the first elongated strap at the first end and a second fastener on an underside of the slider, where the second fastener is configured to releasably fasten to the first fastener. When the first fastener is separated from the second fastener, the audible reminder system is triggered. Additionally, the integrated belt and sensor may also have a third fastener on the upper side of the first elongated strap at the send end and the midportion, and a fourth fastener on the lower side of the first elongated strap at the first end. The third fastener may be configured to releasably fasten to the fourth fastener, which may occur after the first fastener is released from the second fastener. Further still, the present invention may include a first release handle that is associated with the slider adjacent to the first fastener and the second fastener, and a second release handle that is associated with the first elongated strap adjacent to the third fastener and the fourth fastener. For instance, the first release handle may be mounted parallel to a length of the first elongated strap and the second release handle may be mounted perpendicular to the length of the first elongated strap. The first release handle may be pulled in a first direction, after which the second release handle is pulled in a second direction. Further still, the slider may be moved from a first position to a second position. In the first position, the slider covers up the second release handle. In the second position, the slider does not cover up the second release handle.

According to yet another aspect of the invention, the belt and sensor may also include a first securement strap and a second securement strap, both of which extend from the first elongated strap. The first securement strap is configured to be secured to a first side of the device, whereas the second securement strap is configured to be secured to a second side of the device. Additionally, the integrated belt and sensor may also have at least one fastener that is associated with the first elongated strap that releasably secures to the first securement strap, and at least one fastener associated with the first elongated strap that releasably secures to the second securement strap. Each of these securement straps may extend downwardly and around the respective edge of the device such that each strap is secured to itself beneath or on the inside of the device.

According to another aspect of the present invention, the first elongated strap may be made of a first material on an outer side and a second material on the inner side, where the first material is more slippery than the second material.

According to yet another aspect of the present invention, a method of using an integrated belt and sensor is provided. This may include the steps of wrapping at least one strap temporarily around a patient, engaging a first end of the at least one strap with a second end of the at least one strap, sliding a slider relative to the at least one strap, releasably engaging the slider with a portion of the at least one strap, connecting an audible reminder system to the at least one strap, and activating the audible reminder system when the slider is disengaged from the portion of the at least one strap. Further still, the method may include the steps of securing at least one securement strap that extends from the at least one strap to a side of the device and enabling side-to-side movement of the patient relative to the device. Furthermore, the method may include the disengaging of the slider from the portion of the at least one strap, enabling the audible reminder system to create an audible reminder, and then further disengaging the first end of the at least one strap from the second end to enable the patient to exit the device.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 21 illustrates a perspective view of the inventive belt that is mounted around a patient and a device the patient is sitting or lying on;

FIG. 22 illustrates a perspective view of the inventive belt in a preferred position relative to the patient and a device that the patient is resting on;

FIGS. 35-38 illustrate side elevation views and isometric views of an inventive integrated belt and sensor for alarm for patient furniture of the present invention;

FIGS. 39-42 illustrate side elevation views and isometric views of an inventive integrated belt and sensor for alarm for patient furniture of the present invention;

FIGS. 43-46 illustrate side elevation views and isometric views of an inventive integrated belt and sensor for alarm for patient furniture of the present invention;

Figure 1:
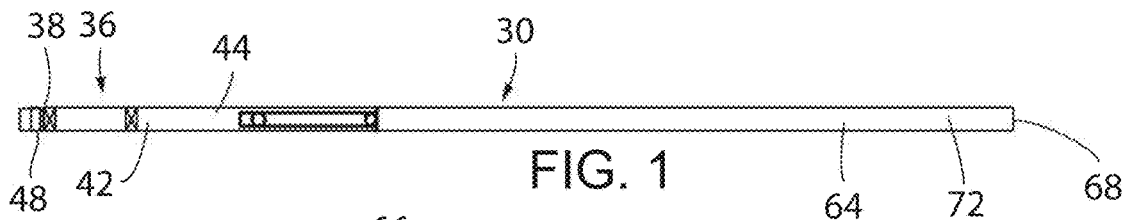
FIGS. 1-4 illustrate various side elevation and exploded perspective views of an inventive predictive double-release alarm belt of the present invention.

In describing the preferred embodiment of the invention, which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

The current invention relates to a belt with multiple straps portions which is connected to an alarm system, preferably an audible reminder, that can be secured around an occupant of a chair, bed, or other supporting device to monitor patient movement non-invasively. When a first releasable strap portion is disengaged by pulling in a first direction, an alarm will sound. For instance, the invention allows an audible reminder to be sounded before a patient is able to leave the chair, bed, or other supporting device, for instance, for a period of time such as 5-7 seconds after an event occurs. This is beneficial for multiple reasons. First, this delay helps to give a caregiver time to check in on the patient before he or she is able to stand up. Also, this audible reminder helps to remind the patient that he or she should wait for a caregiver to help him or her up from the chair, bed, or other furniture, or that the patient should ask for assistance. When a first releasable strap portion is disengaged by pulling in a first direction, an audible reminder will sound. The second releasable strap portion can then be disengaged by pulling in a second direction, which is opposite to the first direction. This gives an early warning to the medical personnel before the occupant attempts to exit the chair or bed. As a result, the necessary staff has time to intervene to assist the occupant who may be a fall risk. The belt could either be disposable or reusable based on the materials used. By offering both disposable and reusable belts, cost efficiency can be optimized depending on the specific context in which the belt is used. This invention is superior to previous sensor pads or alarms that typically only sound once the occupant has already exited the chair, bed, or other supporting device. The invention provides the earliest possible warning that a patient is at immediate risk of falling when exiting the bed, while also being non-invasive.

Additionally, the current invention may also include features that allow for increased range of motion when a patient is secured to a device, such as a piece of furniture including a bed. These features can easily be incorporated with various disposable alarmed belts, some of which have two release points that provides a health care provider with an early warning that a patient is trying to leave the furniture. This early warning can provide the provider with additional time to intervene prior to a potential fall. The invention may be made of various low-profile, soft materials to avoid potential pressure injuries. The invention may also be made of hydrophobic material and flat surfaces to simplify cleaning. Further still, the invention may be compatible with a variety of different devices and furniture. Preferably, the invention is of a simple design with minimal components to support the ease of use by end users.

The current invention may also include further features to optimize use. For instance, the belt may be made of multiple different materials attached to one another having different characteristics. For instance, the outer side of the belt may be made of a slippery material, whereas the interior of the belt may be made of a high-friction or less slipper material. This may allow the outside of the belt, and thus the belt and the user, to easily move relative to the bed or other furniture, for instance when a user moves or rolls from side to side on a bed. At the same time, the less slippery inner material may help to ensure the belt remains in place relative to the patient. Further still, the slippery outer material may easily be wiped down to remove materials that may fall onto the belt. Also, the belt may be made of soft wicking material and include foam material therein for patient comfort. The belt may also be substantially water resistant or waterproof, hydrophobic, and wipeable.

Additionally, the belt may include a slider. The slider may be used to enable adjustability of the length of the belt depending on the size of a patient. In fact, the slider may be configured to allow for adjustability of the belt even once it is installed to the bed, frame, furniture, or other device. The slider may be configured to slide relative to the belt, such that it can initially be located on top of or next to certain components of the belt, after which it can be slid to expose those certain components. For instance, the slider may be slid to expose a second release handle. The slider may be any number of different dimensions, for instance, at least 2 inches in width, at least 4 inches in width, at least 5 inches in width, and over six inches in width, as desired. The slider may make it difficult for a user to access a second release handle located thereneath. Additionally, the specific dimensions of the slider may vary to help improve ease with which the slider can move relative to the belt. Furthermore, a first release handle associated with the slider may be specifically configured to help optimize the amount of force applied to the handle that is transferred to the underlying strap. For instance, the release handle may terminate directly adjacent to the edge of the underlying strap. This first release handle may be horizontally oriented, parallel with the length of the belt, whereas the second release handle may be vertical oriented, perpendicular with the length of the belt.

Further still, the belt may have opposing securement straps that secure the belt to either side of the bed or other piece of furniture. For instance, the edges of each of the opposing securement straps may be wrapped outside of a frame associated with the bed, under the frame, and then upwardly such that the edge of the strap secures to the base of the strap. This may occur between the frame and the bed, such that it is difficult to disengage the strap from on top of a bed. This would make it difficult for an individual located on top of the bed and within the belt to remove the securement straps. Instead, it would be easier for an individual who is not secured within the belt to disengage the securement straps. Furthermore, this makes the straps harder to see, which also helps to minimize risk that a user will try to disengage the securement straps from atop of the bed or other furniture.

Additionally, the belt may be delivery in a use-based configuration that helps to simplify use directly out of the package. For instance, multiple fasteners or other locators may be installed onto the belt. More specifically, at least two hook and loop fasteners may be secured to the bottom side of the belt that help to ensure proper placement of securement straps. Additionally, these hook and loop fasteners help a user to return the belt into the use-based configuration after a user has used the belt. As such, these fasteners serve as strap guides that can easily be broken to ensure patient comfort.

Further still, the belt may come equipped with a cord that is hidden within a substantial portion of the belt. This allows the length of the cord to extend from the end of the belt to ensure there is appropriate clearance to reach an alarm or audible device.

Also, the various hook and loops fasteners may come in different strengths based on the materials of the hook and loop fasteners, the size and shape of the hook and loop fasteners, and the like. In this way, certain fasteners may be easier or more difficult to disengage by a user depending on the function they serve. Additionally, compatible hook and loop fasteners may come color coded to help a user quickly and easily identify which hook fasteners align with which loop fasteners.

Additional features and benefits of the present invention may include:
- Both sides of bed attachment straps may be of the blue lower friction, hydrophobic materials
- Labels added to bed attachment straps that say "This side facing out" to help with product application to the bed
- Yellow handles may be:
  - Shortened handles to center handles on the belt, makes it easier for patients to reach the handles.
  - Rotated the inner handle so it cannot be accessed without removing the slider
  - Adjusted sewing on the first handle to better apply the force in a "peel" manner
- Bed attachment straps white Hook & Loop—may be changed to Velcro "Onewrap", this product is both the hook and the loop. Less likely to drag on the bedsheets, fewer parts for manufacturing.
- Two-sided product label—one side has the standard info, one side has the warning.
- Slider loop update
  - May be 2" wide with blue fabric touching the patient.
  - May also be 5" wide and now only orthowick touches the patient Early indication of unassisted bed exit
  Patient can self-release, so this is not a restraint
    Dual release sensor: Sensor activates alarm at first release. Patient can exit after second release. This provides earlier notification to caregivers (an additional 5-7 seconds)
    Notification enabled by connection/integration to existing Posey Alarms and Nurse Call system, if applicable.
    Release points include bright yellow handles—easy to see/grab from any angle
Belt allows patient to roll and turn in bed, (to minimize disruptions to sleep, support patient comfort)
  Strap design
    Belt moves with patient, allowing patient to roll, but not to roll out of bed when used with side rails (per facility protocol)
High performance materials to facilitate patient comfort
5" wide
  Orthowick™ material (inner, patient facing)
    Breathable
    Moisture wicking properties
    Smooth/soft against skin,
  Low friction material (outer)
    Reduce shear forces by allowing belt to move with patient within bed (vs. patient moving within belt)
    wipeable, spot-cleanable (single patient use for 30 days)
Belt is easy to adjust to a variety of sizes
  Simple sliding handle
  One embodiment is configured for 24-42" waist size
  Another embodiment is configured for 38-56" waist size
Secure, easily adjusted Bed attachment straps
  Secured by high strength hook and loop
  Intuitive—labels on straps
  Reduces tampering—H&L not accessible to patients
  Adjustable for a variety of different beds, for instance, 34" to 40" wide
Additional modifications may include:
Same dual-release concept
Wider
Different material (covered above)
Sliding handle so adjustability is on belt/in front of patient, vs chair, where it is in the back
Further additional modifications may include:
This has a sensor that connects to Posey Alarms, activates at first release to provide caregiver notice and extra time
Still self-release, so not a restraint
This Velcro is easier to release for a patient
Patient can still turn/roll in bed
Belt is made with softer, gentler material

2. Detailed Description of Preferred Embodiments

The inventive double-release alarm belt 30 is generally shown in the figures. The double-release alarm belt 30 is used to monitor the position of a patient 34 or other individual who is resting on a support device 32; for instance, a chair, a bed, a wheelchair, a cardiac chair, a recliner, or other furniture. The double-release alarm belt 30 has a first elongated strap 36, a second elongated strap 64, and an alarm system 80. The double-release alarm belt 30 may also include a shortened strap 52. The first elongated strap 36, the second elongated strap 64, and the shortened strap 52 may be releasably affixed to one another about a first portion 112 and a second portion 114, as will be further described below. When the first elongated strap 36 and the second elongated strap 64 are disengaged about the first portion 112, the alarm system 80 may create an audible alarm. In this way, the double-release alarm belt 30 provides medical personnel with an advanced warning before the patient 34 is able to disengage the second elongated strap 64 from the shortened strap 52 about the second portion 114 to get up from the device 32.

Initially, the first elongated strap 36 will be described. The first elongated strap 36 can be seen, for instance, in FIGS. 2 and 4. The first elongated strap 36 has a first end 38, a second end 40 opposite the first end 38, and a midportion 42 located between the first end 38 and the second end 40. Additionally, the first elongated strap 36 may have an upper side 44 and an underside 46. A hook mechanism 48 may be attached to the first end 38 of the first elongated strap 36. The hook mechanism 48 may include a first ring 94 and a second ring 96. Additionally, a first fastener 50 may be associated with the first elongated strap 36. As shown, the first fastener 50 extends along the underside of the first end 38 of the first elongated strap 36. Additionally, the first elongated strap 36 may have a first handle 86 that is mounted to the upper side 44 of the first elongated strap 36 along the second end 40. The length of the first handle 86 may be substantially the same length of the first fastener 50.

Figure 20:
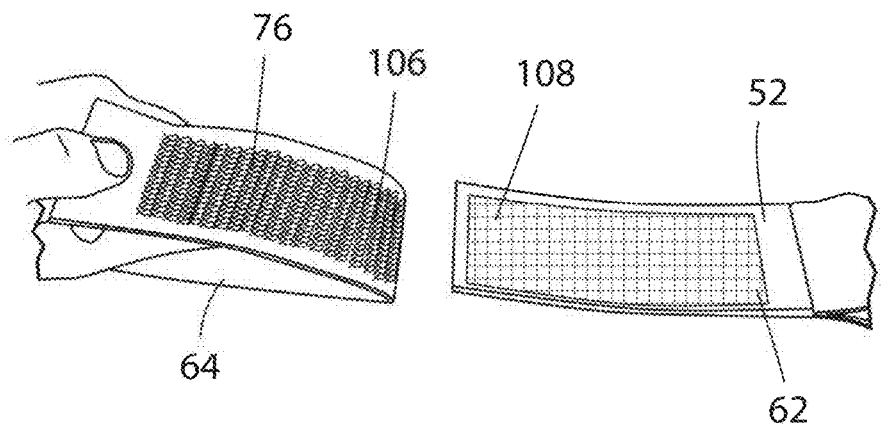
FIG. 20 illustrates another perspective view of the inventive belt of FIGS. 5-19, where the first elongated strap is separated from the second elongated strap such that the belt is completely disengaged.
Figure 21:
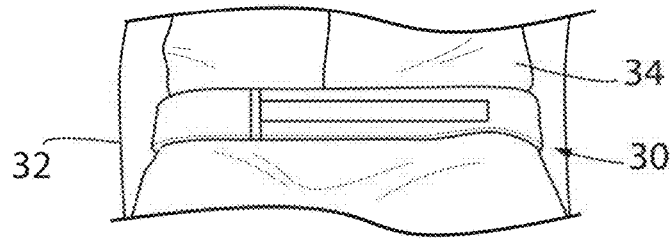
Figure 22:
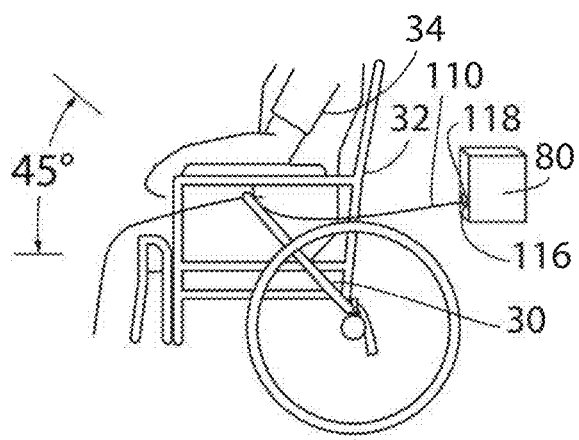

Moving on, the shortened strap 52 also has a first end 54 and a second end 56 opposite the first end 54, as well as an upper side 58 and an underside 60. The shortened strap 52 is best seen in FIG. 20. As shown, the first end 54 may be attached to the midportion 42 of the first elongated strap 36. Additionally, a second fastener 62 extends along the upper side 58 of the shortened strap 52 from the first end 54 of the shortened strap 52 to the second end 56 of the shortened strap 52.

Figure 2:
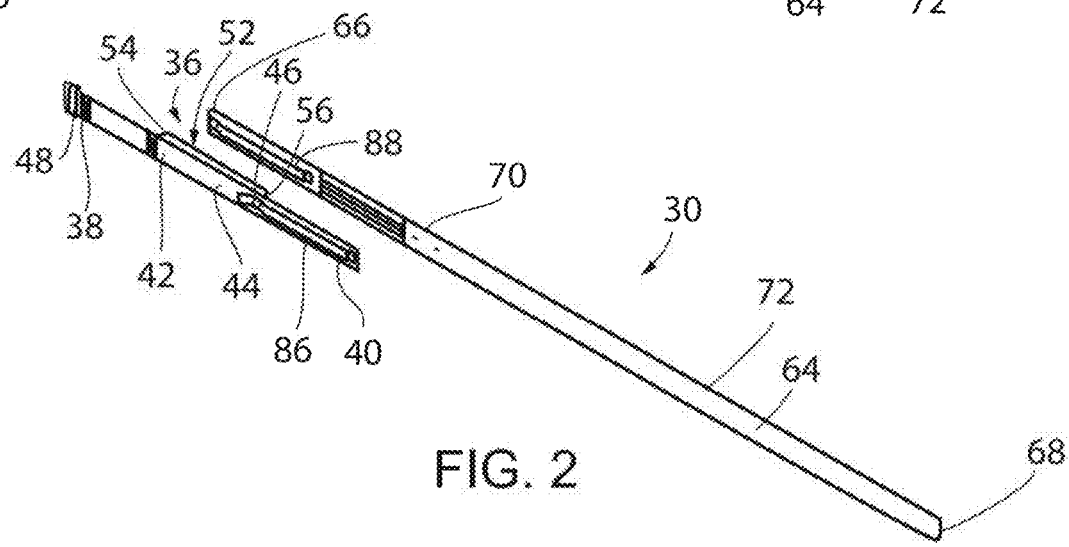
Figure 4:
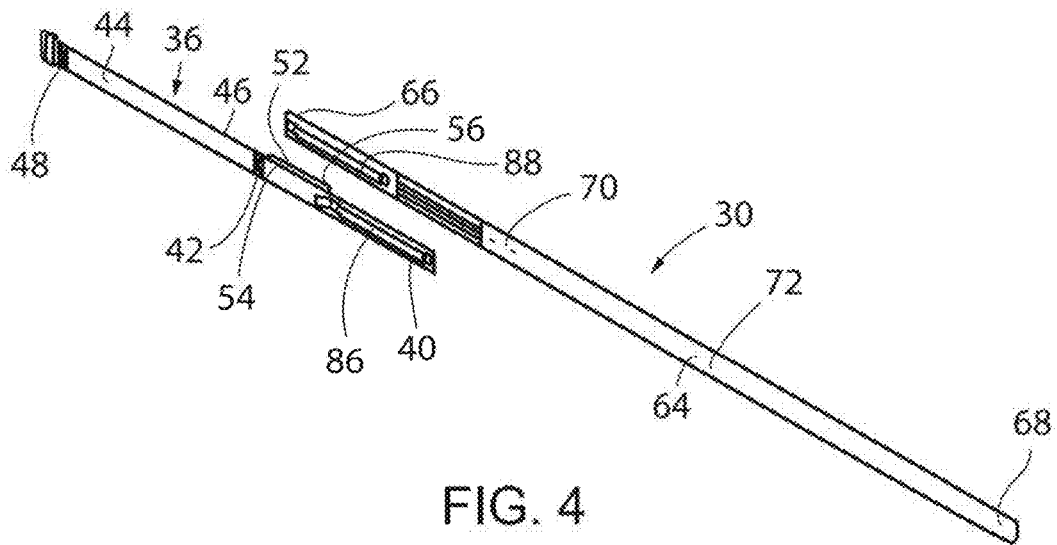
Figure 5:
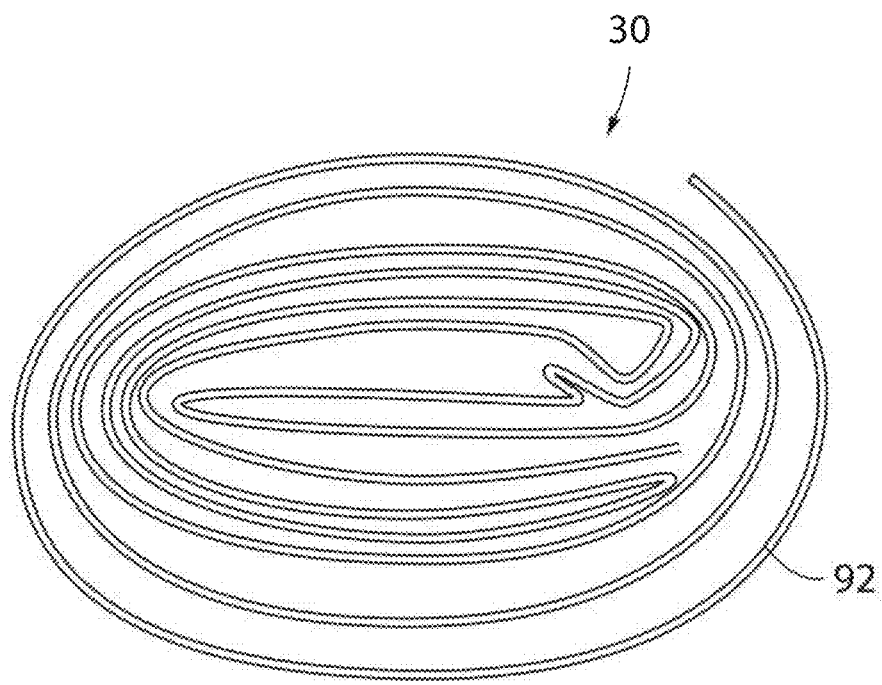
FIG. 5 illustrates a perspective view of the inventive belt in a wrapped position.
Figure 6:
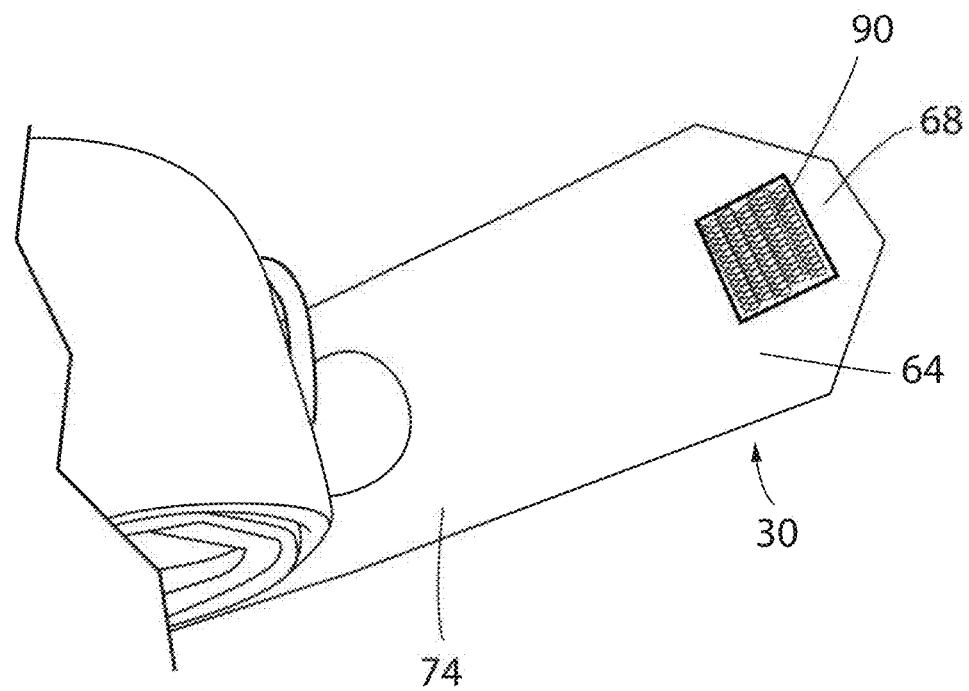
FIG. 6 illustrates a perspective view of the inventive belt of FIG. 5 once a fifth fastener is disengaged and unwrapped.
Figure 7:
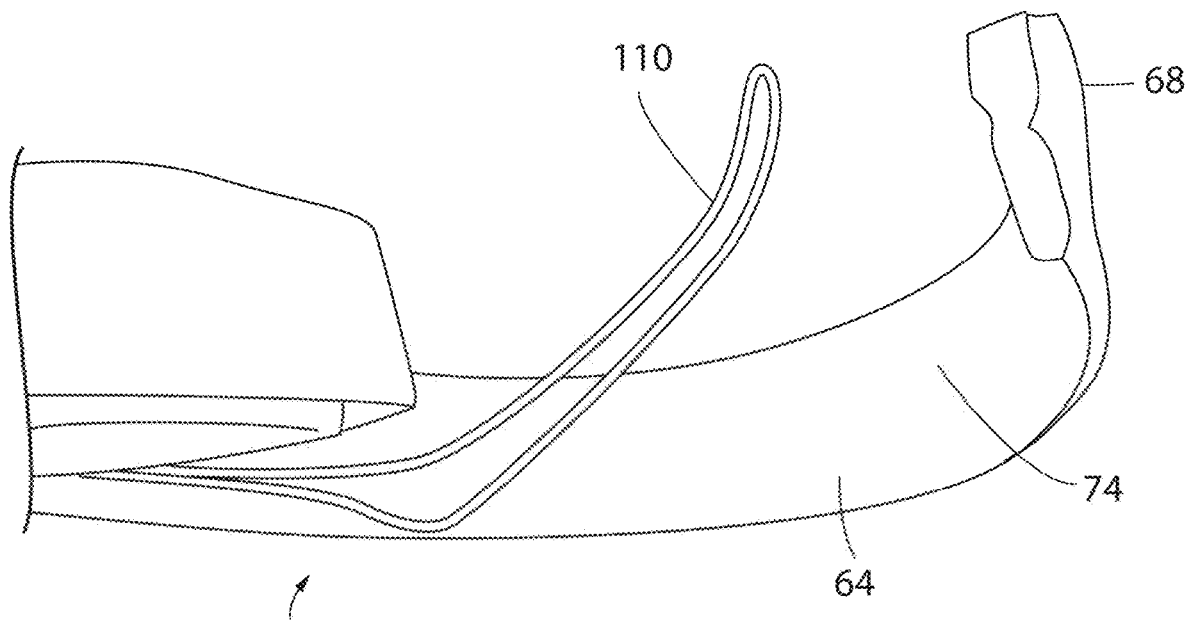
FIGS. 7-10 illustrate perspective views of the inventive belt of FIGS. 5 and 6, as it is unwrapped with a cord that is associated with an alarm belt and an alarm system.
Figure 8:
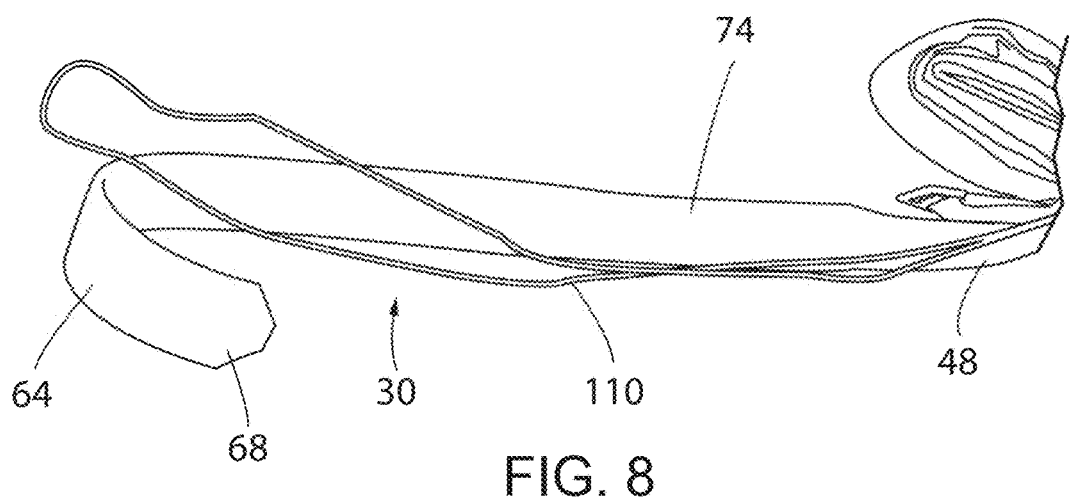
Figure 9:
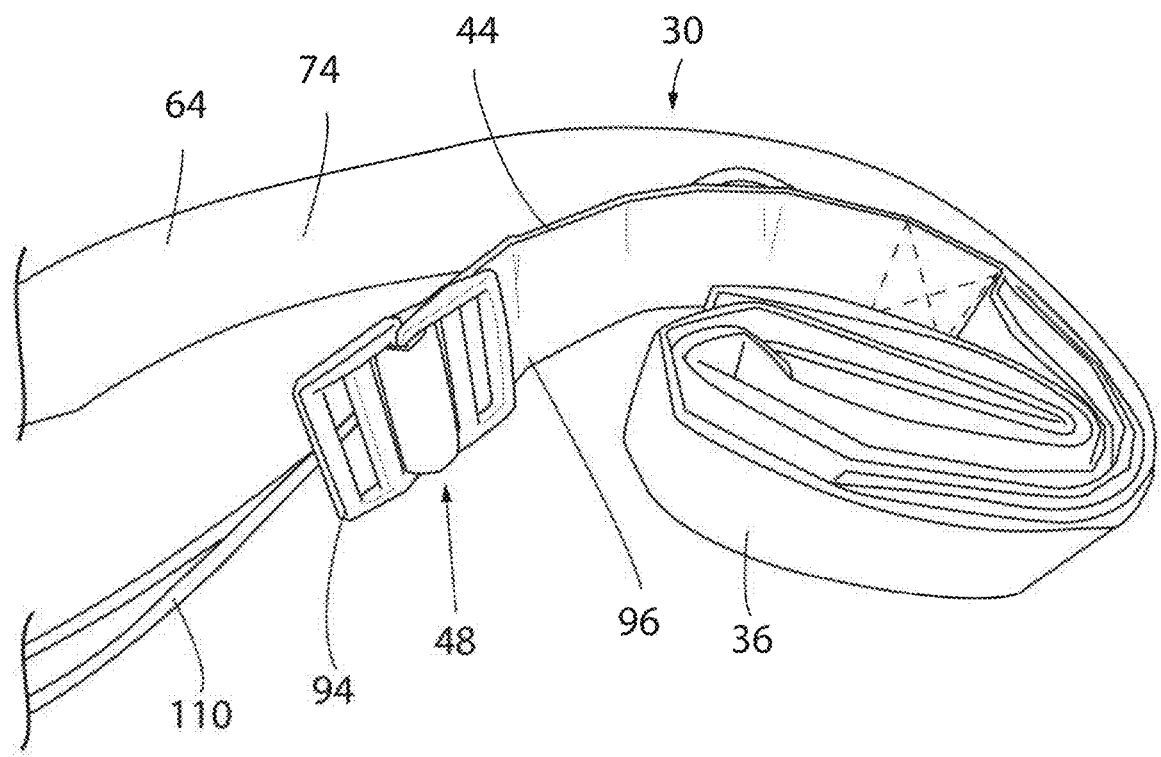
Figure 10:
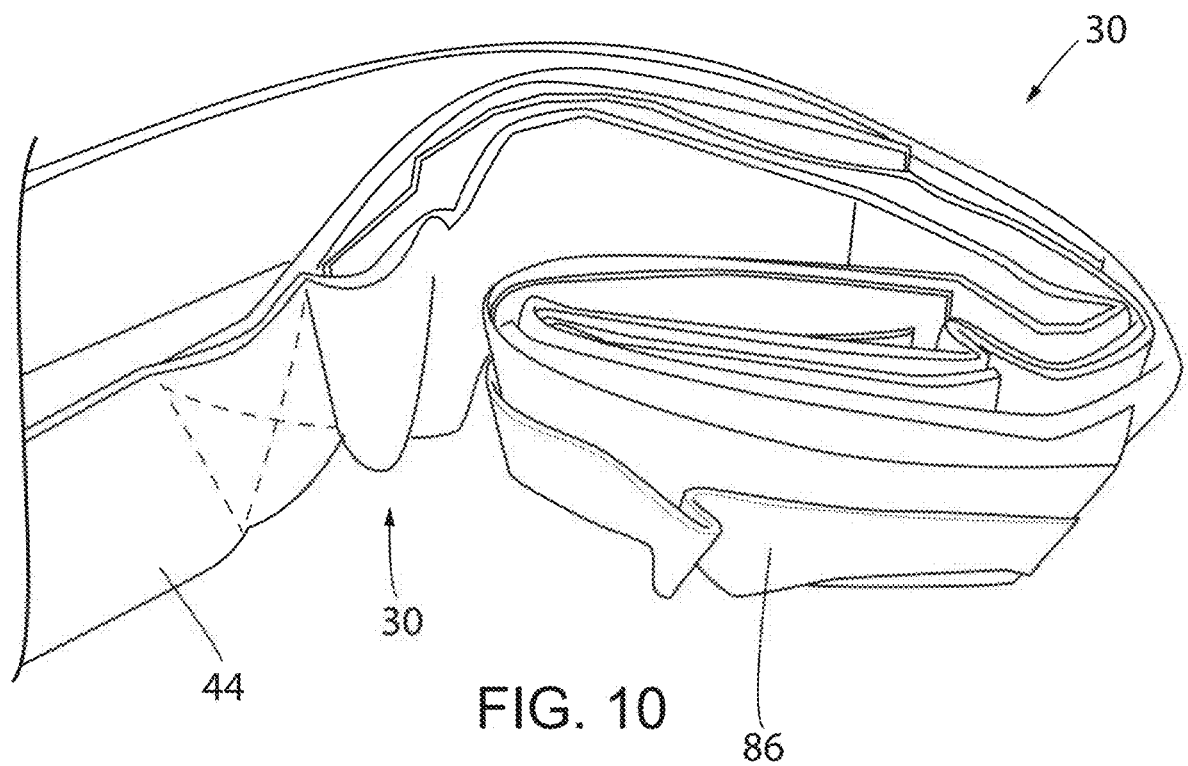
Figure 11:
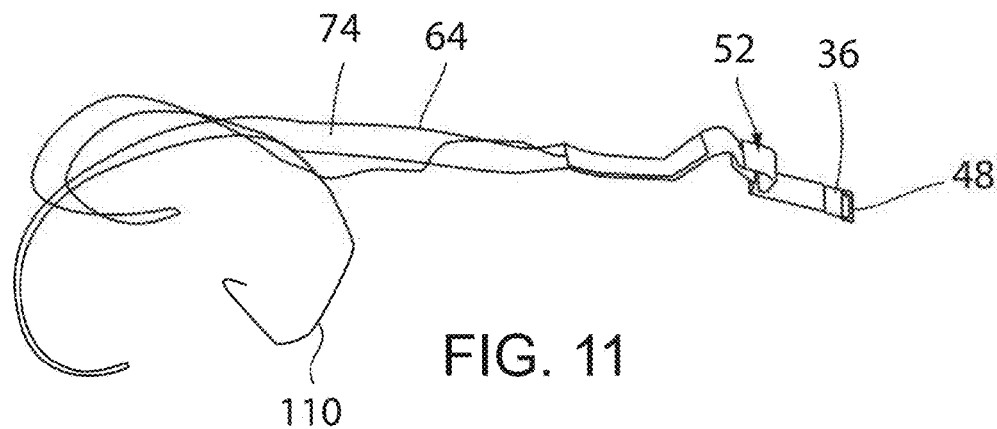
FIG. 11 illustrates a perspective view of the inventive belt of FIGS. 5-10 in a fully unwrapped position.
Figure 12:
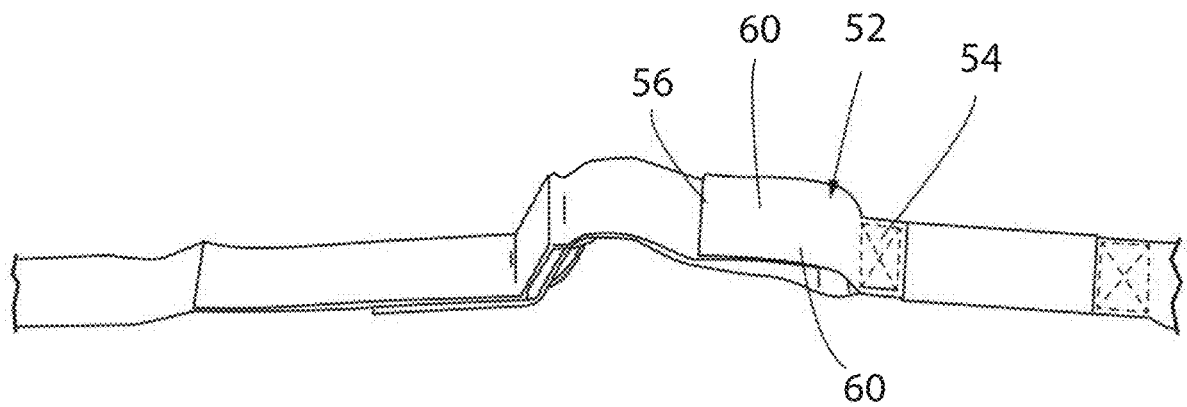
FIG. 12 illustrates another perspective view of the underside of the inventive belt of FIGS. 5-11 in a fully unwrapped position.
Figure 13:
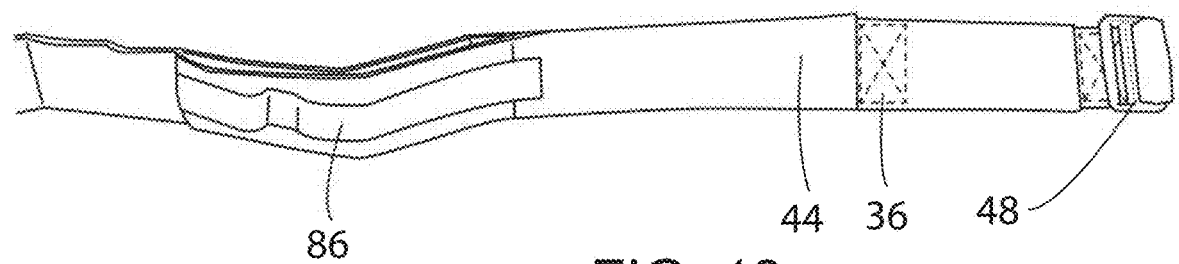
FIG. 13 illustrates another perspective view of the top side of the inventive belt of FIGS. 5-12 in a fully unwrapped position.
Figure 14:
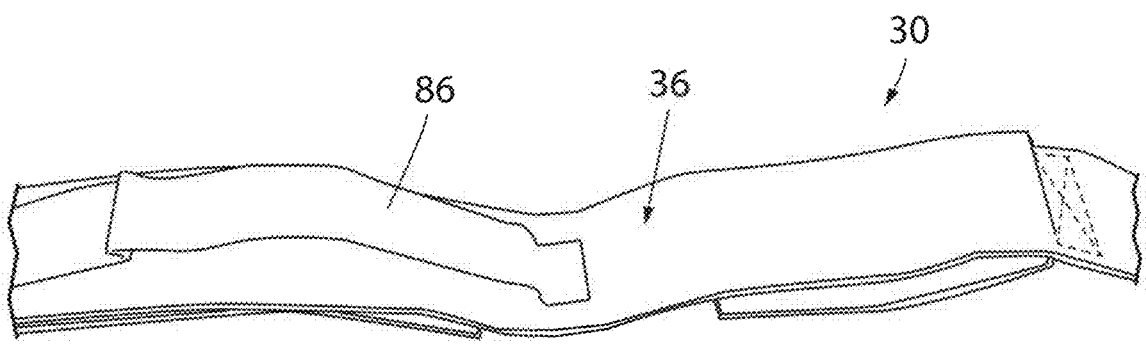
FIG. 14 illustrates another perspective view of the inventive belt of FIGS. 5-13, and more specifically, a first handle located about a second end of the first elongated strap.
Figure 15:
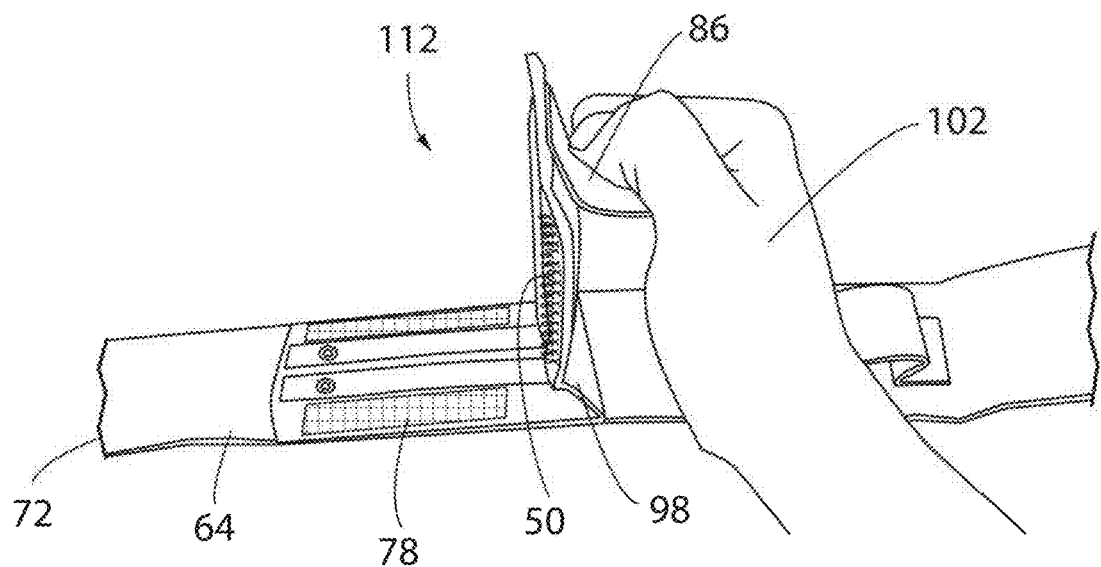
FIG. 15 illustrates another perspective view of the inventive belt of FIGS. 5-14 and, more specifically, the second end of the first elongated strap being pulled in a first direction away from an intermediate portion of the second elongated strap to separate a first and fourth fasteners.
Figure 16:
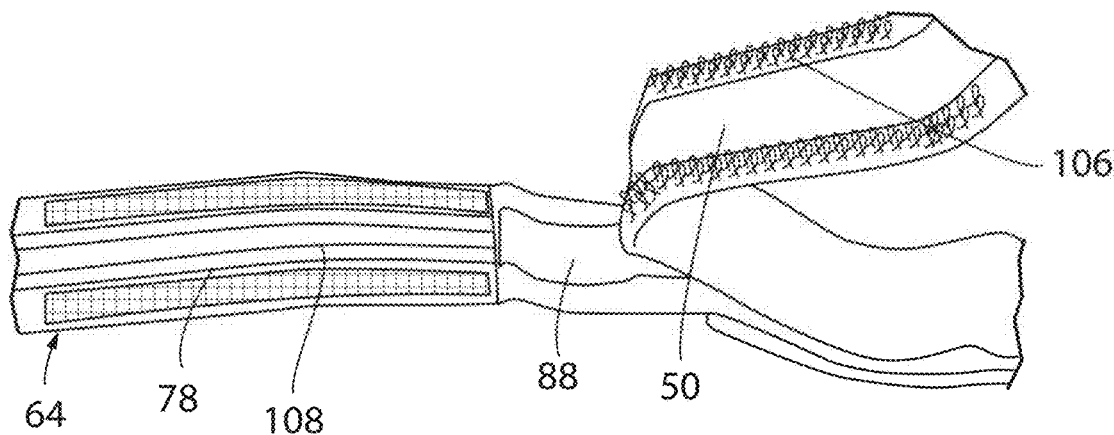
FIG. 16 illustrates another perspective view of the inventive belt of FIGS. 5-15 and, more specifically, the second end of the first elongated strap after the bond between the first and fourth fastener has been broken.
Figure 17:
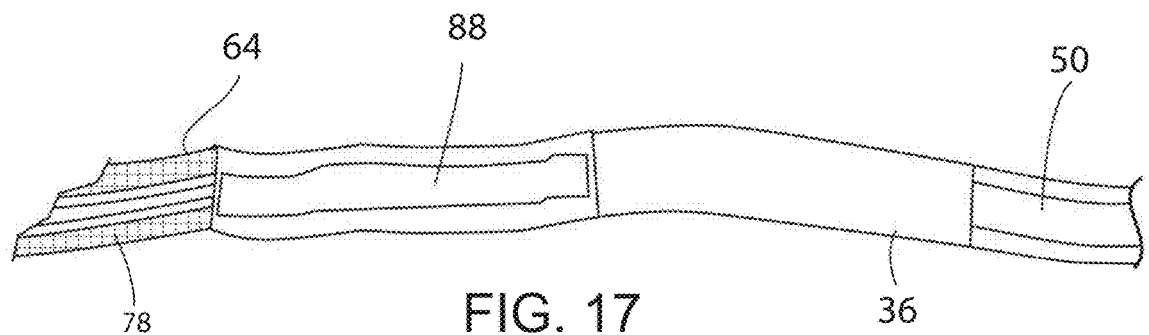
FIG. 17 illustrates another perspective view of the inventive belt of FIGS. 5-16 and, more specifically, a second handle mounted to an upper surface of the first end of the second elongated strap once the bond between the first fastener and the fourth fastener has been broken.
Figure 18:
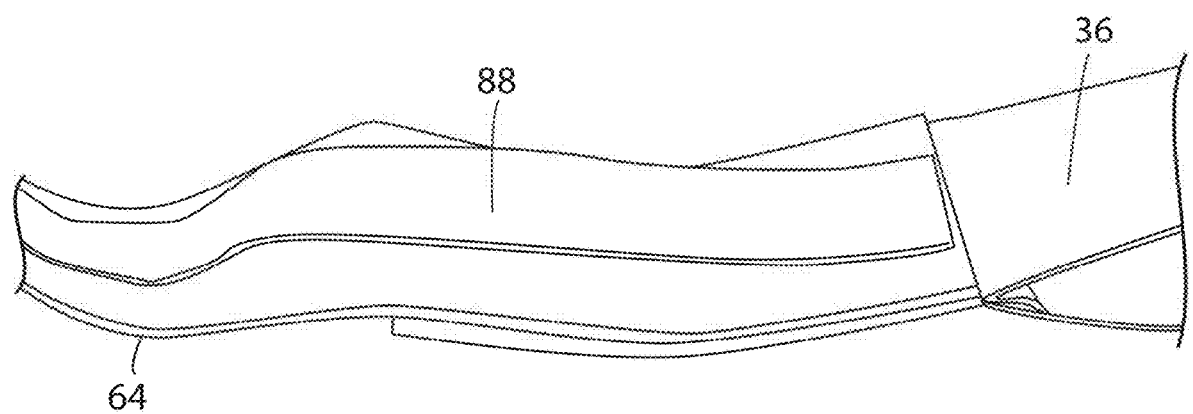
FIG. 18 illustrates another perspective view of the inventive belt of FIGS. 5-17 and, more specifically, a detailed view of the second handle mounted to an upper surface of the first end of the second elongated strap.
Figure 19:
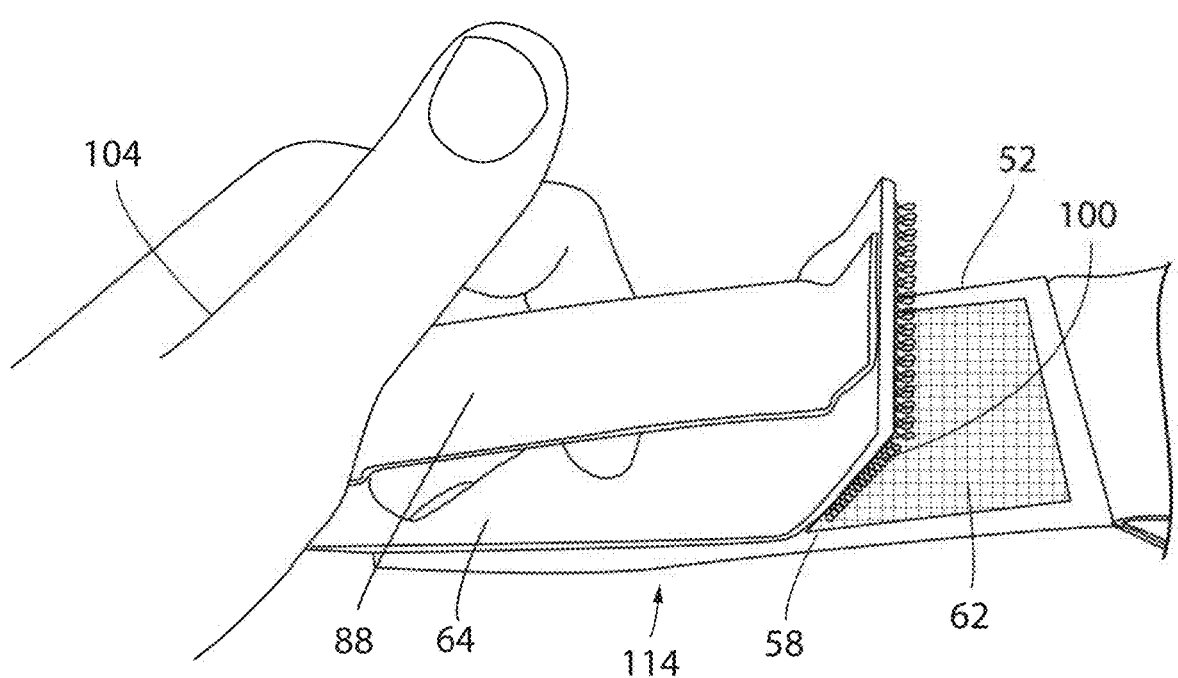
FIG. 19 illustrates another perspective view of the inventive belt of FIGS. 5-18 and, more specifically, a first end of the second elongated strap being pulled in a second direction away from an upper side of a shortened strap attached to the first elongated strap to separate a second fastener from a third fastener.

Next, the second elongated strap 64 will be described, which again is best seen in FIGS. 2 and 4. Somewhat similar to the first elongated strap 36, the second elongated strap 64 has a first end 66, a second end 68, and an intermediate portion 70 located between the first end 66 and the second end 68. The second elongated strap 64 may also have an upper side 72 and an underside 74. Additionally, a third fastener 76 and a fourth fastener 78 may be associated with the second elongated strap 64. More specifically, the third fastener 76 may be mounted along the underside 74 of the first end 66 of the second elongated strap 64. The fourth fastener 78 may be mounted along the upper side 72 of the intermediate portion 70. Also, the second elongated strap 64 may have a handle 88 that is mounted to the upper side 72 of the second elongated strap 64 along the first end 66. Further still, the second elongated strap 64 may have a fifth fastener 90 located about the second end 68. The fifth fastener 90 can hold the double-release alarm belt 30 in a wrapped position 92, as shown in FIG. 5. FIGS. 6-11 show the double-release alarm belt 30 as it is unwrapped. Additionally, the fifth fastener 90 can be used to secure the second end to the double-release alarm belt 30 once installed about the patient 34 and the device 32. As shown in FIGS. 6, 15, 16, 17, 19, and 20, each of the fasteners 50, 62, 76, 78 may be selected from one of a hook fastener 106 and a loop fastener 108.

In an alternative embodiment, see FIGS. 53-56 for example, the double-release alarm or audible reminder belt 1030 has a first elongated strap 1036, a slider 1038, and an alarm system, such as audible reminder system 1040. The slider 1038 may have a first end 1042 and a second end 1044, where the slider 1038 may be slidable about the first elongated strap 1036 at the first end 1042, and releasably affixed to the first elongated strap 1036 at the second end 1044 about a first portion 1046 of the belt 1030. Additionally, the first elongated strap 1036 may have a first end 1048 and a second end 1050 that are also releasably affixed to one another about a second portion 1052 of the belt 1030. When the first elongated strap 1036 and the slider 1038 are disengaged about the first portion 1046, the audible reminder system 1040 may create an audible reminder based on input from a cord 1039 associated with the belt 1030. In this way, the double-release audible reminder belt 1030 provides medical personnel with an advanced warning before the patient 1034 is able to disengage the slider 1038 from the first elongated strap 1036 about the first portion 1046 to get up from the device 1032.

Next, the slider 1038 will be described, see FIGS. 60-65 for example. As described above, the slider 1038 has a first end 1042 and a second end 1044. The first end 1042 consists of a top portion 1066 and a bottom portion 1068 that are attached on either end, such that the top portion 1066 and bottom portion 1068 create an opening 1070 therein. The opening 1070 is configured to receive the first elongated strap 1036. As such, the slider 1038 may be slidable relative to the first elongated strap 1036. For instance, looking to FIG. 61, the slider 1038 is shown in a first position, in FIG. 62 the slider 1038 is shown in a second position where it is slid to the left relative to the strap 1036, and in FIG. 63 in a third position where it is slide further to the left relative to the strap 1036. This allows the belt 1030 to be customizable based on characteristics of the patient 1034, the device 1032, and any of the factors that could be relevant. The second end 1044 of the slider 1038 only has a top portion 1072. On the top side of the top portion 1072, the slider 1038 has a first release handle 1074 mounted thereon. As shown, the first release handle 1074 may be oriented horizontally, that is, parallel with the length of the first elongated strap 1036. As shown the first release handle 1074 is affixed to the second end 1044 at the outermost edge 1076 of the slider 1038. This allows any pulling force on the release handle 1074 to be applied directly to the edge of the slider 1038. This helps to simplify the disengagement of the fasteners that will now be described. A bottom fastener 1078 may be located on the bottom side of the top portion 1072. The bottom fastener 1078 may be compatible with a top fastener 1080 mounted to the first elongated strap 1036. For instance, these fasteners 1078, 1080 may be of a compatible hook and loop fastener material, which would allow the top portion 1072 of the slider 1038 and the first elongated strap 1036 to be releasably secured to one another. Additionally, these fasteners 1078, 1080 may be color coded to help simplify the process of assembling the belt 1030 prior to use.

Figure 64:
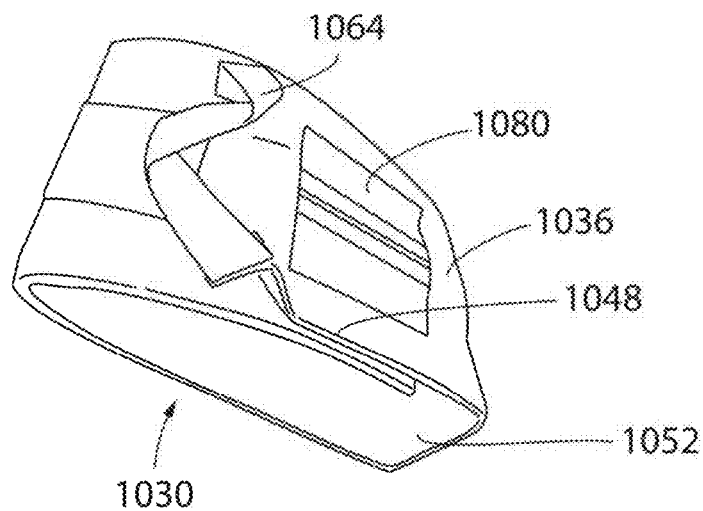
FIG. 64 illustrates a detailed view of the top side of the second release handle of the inventive predictive audible reminder belt of the present invention.
Figure 65:
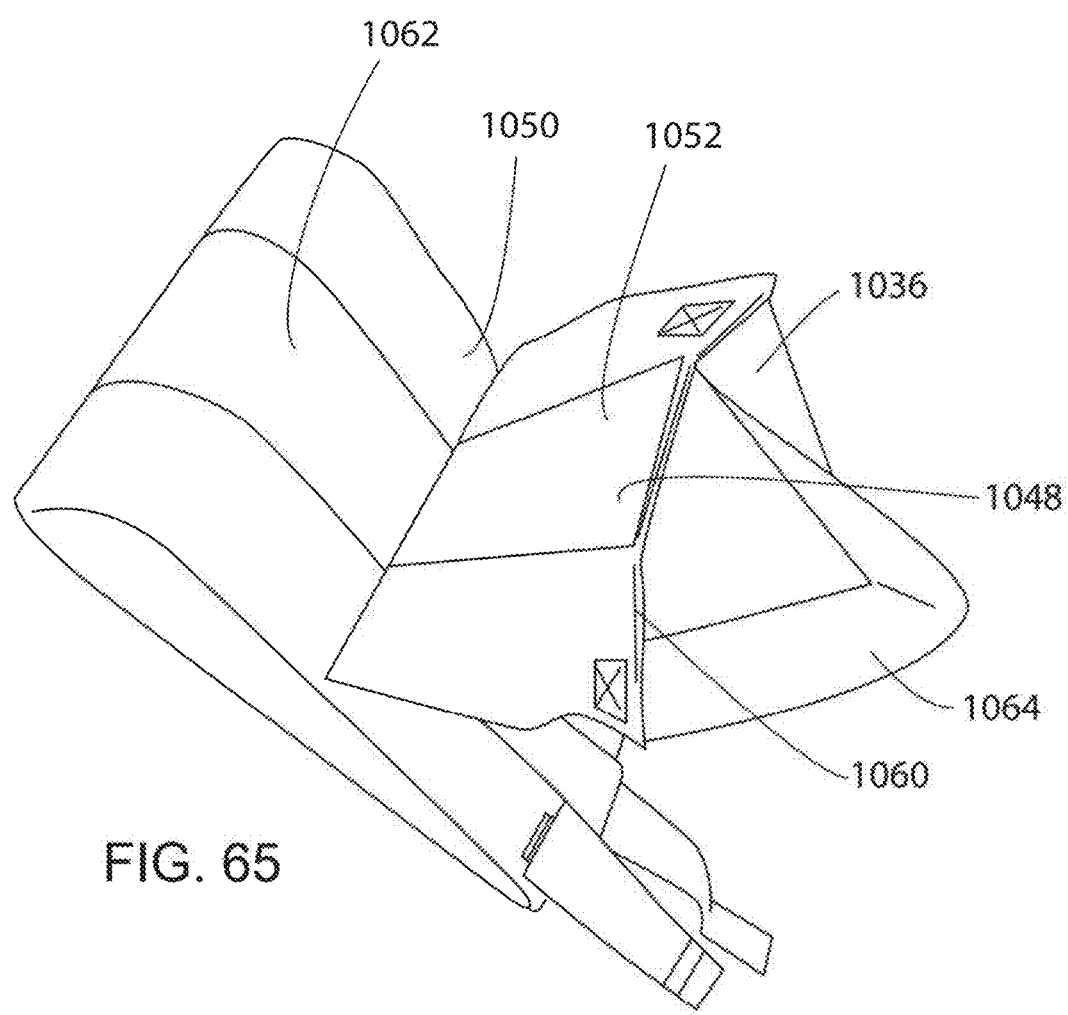
FIG. 65 illustrates a detailed view of the top side of inventive predictive audible reminder belt of the present invention when the second release handle is pulled to partially disengage a hook and loop fastener of a bottom elongated strap.

Next, the first elongated strap 1036 will be described, see FIGS. 64-65 for example. The first elongated strap 1036 can be seen. As mentioned, the first elongated strap 1036 has a first end 1048, a second end 1050 opposite the first end 1048, and a midportion 1054 located between the first end 1048 and the second end 1050. Additionally, the first elongated strap 1036 may have an upper side and an underside. For instance, the upper side 1056 may be made of a first material and the underside 1058 may be made of a second material. For instance, the upper side 1056 may be made of a substantially slippery material that helps to enable the belt 1030 to move about the device 1032, such as bed, without catching, which could cause discomfort to the patient 1034. The underside 1058 may be made of a less slippery material, for instance a material having some friction, to ensure the underside 1058 remains generally in place relative to the patient 1034 upon installation.

The first end 1048 may be releasably secured to the second end 1050. More specifically, the first end 1048 may have a first fastener 1060 located on the underside 1058 of the belt, and the second end 1050 may have a second fastener 1062 located on the upper side 1056 of the belt 1030. For instance, these fasteners 1060, 1062 may be of a compatible hook and loop fastener material, which would allow the first end 1048 and the second end 1050 to be releasably secured to one another. The illustrated second fastener 1062 may be elongate and extend along a substantial portion of the strap 1036. See FIG. 63. Additionally, these fasteners 1060, 1062 may be color coded to help simplify the process of assembling the belt 1030 prior to use. Additionally, the strap 1036 may have a second release handle 1064 to help facilitate the separation of the first fastener 1060 and the second fastener 1062. For instance, as shown, the second release handle 1064 is vertically oriented, that is, perpendicular to the length of the belt 1030. The second release handle 1064 is located directly adjacent to the first end 1048 of the strap to ensure that forces applied to the second release handle 1064 are applied to separate the fasteners 1060, 1062. Once the connection between the fasteners 1060, 1062 has been broken, the front side of the belt 1030 is open, such that the patient 1034 can exit the belt 1030 and leave the device 1032. Additionally, as shown specifically in FIGS. 60-62, the slider 1038 may initially cover the second release handle 1064 until the first release handle 1074 has been used to disengage the fasteners 1078, 1080.

Additionally, as seen in FIGS. 56-59 for example, the belt 1030 includes at least one securement strap that is configured to secure the belt to the device 1032. As shown, the belt 1030 has a first securement strap 1082 and a second securement strap 1084, where the straps 1082, 1084 are configured to engage with opposing ends of the device 1032. As shown, the straps 1082, 1084 may be secured to opposing sides of the bed, for instance, a frame or underlying structure of the bed. This may be achieved by having additional fasteners located on an underside of each strap 1082, 1084. More specifically, each strap has a first fastener 1086 and a second fastener 1088 compatible with the first; for instance, hook and loop fasteners. As such, when the belt 1030 is applied to the device 1032, the fasteners 1086, 1088 are disengaged with one another, after which the straps 1082, 1084 are wrapped around the device 1032, as shown, the bed frame. Once the strap 1082, 1084 has been wrapped around the device 1032, the fasteners 1086, 1088 can be re-engaged with one another to secure the strap 1082, 1084 around the device 1032. For instance, as shown, the straps 1082, 1084 are initially wrapped around the outside of the device 1032, and then they are wrapped upwardly around the device 1032 such that the connection between the fasteners 1086, 1088 occurs beneath or on the inside of the device 1032. This may be preferable because it makes it more difficult for an individual to remove the belt 1030 completely from the device 1032 without appropriate permission. To help simplify this process, the straps 1082, 1084 may include a label that indicates which side of the strap 1082, 1084 should face outwardly. Additionally, the fasteners 1086, 1088 may be hook and loop fasteners having a relatively strong grip, which again helps to prevent inadvertent or unauthorized removal of the belt 1030 from the device 1032.

Figure 58:
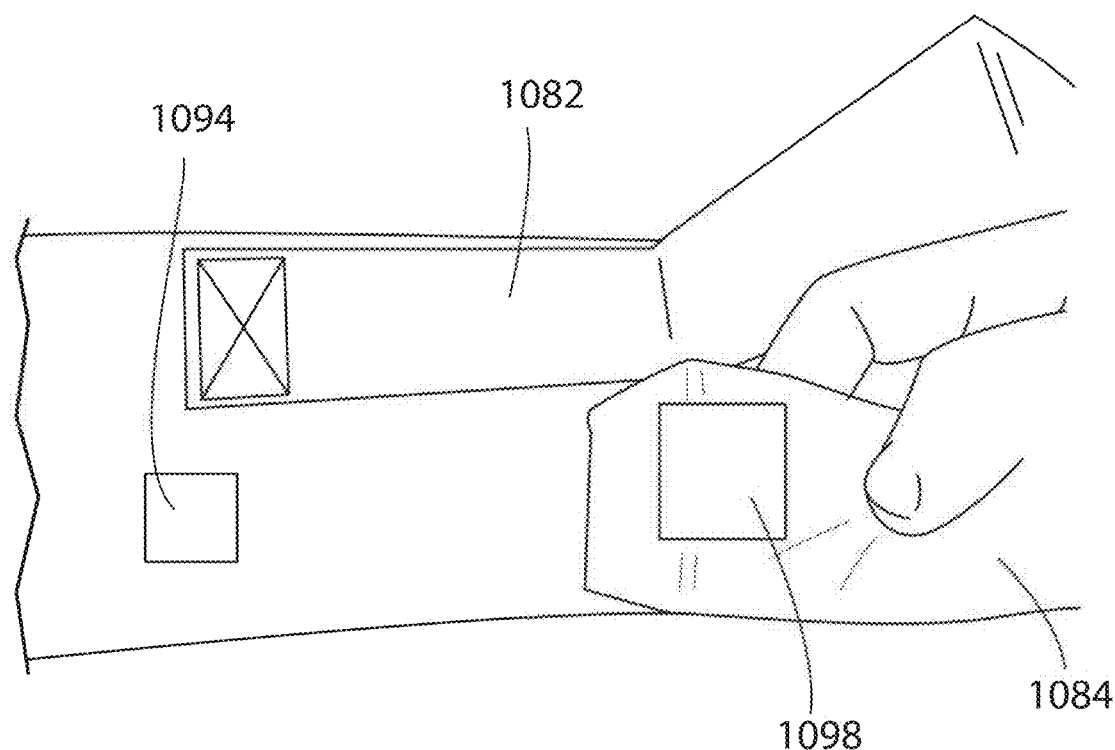
FIG. 58 illustrates a detailed view of the bottom side of inventive predictive audible reminder belt of the present invention once the hook and loop fastener are disengaged to release the first securement strap.
Figure 59:
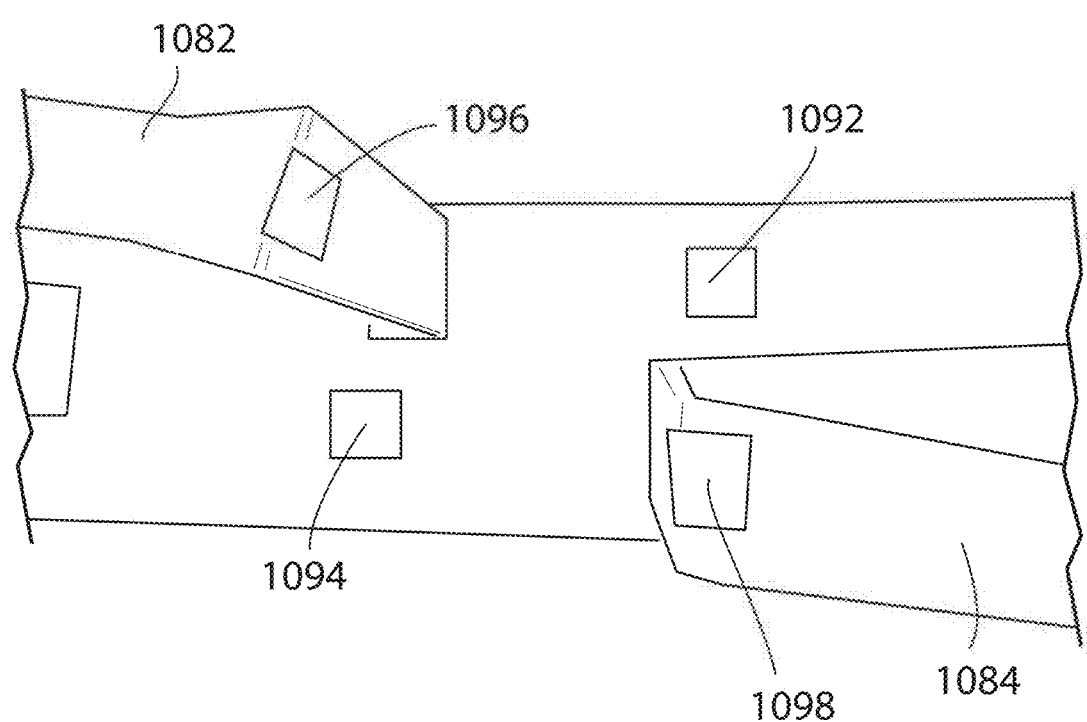
FIG. 59 illustrates a detailed view of the bottom side of inventive predictive audible reminder belt of the present invention once a second hook and loop fastener are disengaged to release a second securement strap.
Figure 60:
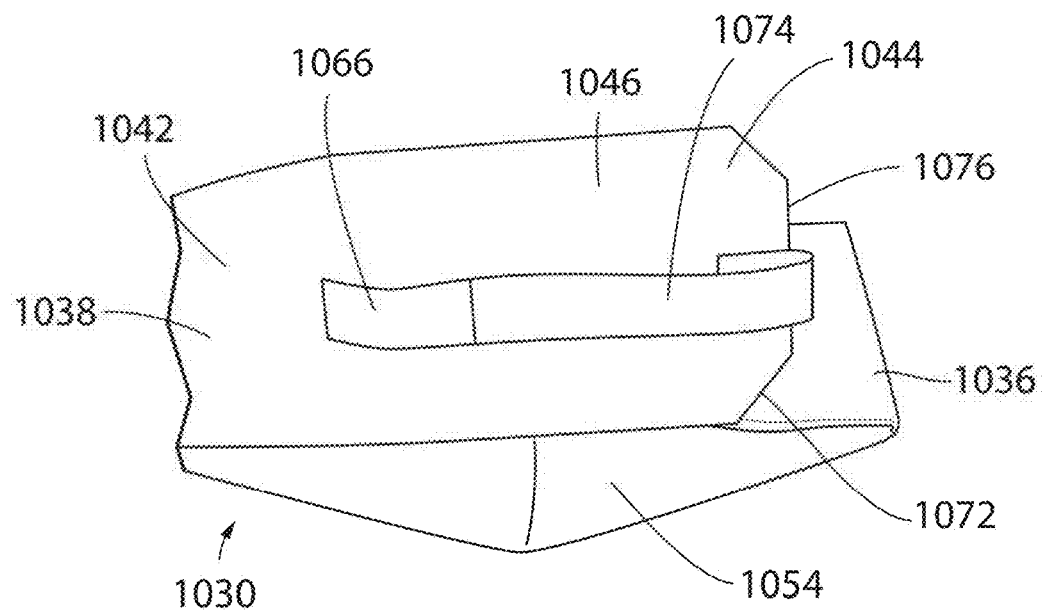
FIG. 60 illustrates a detailed view of the top side of inventive predictive audible reminder belt of the present invention with a first release handle.
Figure 61:
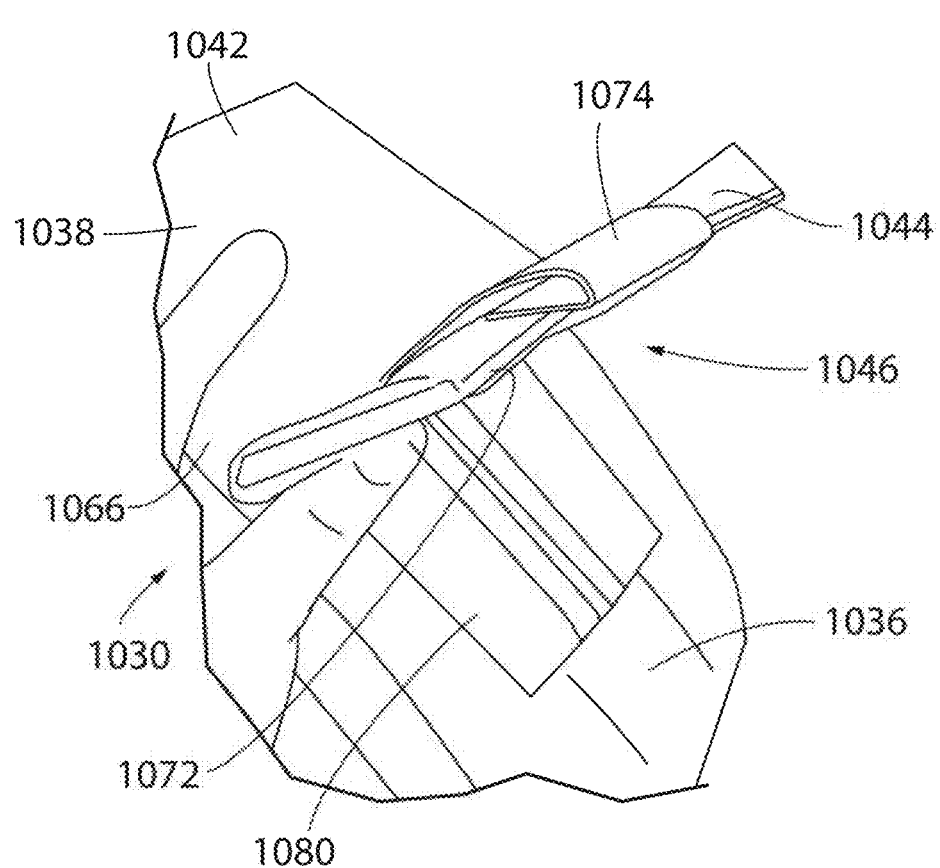
FIG. 61 illustrates a detailed view of the top side of inventive predictive audible reminder belt of the present invention when the first release handle is pulled to partially disengage a hook and loop fastener of a top elongated strap.
Figure 62:
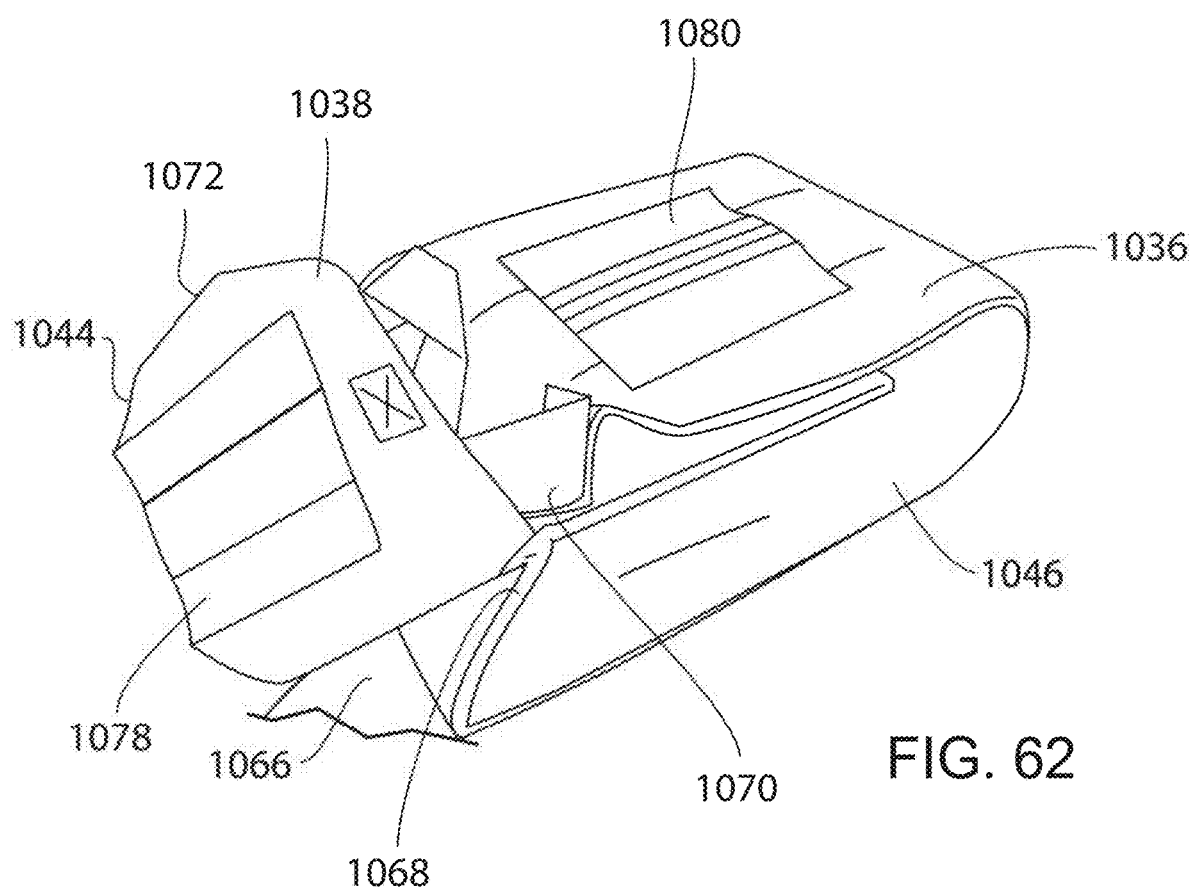
FIG. 62 illustrates a detailed view of the top side of inventive predictive audible reminder belt of the present invention when the first release handle is further pulled to move a slider to reveal a second release handle.
Figure 63:
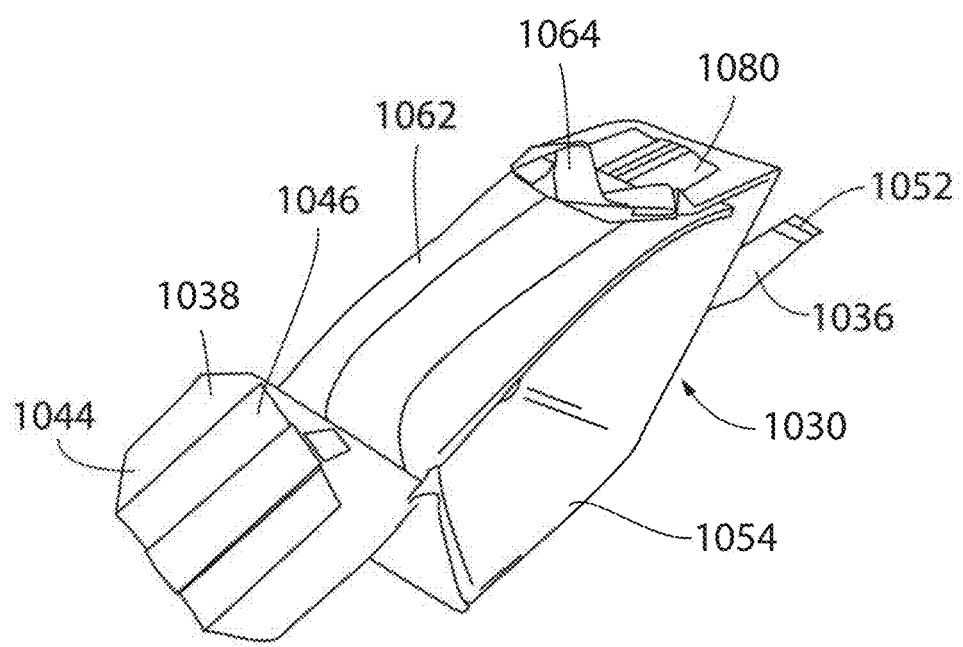
FIG. 63 illustrates a detailed view of the top side of inventive predictive audible reminder belt of the present invention when the first release handle is further pulled to move the slider to reveal a fastener that can be used to secure the second release handle in place.

Also, the first elongated strap 1036 may include additional fasteners located on the upper side 1056 that can help to appropriately locate the securement straps 1082, 1084 in place. More specifically, as shown in FIGS. 58 and 59, the elongated strap 1036 may include a first fastener 1092 and a second fastener 1094 that are compatible with a fastener 1096 associated with the first securement strap 1082 and a fastener 1098 associated with the second securement strap 1084. As a result of these fasteners 1092, 1094, 1096, 1098, the securement straps 1082, 1084 are naturally located where they should be relative to the elongated strap 1036 when the belt 1030 comes out of the packaging. Thereafter, the fasteners 1092, 1094, 1096, 1098 can help return the securement straps 1082, 1084 to the rightful position while and after the belt 1030 is in use. Additionally, the fasteners 1092, 1094, 1096, 1098 allow the securement straps 1082, 1084 to separate from the elongated strap 1036 portion when a patient 1034 moves from side to side.

While a number of fasteners are described above as hook and loop fasteners, other types of fasteners could similarly be used, such as snaps, adhesive, ties, and the like. Additionally, as shown and mentioned above, any of the compatible fasteners can be color-coded to simplify the assembly or re-assembly process. For instance, the first fastener 50 and the fourth fastener 78 are made of white hook and loop fasteners. Similarly, the second fastener 62 and the third fastener 76 are made of blue hook and loop fasteners. In this way, medical personnel can easily re-assemble the double-release audible reminder belt 30 without risk of engaging the wrong fasteners with one another. This is especially helpful where the double-release alarm belt 30 is reusable. Also, the handles 64, 74 can be a different color from the rest of the double-release audible reminder belt 30, so that they can more easily be seen and distinguished from the other parts of the belt 30. For instance, the handles 86, 88 may be a fluorescent yellow. Further still, depending on the functionality of the fasteners, hook and loop fasteners having a varying level and securement to one another may be used. For instance, where the fasteners should be easily separated, the bond between the hook and loop fasteners will be less strong than the bond between hook and loop fasteners associated with components that need to be more securely fastened to one another.

Each of the components above, including the first elongated strap 36, the shortened strap 52, the second elongated strap 64, and the slider 1038 may be disposable. Additionally, the cord 110, which can be disengaged from the audible reminder system 80, can also be disposable. For instance, the disposable version of the belt 30 could be made of a silver conductive fabric, as well as a nylon or foam laminate. These materials are typically less expensive in comparison to the materials needed to manufacture previous reusable belts. Additionally, the disposable version could have hook and loop fasteners as opposed to buckles, which can be expensive. For instance, the disposable materials may be 25-75% less expensive than those associate with traditional belts, and more preferably 40-50% less expensive than traditional belts. Such a configuration would be especially appealing in situations where the double-release audible reminder belt 30 is used in hospital settings or other environments where sterility must be maintained. By having an affordable disposable alarm belt 30, the belt 30 can simply be thrown away after use without the need to sterilize a previously-used belt, which can be time-consuming and costly. Alternatively, in situations where sterility is not a concern, the double-release audible reminder belt 30 could be reusable. For instance, such a configuration could include materials such as nylon webbing, seat belt buckles, biothan webbing, and silver conductive fabric. Alternatively, any aspect of the belt 30 could be made of any other number of materials, including non-woven materials, such as plastic or paper. Regardless of the material, the belt 30 is preferably configured to be able to withhold forces of over 100 pounds before failure.

Possible dimensions of the first elongated strap 36, the shortened strap 52, and the second elongated strap 64 will now be described. However, it should be noted that straps of various dimensions may be used to accommodate different uses. Additionally, it should be noted that larger straps could be used for patients with larger waist sizes or for use with larger chairs, beds, cardiac chairs, recliners, and the like.

For instance, the length of the double-release alarm belt 30 could be approximately 60-100 inches in length and, more preferably, approximately 78 inches, as shown in FIGS. 1 and 2. Additionally, typical belts 30 will be approximately 2 inches in height, although again, different dimensioned belts could be used as required by the specific use. In such an embodiment, the first elongated strap 36 could be 20-40 inches, and more preferably 27.5 inches. Additionally, in this embodiment the second elongated strap 64 could be between 75-105 inches, and more preferably 90 inches.

Figure 3:
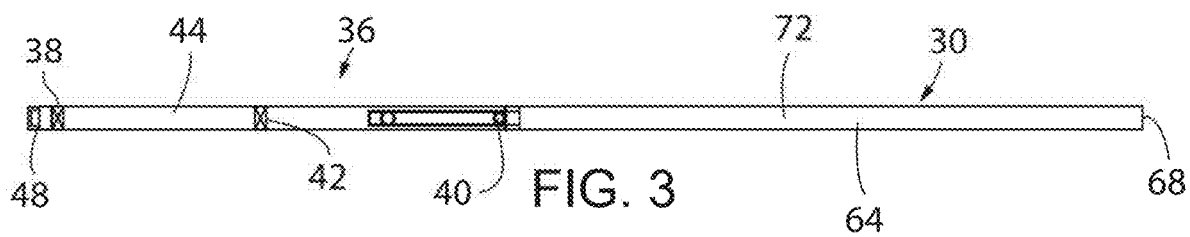

An alternative double-release alarm belt 30 could be much longer. For instance, the length of the double-release alarm belt could be approximately 70-110 inches in length and, more preferably, approximately 92 inches as shown in FIGS. 3 and 4. Additionally, typical belts 30 will be approximately 2 inches in height, although again, different dimensioned belts could be used as required by the specific use. In this embodiment, the first elongated strap 36 could be 25-55 inches, and more preferably 40 inches. Additionally, in this embodiment the second elongated strap 64 could be between 75-105 inches, and more preferably 90 inches. As such, the same second elongated strap 64 could be used with either embodiment, with different first elongated straps 36 being used, depending on how the belt 30 will be used.

Functionality of the cord 110 and audible reminder system 80 will now be described. The cord 110 is embedded within the first or second elongated strap 36, 64 and one of the securement straps 82, 84 and monitors the locations of the fasteners 78, 80. More specifically, when the fourth fastener 78 is pulled away from the first fastener 50, the cord 110 transmits this information to the audible reminder system 80, and the audible reminder system 1040 generates an audible reminder. For instance, an electrical circuit can be completed where the fasteners 50, 78 are connected to one another. When these fasteners 50, 78 are pulled apart from one another, the electrical circuit can be interrupted. Once the circuit is interrupted, the audible reminder can be triggered. Alternatively, a cord need not be included with the system, but instead, a wireless or Bluetooth system could be used to wirelessly trigger the audible reminder system 80 to generate the audible reminder when the fasteners 78, 80 are separated. The double-release audible reminder belt 30 can be used with any number of various fall-prevention audible reminder systems, as known to those of skill in the art. For instance, the belt 30 can be used with various POSEY® fall audible reminders, including POSEY KEEPSAFE, POSEY KEEPSAFE DELUXE, POSEY KEEPSAFE SCOUT, and POSEY SITTER ELITE fall audible reminders.

Figure 23:
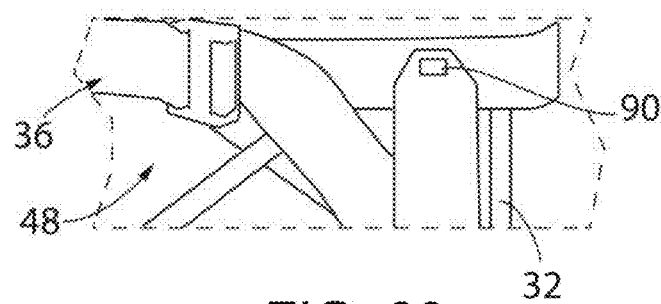
FIG. 23 illustrates a perspective view of a hook mechanism associated with the first elongated strap where the fifth fastener is engaged with the belt so that the excess strap at the second end of the second elongated strap is secured.
Figure 24:
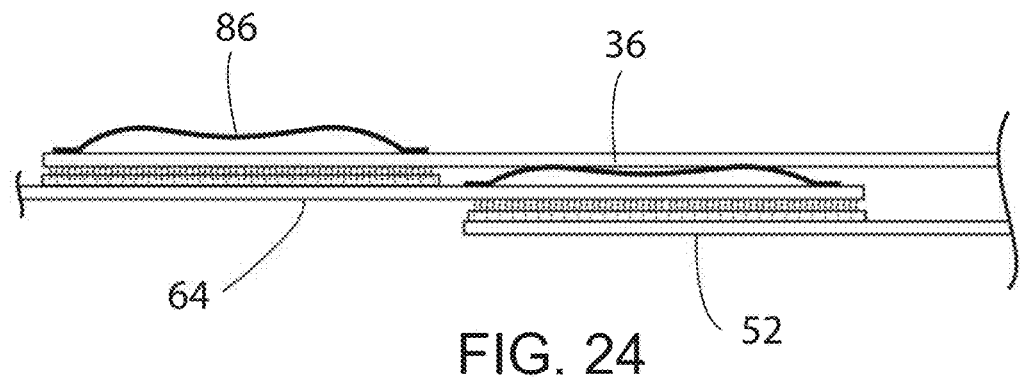
FIG. 24 illustrates a simplified side elevation view of the inventive belt where the first elongated strap, the shortened strap, and the second elongated strap are attached to one another.
Figure 25:
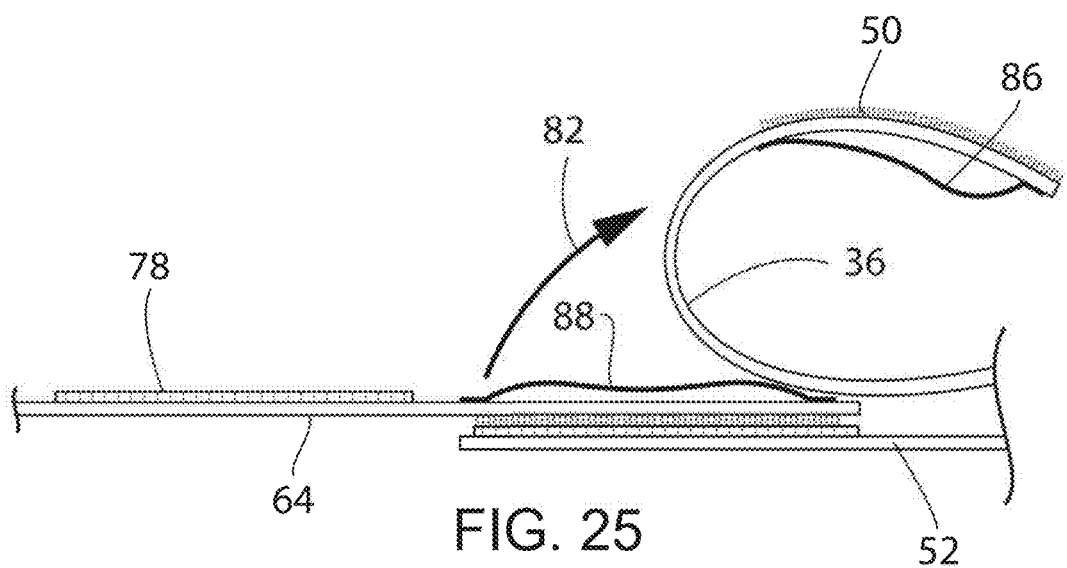
FIG. 25 illustrates a simplified side elevation view of the inventive belt where the first elongated strap is being pulled in a first direction away from the intermediate portion of the second elongated strap to separate the first fastener from the fourth fastener.
Figure 26:
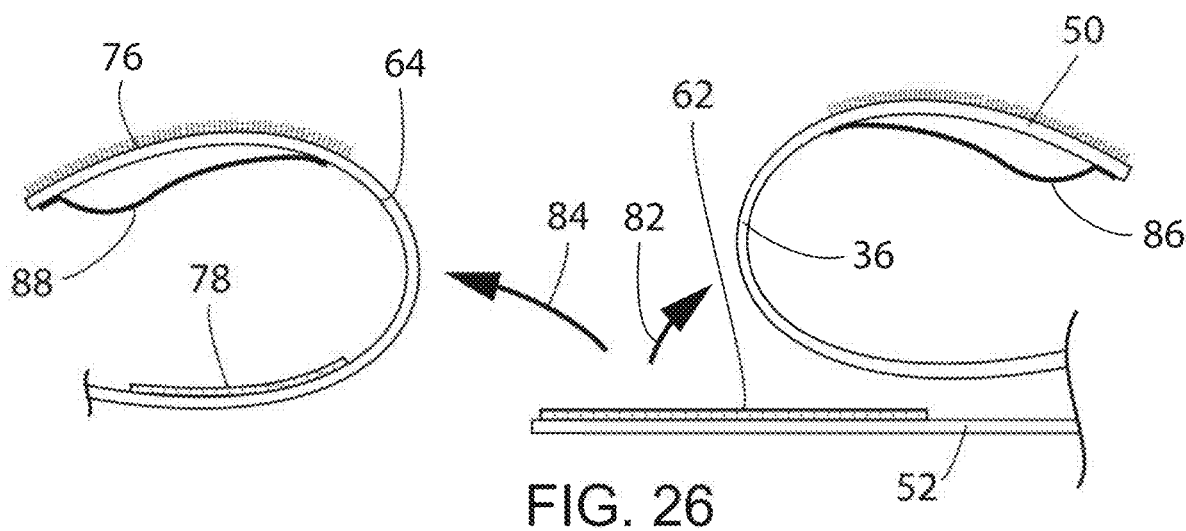
FIG. 26 illustrates a simplified side elevation view of the inventive belt where the second elongated strap is being pulled in a second direction opposite the first direction from the shortened strap that is attached to the first elongated strap to separate the second fastener from the third fastener.
Figure 52:
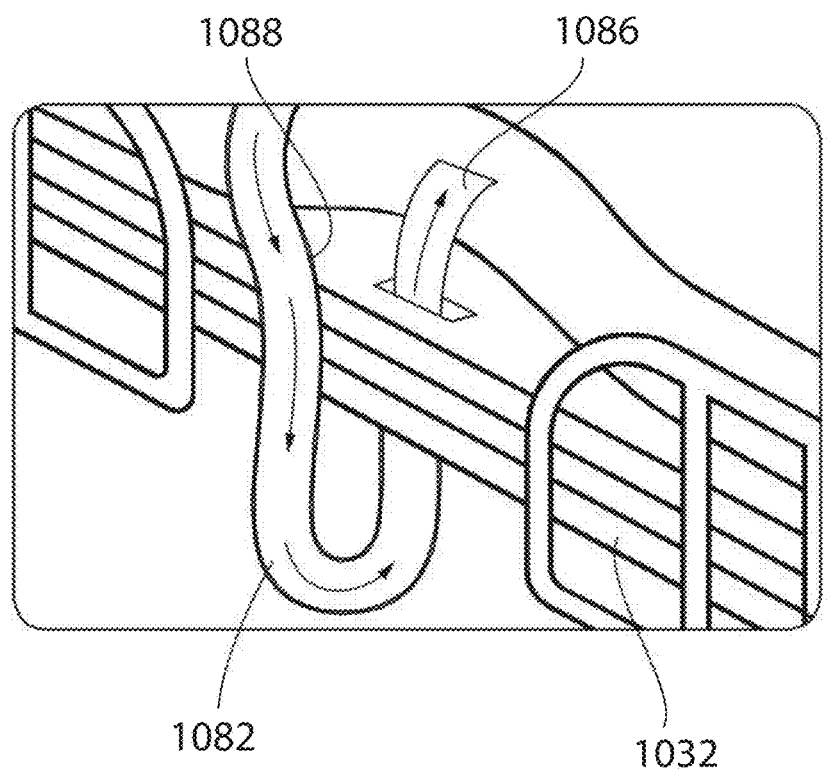
FIG. 52 illustrates a perspective view of the inventive predictive audible reminder belt being installed to the bed using a securement strap that is looped around a frame of the bed.
Figure 53:
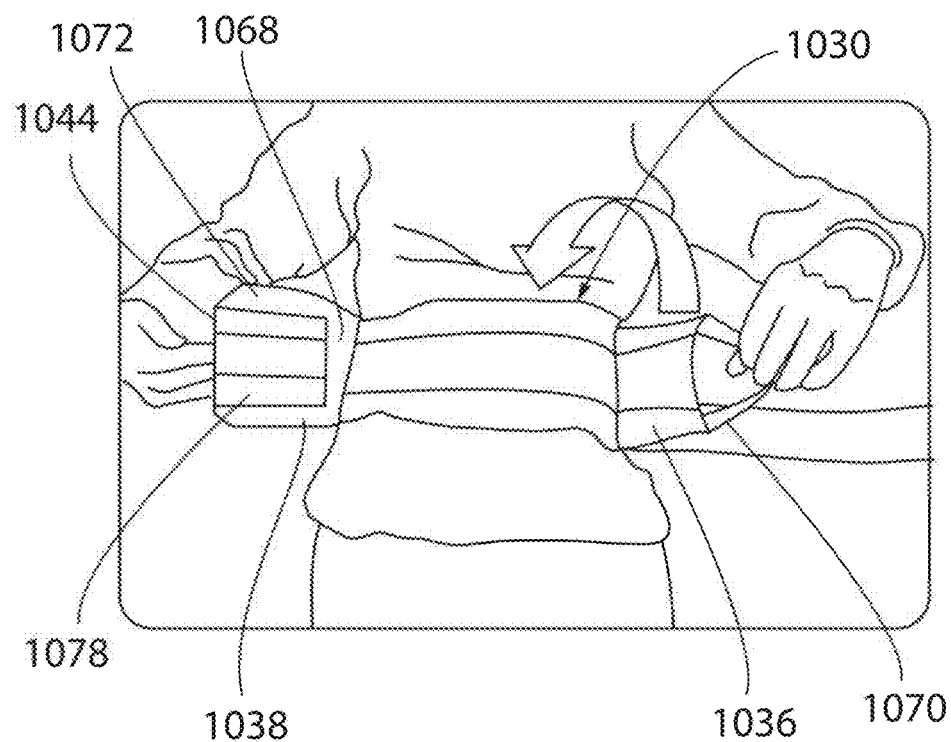
FIGS. 53-54 illustrates a perspective view of the inventive predictive audible reminder belt being installed relative to the patient.
Figure 54:
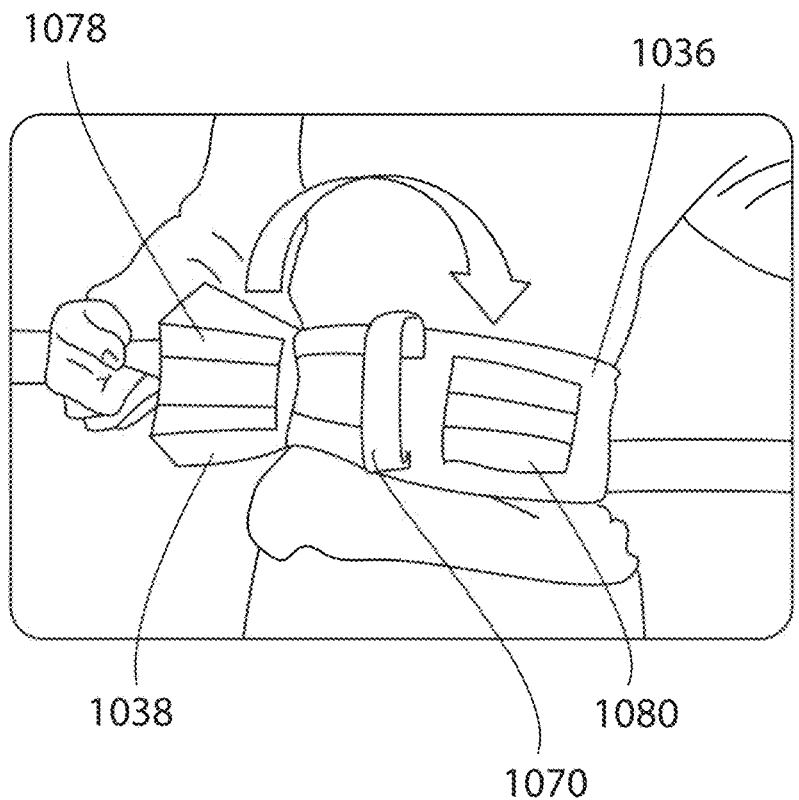
Figure 55:
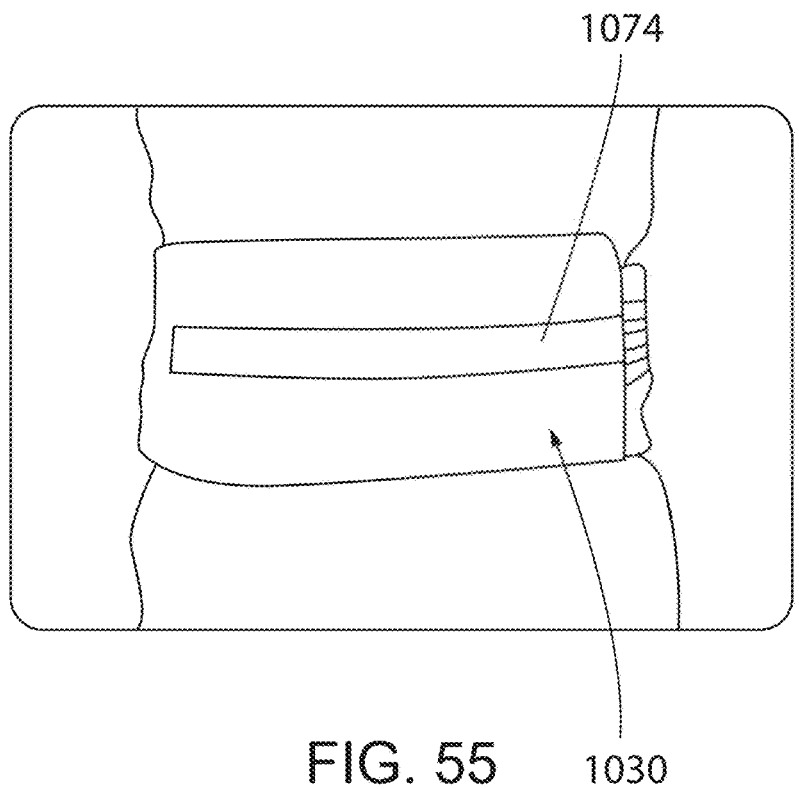
FIG. 55-56 illustrates a perspective view of the inventive predictive audible reminder belt once it is installed relative to the patient, as well as relative to a bed.
Figure 56:
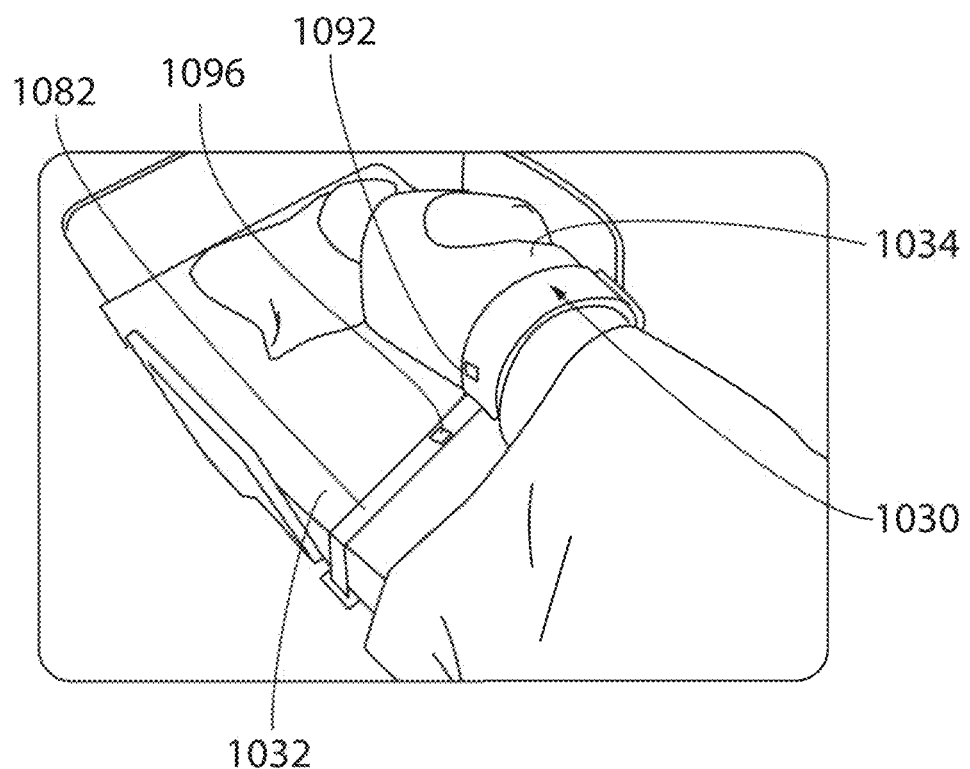
Figure 57:
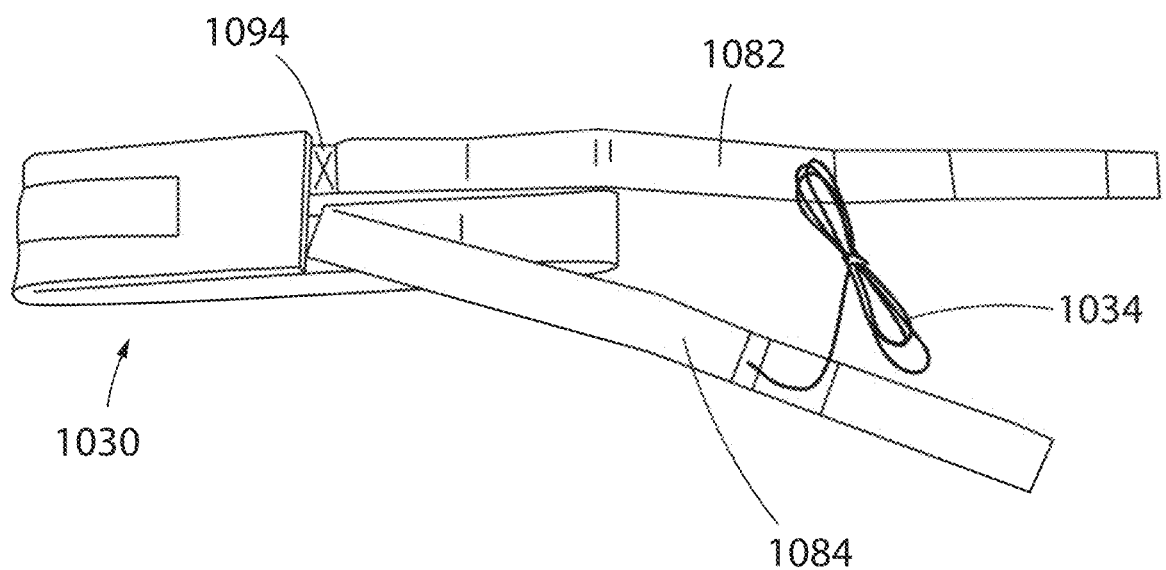
FIG. 57 illustrates a perspective view of the inventive predictive audible reminder belt of the present invention in a partially unwrapped position.

To assemble the double-release alarm belt 1030, the first fastener 1050 is releasably engaged with the fourth fastener 1078 and the second fastener 1062 is releasably engaged with the third fastener 1076. Once the double-release alarm belt 1030 has been assembled, it can be installed about the patient 1034. Initially the strap 1082 is secured relative to the device 1032 as seen in FIG. 52. After which the patient 1034 is seated or laid onto a piece supporting equipment device 1032; for instance, chairs, beds, recliners, and the like. The belt 1030 is wrapped around the patient's waist with the hook mechanism 48 located behind the patient 1034. Preferably, the belt 1030 is located at approximately a 45-degree angle relative to the ground, although the specific angle could vary depending on the comfort of the patient 1034. The position of the first end 1038 of the first elongated strap 1036 and the second end 1068 of the second elongated strap 1064 should be positioned behind the device 1032, as shown a chair back, as low as possible so that the belt 1030 cannot slide up off the chair. Next, the second end 1068 of the second elongated strap 1064 is threaded through the hook mechanism 48, as shown in FIG. 23. More specifically, the second end 1068 of the second elongated strap 1064 is first threaded through the first ring 94 and the second ring 96, then back over one ring and through the other, as known to one of ordinary skill in the art. The second end 1068 is then tightened so that it is securely held within the hook mechanism 1048 so that the belt 1030 is snug about the patient 1034 and the supporting device 1032. The medical personnel can verify that the belt 1030 is not overly constricting by sliding an open hand between the belt 1030 and the patient 1034. Finally, a fifth fastener located on the second end 1068 of the second elongated strap 1064 is engaged with a side of the double belt 103. In this way, the loose second end 1068 does not hang down on to the floor. Finally, the alarm cord 1039 is connected to the alarm system 80 by inserting a jack into a port of the alarm system. Thereafter, the alarm system 80 is turned on.

To assemble the double-release audible reminder belt 30, the first and second fasteners 60, 62 are releasably engaged with one another. The location where these fasteners 60, 62 can be determined based on the size the patient 34, the specific device 32 being used, etc. Thereafter, the slider 1038 is moved relative to the first elongated strap 36 to a desired location, after which the top fastener 80 and bottom fastener 78 are engaged with one another. The securement straps 82, 84 may be installed relative to the device 32 before the various fasteners 60, 62, 78, 80 are engaged, or thereafter. Because of the configuration of the various fasteners 60, 62, 78, 80 and the slider 1038, the size of the belt 30 may be varied depending on the size of the patient 34 even after the securement straps 82, 84 have been installed. Previous embodiments would require the securement straps 82, 84 to be reconfigured to accommodate differently sized patients. Finally, once the belt 30 has been appropriately installed, the audible reminder cord 39 is connected to the audible reminder system 1040 by inserting a jack (not shown) into a port (not shown) of the audible reminder system 1040. Thereafter, the audible reminder system 1040 is turned on.

Once the belt 30 has been installed, the position of the patient 34 about the device 32 can be monitored. In the event the patient 34 begins to disengage the double-release audible reminder belt 30, the medical personnel will be notified. This first occurs when the fasteners 78, 80 are pulled apart with a first force 102, such that the bond 98 between these fasteners 50, 78 is interrupted. Preferably, due to the locations of the fasteners 50, 78 relative to the first elongated strap 36 and the second elongated strap 64 and/or slider 1038, the separation of these fasteners 78, 80 occurs by pulling the second end 56 of the first elongated strap 36 and/or the release handle 74 in a first direction. As described above, once these fasteners 78, 80 are pulled apart, the audible reminder will sound to notify medical personnel that the patient 34 is trying to get out of the device 32. Next, the fasteners 60, 62 are pulled apart with a second force 104, such that the bond 100 between these fasteners 62, 76 is interrupted. In some embodiments, the first force 102 required to disengage the first fastener 50 and the fourth fasteners 78 is less than the second force 104 required to disengage fasteners 60, 62. Due to the locations of the fasteners 62, 76 relative to the first elongated strap 36 and the second elongated strap 64 and/or slider 1038, the separation of the fasteners 60, 62 occurs by pulling the first end 66 of the second elongated strap and/or release handle 64 in a second direction. Preferably, the first direction 82 is in the opposite direction as the second direction 84. This results in increased time and difficulty for the patient 34 to remove the double-release audible reminder belt 30 than if the patient 34 simply had to repeatedly pull two separate belts in the same direction. Furthermore, as described above, the slider 1038 may initially be covering the second release handle 64. As a result, the user would first need to disengage fasteners 78, 80 using the first release handle 74, after which the slider 1038 would need to be slid away from the second release handle 64 to expose it, after which the second release handle 64 can be grasped to separate fasteners 60, 62.

Furthermore, the bond 98 between fasteners 78, 80 can be weaker than the bond 100 between fasteners 60, 62. In this way, the patient 34 can more easily disengage the fasteners 78, 80, at which time the audible reminder will be sounded. Thereafter, due to the stronger bond 100 between the fasteners 60, 62, it will be more difficult for the patient 34 to disengage these fasteners 62, 76. This makes it more difficult for the second bond 100 to be broken, which increases the amount of time that medical staff has to approach the patient 34 after the initial alarm has been sounded. In this way, potential falls of the patient can be minimized.

A method of using the double-release alarm belt 30 will now be described. Initially, the double-release alarm belt 30 is wrapped around the patient 34 as well as the device 32. Next, the first end 38 is engaged with the second end 68 to secure the ends 38, 68 to one another. Additionally, an alarm system 80 is connected to the double-release alarm belt 30, for instance, by a cord 110. Next, the first elongated strap 36 can be disengaged from the second elongated strap 64 about a first portion 112. This can occur when the first handle 86 is pulled to disengage the first elongated strap 36 from the second elongated strap 64 about the first portion 112. Once the straps 36, 64 are disengaged about the first portion 112, the alarm system 80 creates an audible alarm. For instance, this may occur where an electrical circuit is interrupted. Alternatively, various sensors can be used to detect when the straps 36, 64 are disengaged about the first portion 112. Of course, the alarm may be sounded using any other ways known to those of ordinary skill in the art to detect when the two straps 36, 64 are disengaged from one another. Thereafter, the first elongated strap 36 can be disengaged from the second elongated strap 64 about a second portion 114. This can occur when the second handle 88 is pulled to disengage the first elongated strap 36 from the second elongated strap 64 about the second portion 114. Thereafter, the patient 34 is released such that he or she can move away from the device 32. Additional steps may include threading the second end 68 of the double-release alarm belt 30 through the first ring 94 and the second ring 96 associated with the first end 38 of the belt 30 until the double-release alarm belt 30 is snug about the patient 34. Also, the second end 68 of the double-release alarm belt 30 may be held in place using a hook and loop fastener 90.

Figure 27:
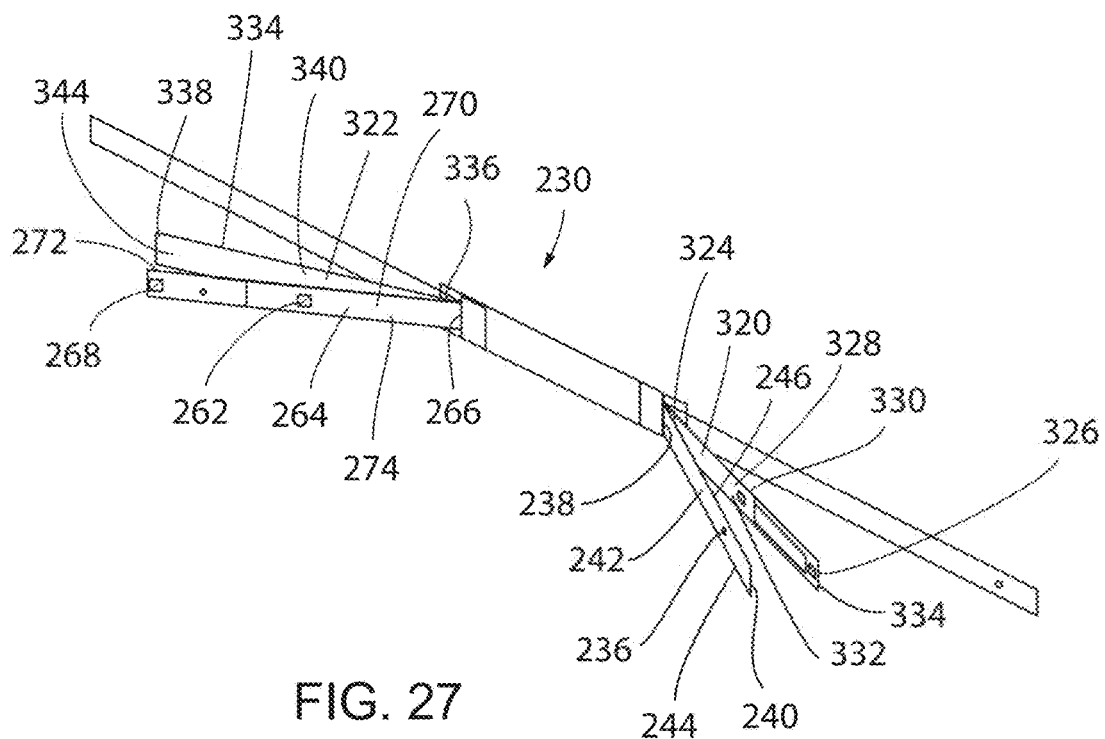
FIGS. 27-30 illustrate various isometric views of another embodiment of the inventive predictive alarm belt of the present invention.
Figure 28:
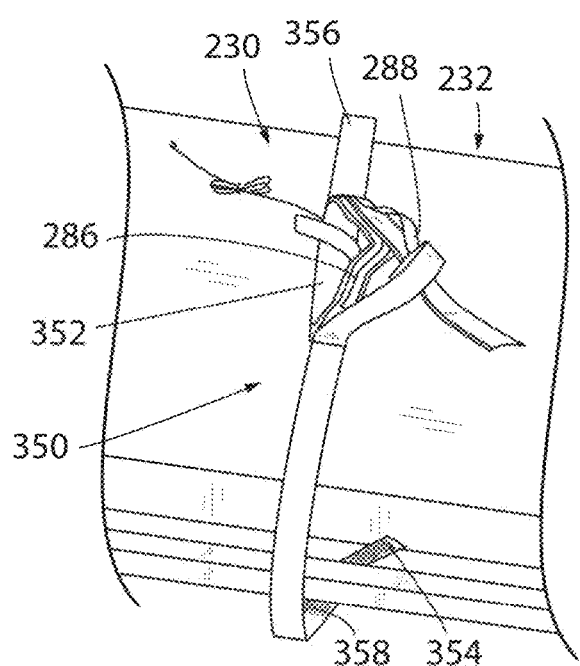
Figure 29:
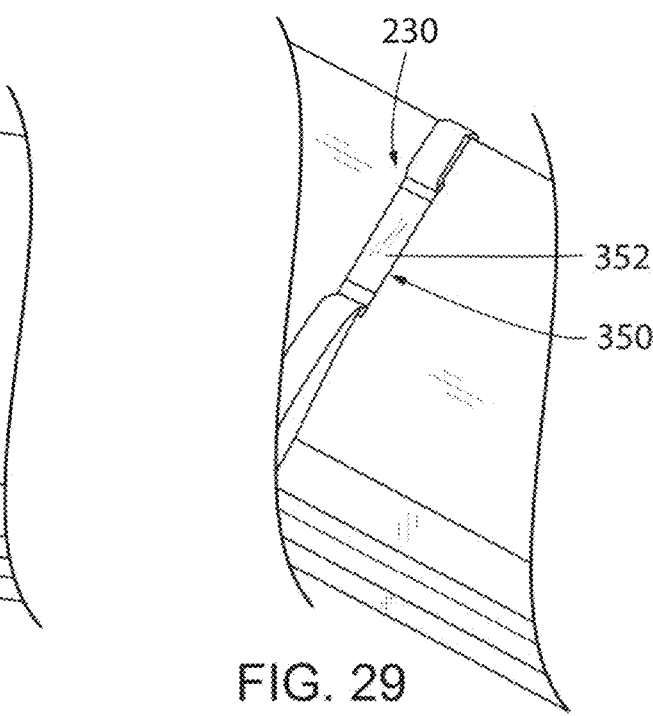

Another embodiment of the double-release alarm belt 230 is shown in FIGS. 27-34. The components found in FIGS. 27-34 that have been previously described will be designated by the same reference numbers as those provided above incremented by 200. The double-release alarm belt 230 is used to monitor the position of a patient 234 or other individual who is resting on a support device 232, as shown a bed. The double-release alarm belt 230 has a first elongated strap 236, a second elongated strap 264, and an alarm system 280. The double-release alarm belt 230 may also include a third elongated strap 320 and a fourth elongated strap 322. Additionally, the double-release alarm belt 230 includes a base 350 with a middle portion 352 and first and second ends 354, 356 having fasteners that can wrap around the support device 232. For instance, the ends 354, 356 could have hook-and-loop fasteners 358, as seen in FIG. 28. Of course, other fasteners could similarly be used to secure the belt 230 to the device 232. Once the ends 354, 356 are wrapped around the device 232, as shown frame portions of the bed, they can be fastened to themselves to secure the belt 230 in place. The middle portion 352 may be made of a thin, low-friction material that allows the patient 234 to lay on the middle portion 352 without feeling the middle portion 352. Additionally, the middle portion 352 can be made of a durable, thin, moisture-wicking fabric that ensures comfort of the patient 234 once the belt 230 is installed. This ensures that integrity about the belt 230 can be maintained while the patient 234 does not feel the middle portion 352.

The first elongated strap 236 and the second elongated strap 264 may be releasably affixed to one another about a first portion 312, and the third elongated strap 320 and the fourth elongated strap 322 may be releasably affixed to one another about a second portion 314, as will be further described below. When the first elongated strap 236 and the second elongated strap 264 are disengaged about the first portion 312, the alarm system 80 may create an audible alarm. In this way, the double-release alarm belt 230 provides medical personnel with an advanced warning before the patient 234 is able to disengage the third elongated strap 320 from the fourth elongated strap 322 about the second portion 314 to get up from the device 232.

Initially, the first elongated strap 236 will be described. The first elongated strap 236 can be seen, for instance, in FIG. 27. The first elongated strap 236 has a first end 238, a second end 240 opposite the first end 238, and a midportion 242 located between the first end 238 and the second end 240. Additionally, the first elongated strap 236 may have an upper side 244 and an underside 246. Also, a first fastener 250 may be associated with the first elongated strap 236. As shown, the first fastener 250 extends along the upper side 244 of the first elongated strap 236.

Still looking to FIG. 27, the second elongated strap 264 will be described. The second elongated strap 264 has a first end 266, a second end 268 opposite the first end 266, and a midportion 270 located between the first end 238 and the second end 240. Additionally, the second elongated strap 264 may have an upper side 272 and an underside 274. Further, a second fastener 262 may be associated with the second elongated strap 264. As shown, the second fastener 262 extends along the underside 274 of the second elongated strap 264. Additionally, the second elongated strap 264 may have a first handle 286 that is mounted to the upper side 272 of the second elongated strap 264.

Moving on, the third elongated strap 320 will be described. The third elongated strap 320 has a first end 324, a second end 326 opposite the first end 324, and a midportion 328 located between the first end 324 and the second end 326. Additionally, the third elongated strap 320 may have an upper side 330 and an underside 332. Further, a third fastener 334 may be associated with the third elongated strap 320. As shown, the third fastener 334 extends along the underside 332 of the third elongated strap 320. Further still, the third elongated strap 320 may have a second handle 288 that is mounted to the upper side 330 of the third elongated strap 320.

Moving on, the fourth elongated strap 322 will be described. The fourth elongated strap 322 has a first end 336, a second end 338 opposite the first end 336, and a midportion 340 located between the first end 336 and the second end 338. Additionally, the fourth elongated strap 322 may have an upper side 342 and an underside 344. Also, a fourth fastener 346 may be associated with the fourth elongated strap 322. As shown, the fourth fastener 346 extends along the upper side 342 of the fourth elongated strap 322.

Figure 30:
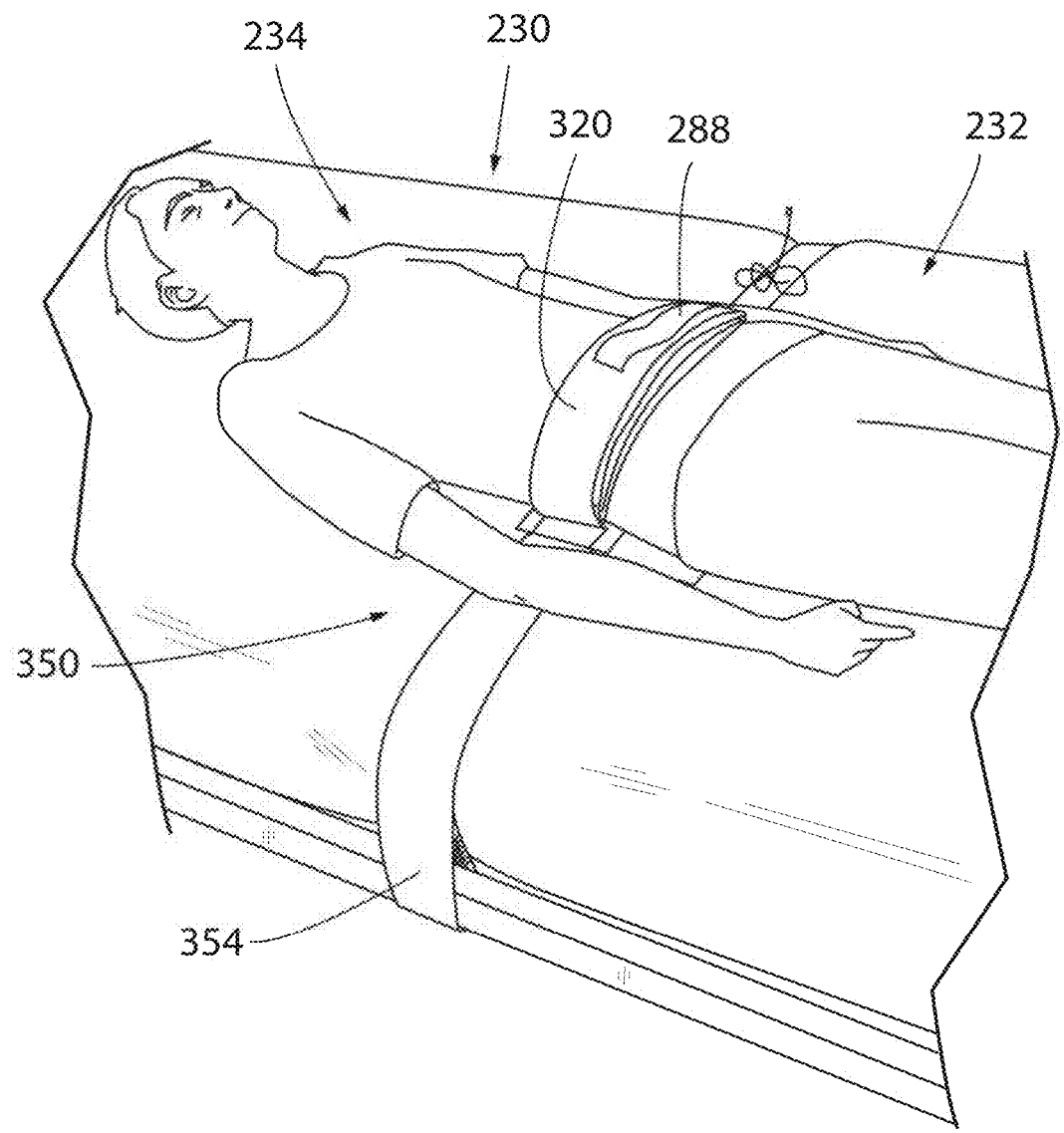
Figure 31:
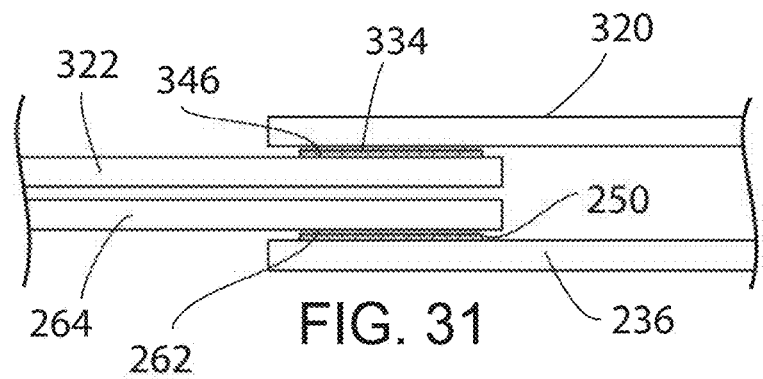
FIGS. 31-34 illustrates simplified side elevation views of the inventive belt showing the belt being released.
Figure 32:
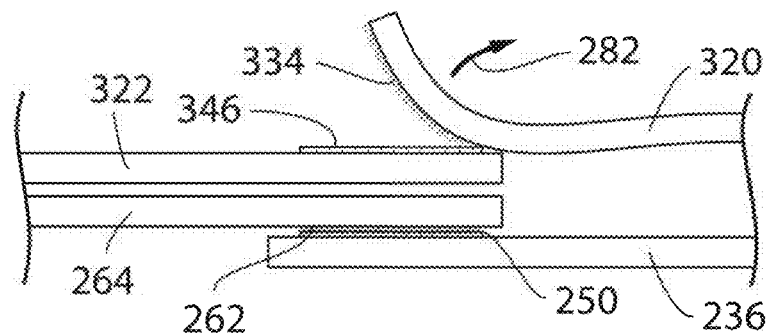
Figure 33:
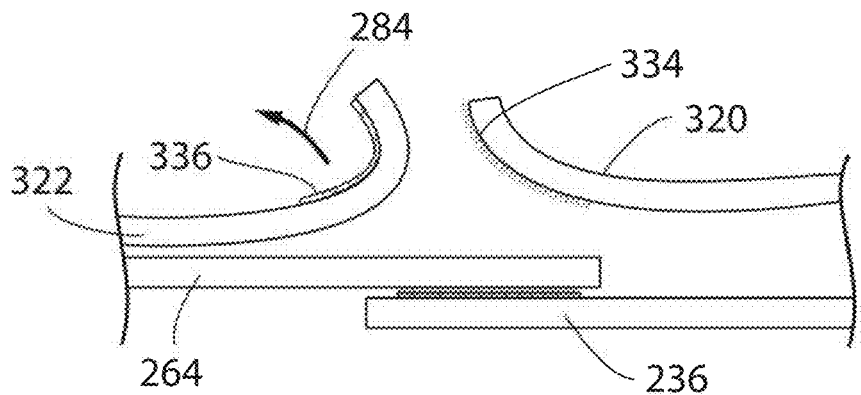
Figure 34:
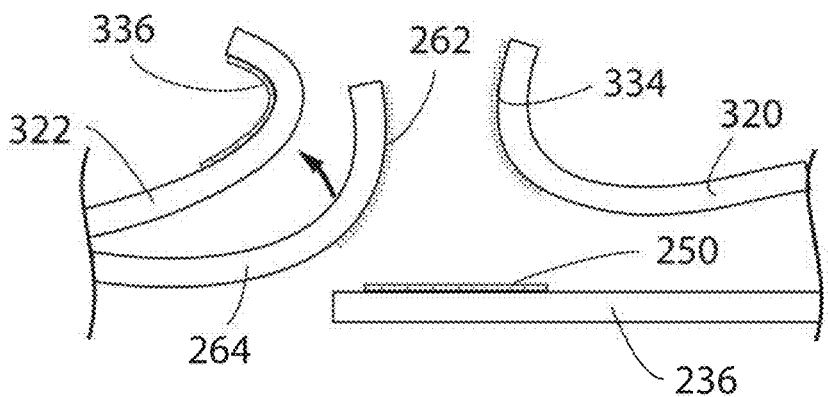
Figure 37:
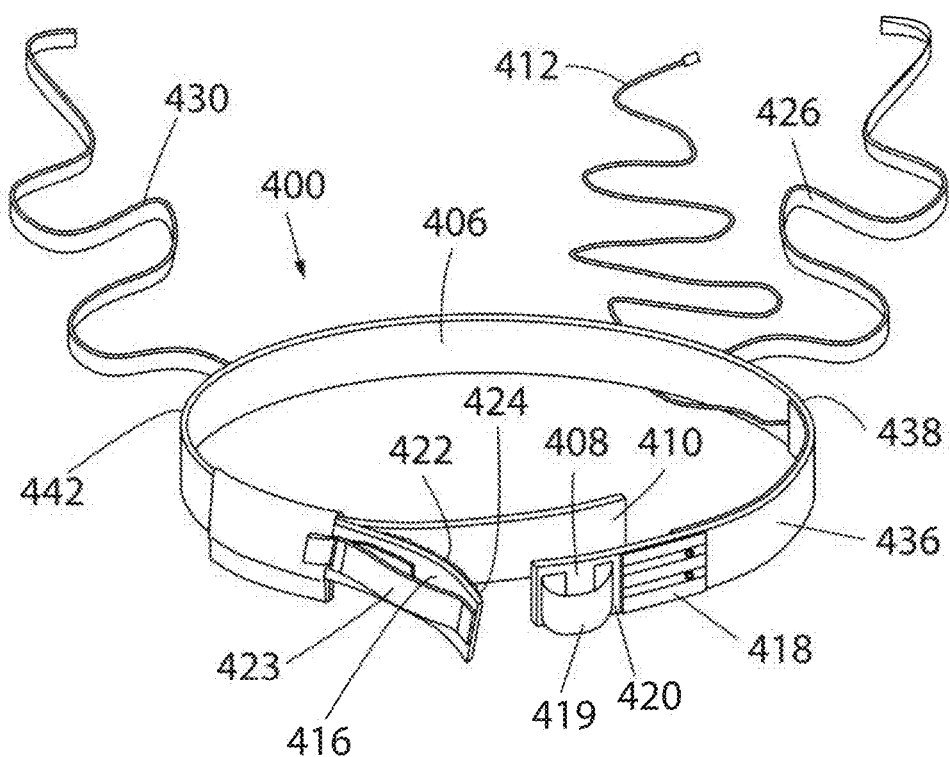
Figure 38:
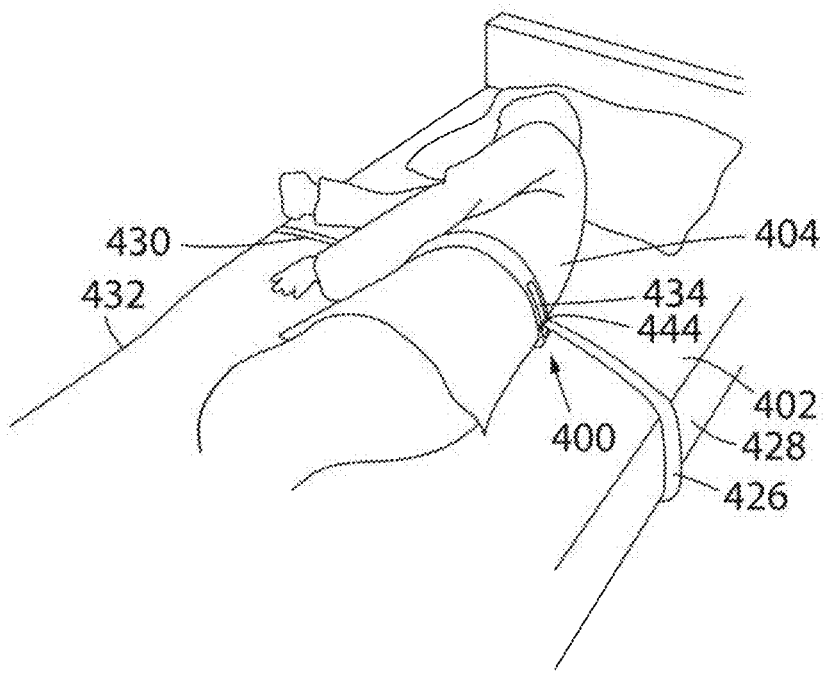
Figure 41:
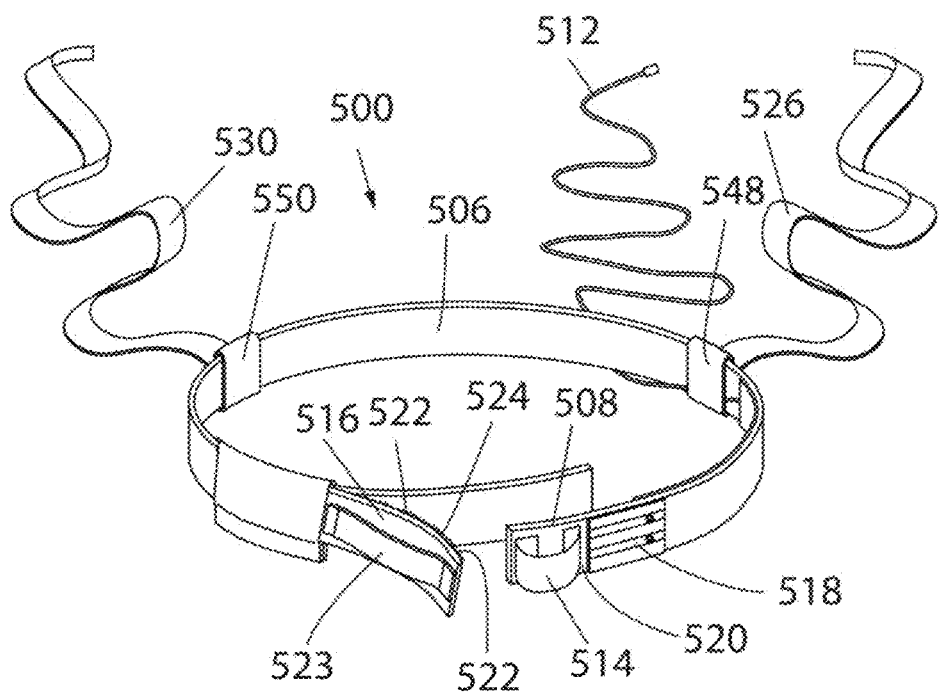
Figure 42:
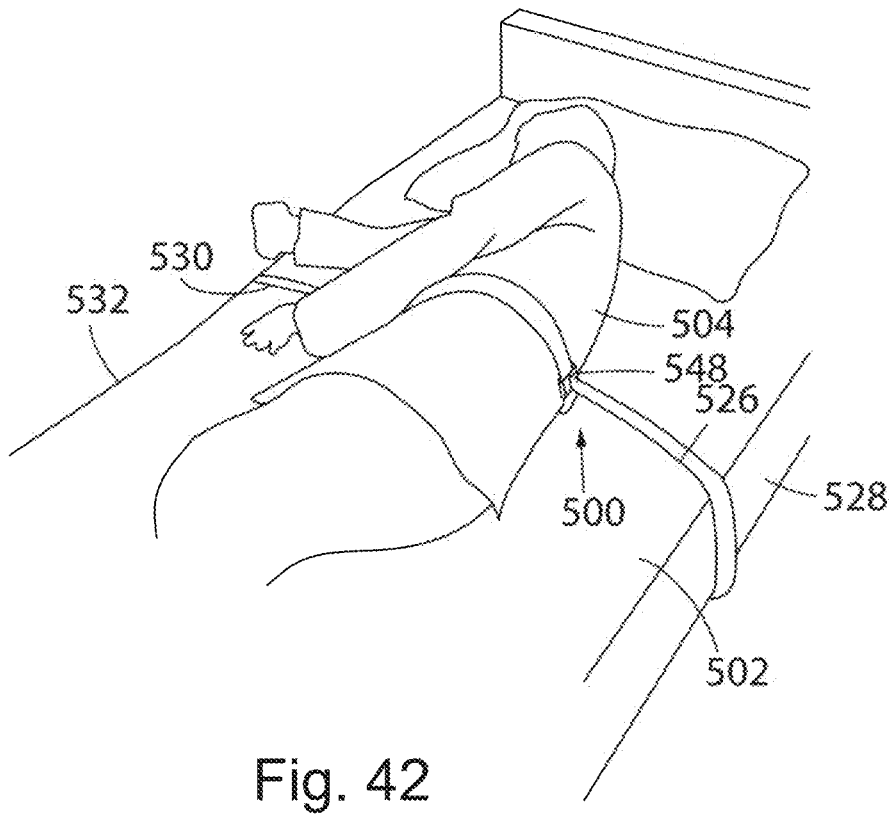
Figure 45:
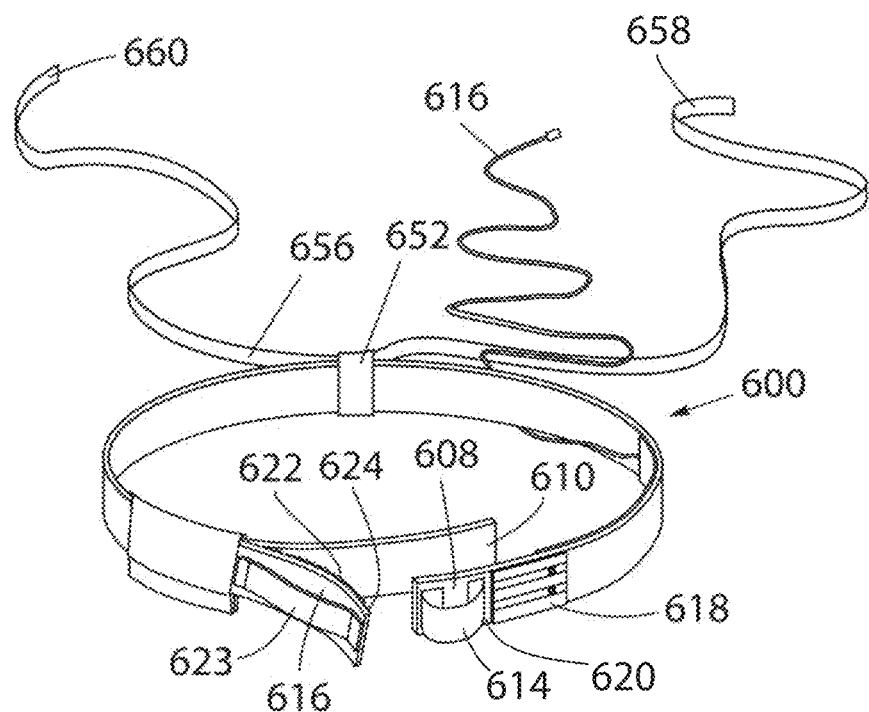
Figure 46:
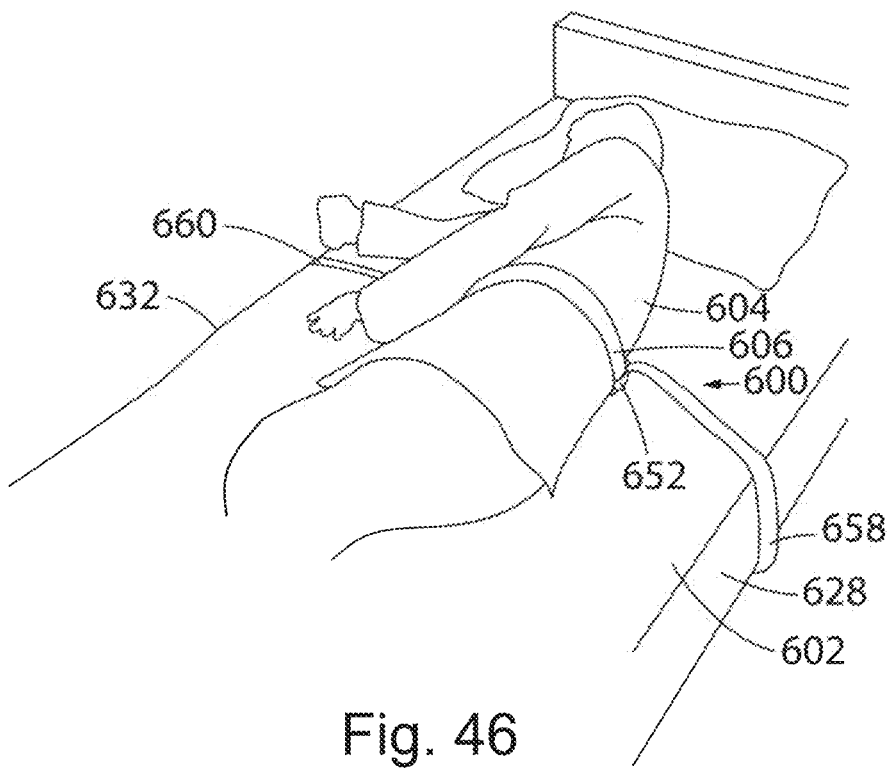

Installation of the belt will now be described. First, the first and second ends of the base are secured to the device 232 as shown in FIG. 28. Next, the patient 234 is rested on the middle portion 352. Thereafter, the elongated straps are installed. Initially, the first elongated strap 236 is placed directly onto the patient 234. Thereafter, the second elongated strap 264 is placed on top of the first elongated strap 236. When this occurs, the first fastener 250 and the second fastener 262 make contact with one another and are fastened to one another. Next, the fourth elongated strap 322 is placed on top of the second elongated strap 264. Finally, the third elongated strap 320 is placed on top of the fourth elongated strap 322 such that the third fastener 334 and the fourth fastener 346 contact one another and are fastened together. Once this is complete, the double-release alarm belt 230 is secured in place as seen in FIG. 30.

As described above, once the third fastener 334 and the fourth fastener 346 are pulled apart by a first force 302, the alarm will sound to notify medical personnel that the patient 234 is trying to get out of the device 232 as described above. Next, the first fastener 250 and the second fastener 262 are pulled apart with a second force 304, such that the bond 300 between these fasteners 250, 262 is interrupted. The first force 302 required to disengage the third fastener 334 and the fourth fastener 346 is less than the second force 304 required to disengage the first fastener 250 and the second fastener 262. Preferably, the separation of the third and fourth fasteners 334, 346 occurs by pulling the second handle 288 in a first direction 282 and the separation of the first and second fasteners 250, 256 occurs by pulling the first handle 286 in a second direction 284 opposite the first direction 282. This results in increased time and difficulty for the patient 234 to remove the double-release alarm belt 30 than if the patient 34 simply had to repeatedly pull two separate belts in the same direction.

Furthermore, the bond (not shown) between the third fastener 334 and the fourth fastener 346 can be weaker than the bond (not shown) between the first fastener 250 and the second fastener 262. In this way, the patient 34 can more easily disengage the third fastener 334 and the fourth fastener 346, at which time the alarm will be sounded. Thereafter, due to the stronger bond between the first fastener 250 and the second fastener 262, it will be more difficult for the patient 234 to disengage these fasteners 250, 262. This makes it more difficult for the second bond to be broken, which increases the amount of time that medical staff has to approach the patient 234 after the initial audible reminder has been sounded. In this way, potential falls of the patient can be minimized.

FIGS. 35-38 show an inventive integrated belt and sensor system 110. The system 110 is configured for use with a device 402 on which a patient 404 is placed. For instance, as shown, the device 402 is a bed on which the patient 404 can lay. The system 110 is configured to allow for side-to-side movement of the patient 404 relative to the device 402 for added comfort, as will further be described below. The system 110 includes at least one strap, as shown, a first elongated strap 406 having a first end 408 and a second end 410. The system 110 also includes a cord 412 extending therefrom that is configured to detect movement of the first end 408 relative to the second end 410. The cord 412 is connected to an alarm system 414 that can be set off when the first end 408 is moved away from the second end 410. Thus, when a patient 404 is separating the first end 408 from the second end 410, which would need to occur before the patient 404 can exit the device 402, the alarm system 414 can be set off.

Additionally, as shown, the at least one strap also includes a second shortened strap 416. In the illustrated embodiment, the second shortened strap 416 is slidable relative to the first elongated strap 406. More specifically, the second shortened strap 416 is slidable relative to the second end 410 of the first elongated strap 406. In light of this slidable configuration, the second shortened strap 416 can be moved to alter the dimensions of the system 110. This allows a single system 110 to be used with a variety of different patients. For instance, if the patient 404 is smaller, the second shortened strap 416 can be slid away from the second end 410 such that the width of the system is smaller. To the contrary, where the patient 404 is larger, the second shortened strap 416 can be slid until it is directly next to the second end 410. Furthermore, the system 110 may be configured such that at least a portion of the second shortened strap 416 may be slid past the second end 410. In this way, the system 110 can quickly and easily be adjusted such that it is compatible with a wide variety of patients.

The first elongated strap 406 and the second shortened strap 416 may have various fasteners that allow for temporary, but removable connection between the straps. More specifically, the first elongated strap 406 may have a first fastener 418 located on an upper side 420 for the first end 408. The second shortened strap 416 may have a second fastener 422 mounted to an underside 424. Additionally, the second shortened strap 416 may also include a first handle 423. In such an embodiment, where the second shortened strap 416 is pulled away from the first end 408, for instance using the first handle 423, the connection between the first fastener 418 and the second fastener 422 can be broken. When this occurs, the alarm 414 can be sounded. As described above with regard to the other embodiments, the system 110 may also feature additional fasteners to enable the double-release alarm belt. For instance, additional fasteners (not shown), may be used to connect an underside of the first end 408 to the upper side of the second end 410. This would require a user to first disengage the second shortened strap 416 from the first elongated strap 406, after which the first end 408 and the second end 410 can be disengaged from one another. Because the alarm 414 is sounded based on the initial separation of the second shortened strap 416 from the first elongated strap 406, a caregiver will have time to check on the patient 404 while the second disengagement is occurring. The first elongated strap 406 may include a second handle 419 that can be used to more easily separate the first end 408 from the second end 410.

Additionally, the system 110 may have multiple securement straps configured to secure the system 110 to the device 402. Still looking to FIGS. 35-38, as shown, this embodiment includes a first securement strap 426 and a second securement strap 430. The first securement strap 426 is configured to extend from the first elongated strap 406 to a first side 428 of the device 402, and the second securement strap 430 is configured to extend from the first elongated strap 406 to a second side 432 of the device 402. The straps 426, 430 can be affixed to either side 428, 432 using any suitable means, including hook-and-loop fasteners, snaps, hooks, and any other fastener known in the art. Additionally, as shown, this embodiment includes a first track 434 mounted to an outer side 436 of the first elongated strap 406 at a first end 438, and a second track 440 mounted to the outer side 436 of the first elongated strap 406 at a second end 10442. The tracks 434, 440 are configured to be compatible with hoops that can travel along the length of the tracks 434, 440. A first hoop 444 can move along the first track 434, and a second hoop 446 can move along the second track 440. The first securement strap 426 is attached to the first hoop 444 and the second securement strap 430 is attached to the second hoop 446.

As a result of the slidable relationship of the hoops 444, 446 relative to the tracks 434, 440, a patient roll concept is achieved that allows a patient 404 to have greater movement while being safely secured and having two releasing points. This allows a patient 404 to easily and comfortably move side-to-side relative to the device 402. This helps to ensure comfort of the patient 404 while they are in the device 402 and can help to reduce bed sores that can occur where the patient 404 remains in the same position on the device 402 for extended periods of time. The system 110 may even allow a patient 404 to comfortably sit up without disengaging the straps.

Another embodiment is shown in FIGS. 39-42. Many of the components in this embodiment are similar to those shown in FIGS. 35-38. Those that are similar to the components found in FIGS. 35-38 will be designated by the same reference numbers as those provided above incremented by 100. In addition, the system 500 includes a first slider 548 and a second slider 550. The first securement strap 526 is attached to the first slider 548 and the second securement strap 530 is attached to the second slider 550. Instead of the tracks and hoops described above, these sliders 548, 550 slide relative to the first elongated strap 506 to enable side-to-side movement of the patient 404. The sliders 548, 550 can be made of any material, but preferably are made of a thin, comfortable material that a patient 504 can rest upon but would not get irritated by. Additionally, the material is preferably configured for optimal movement of the sliders 548, 550 relative to the first elongated strap 406 without causing the sliders 548, 550 to get caught or snagged on the first elongated strap 406.

Another embodiment is shown in FIGS. 43-46. Many of the components in this embodiment are similar to those shown in FIGS. 35-38. Those that are similar to the components found in FIGS. 35-38 will be designated by the same reference numbers as those provided above incremented by 200. In addition, the system 600 includes a loop 652 mounted to the back side 654 of the first elongated strap 606. The loop 652 may be made of a soft, flexible material such that it does not cause discomfort to the patient 604 if the patient 604 lies directedly on the loop 652. The loop 652 may be slidable relative to the first elongated strap 606 so that the patient 604 can move the first elongated strap 606 relative to the device 602. Alternatively, the loop 652 may be fixedly attached to the first elongated strap 606. Whether or not the loop 652 is fixed or slidable relative to the first elongated strap 602 may be dependent on the amount of side-to-side movement desired for a given patient. Additionally, the system 600 includes a single securement strap 656. The single securement strap 656 has a first end 658 and a second end 660. The single securement strap 656 is attached to the first side 628 of the device 602 and the second end 660 is attached to the second side 642 of the device. Again, this enables the patient 604 to move side-to-side relative to the device 602 to help improve comfort when the patient 604 is resting on the device 602.

Figure 47:
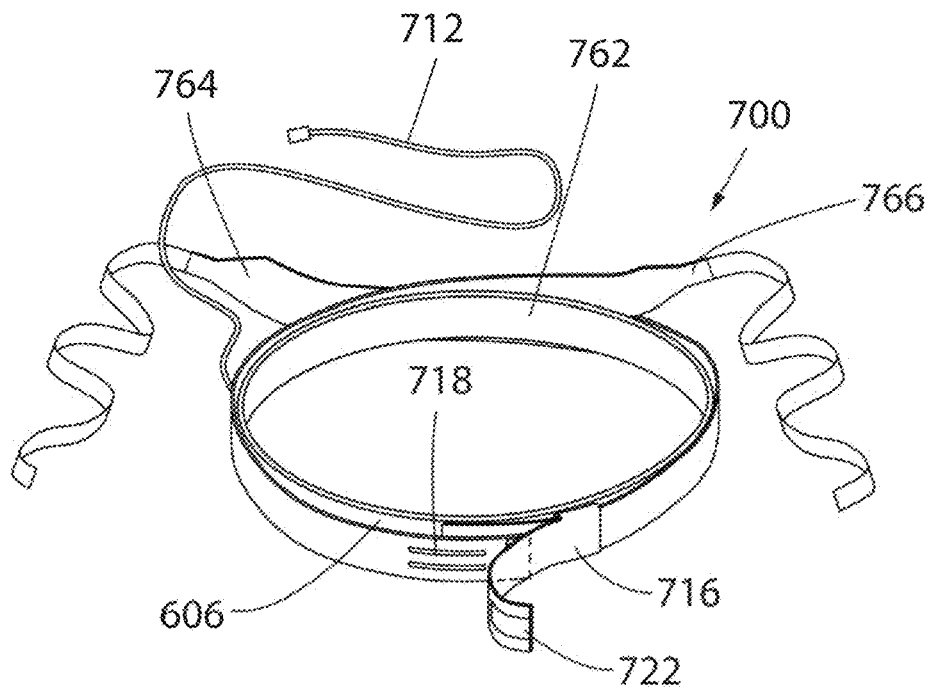
FIGS. 47 and 48 illustrate isometric views of an inventive integrated belt and sensor for alarm for patient furniture in a partially assembled configuration.
Figure 48:
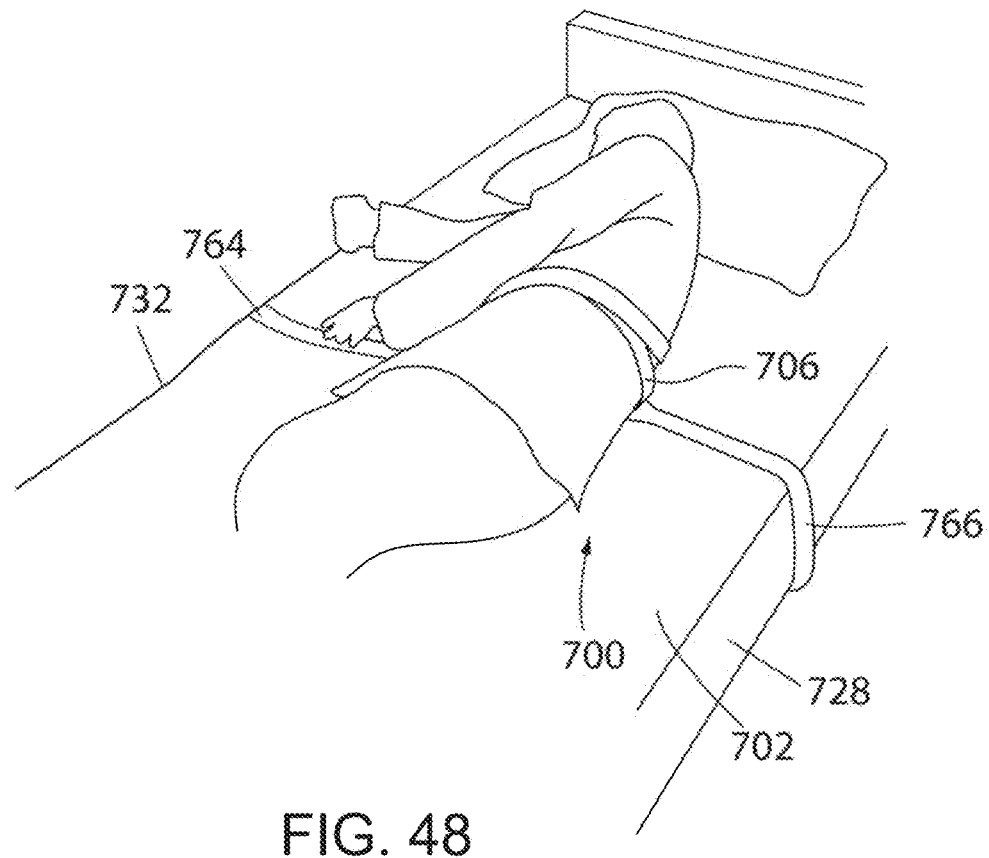

Yet another embodiment is shown in FIGS. 47-48. Many of the components in this embodiment are similar to those shown in FIGS. 35-38. Those that are similar to the components found in FIGS. 35-38 will be designated by the same reference numbers as those provided above incremented by 300. In addition to the components described above, the system 700 additionally includes a first securement strap 764 extending from the first end 738 and a second securement strap 766 extending from the second end 742. As shown, the first securement strap 764 and the second securement strap 766 are fixedly attached to the first elongated strap 706. However, the first securement strap 764 and the second securement strap 766 could also be affixed to sliders (not shown) similar to those shown in FIGS. 39-42, which would enable the sliders, and by extension the securement straps 764, 766, to be adjusted and movable relative to the first elongated strap 706. The first securement strap 764 and the second securement strap 766 are configured to crisscross behind the patient 704. As such, the first securement strap 764 is attached to the second side 732 of the device 702, whereas the second securement strap 766 is attached to the first side 728 of the device 702. As a result of the crisscross configuration of the straps 764, 766 and the length of the straps 764, 766, the patient 704 can move side-to-side relative to the device 702 for added comfort when the patient 704 is resting on the device 702. Additionally, the system 700 may include a cover (not shown) mounted to the back of the first elongated strap 706 to cover the crisscrossing first securement strap 426 and the second securement strap 430. Such a cover is beneficial in that it helps to ensure that the straps 426, 430 are properly crossing one another. This is important because the crossing of the straps 426, 430 helps to enable the side-to-side movement of the patient.

Figure 49:
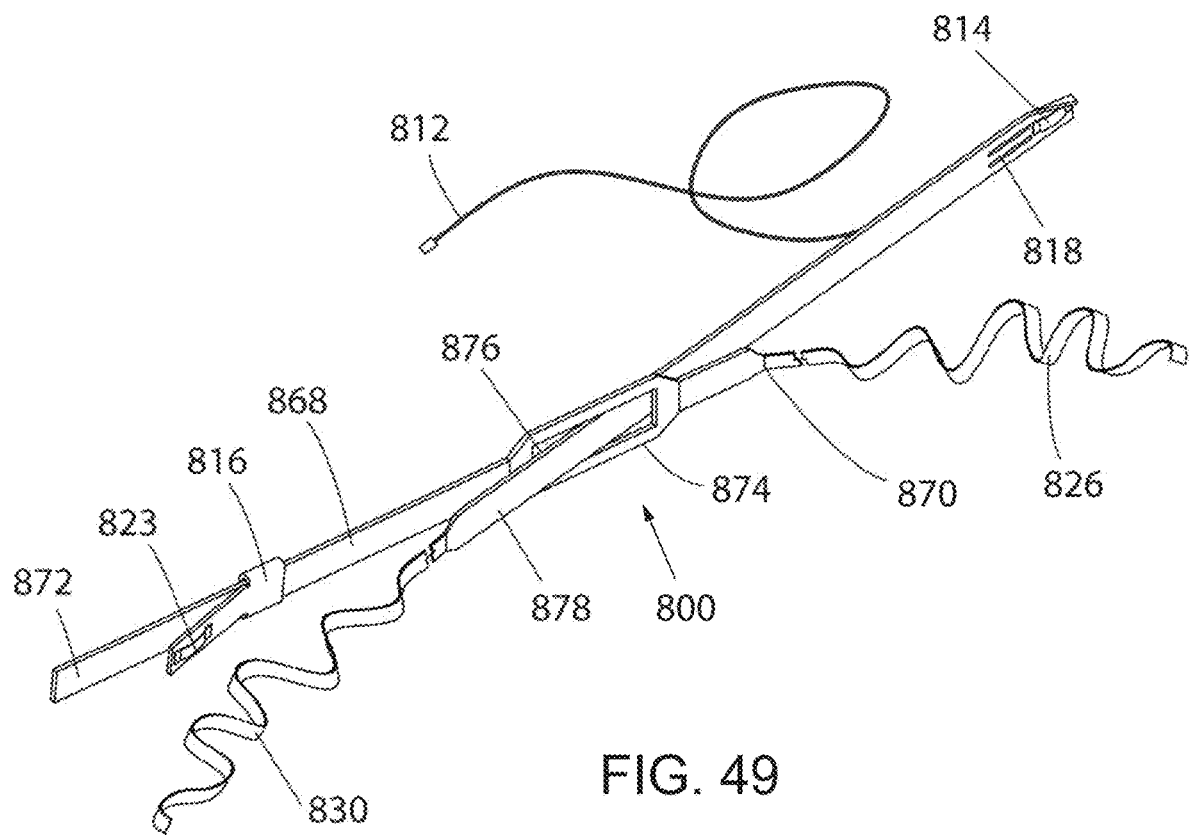
FIG. 49-51 illustrate isometric views of an inventive integrated belt and sensor for alarm for patient furniture.
Figure 50:
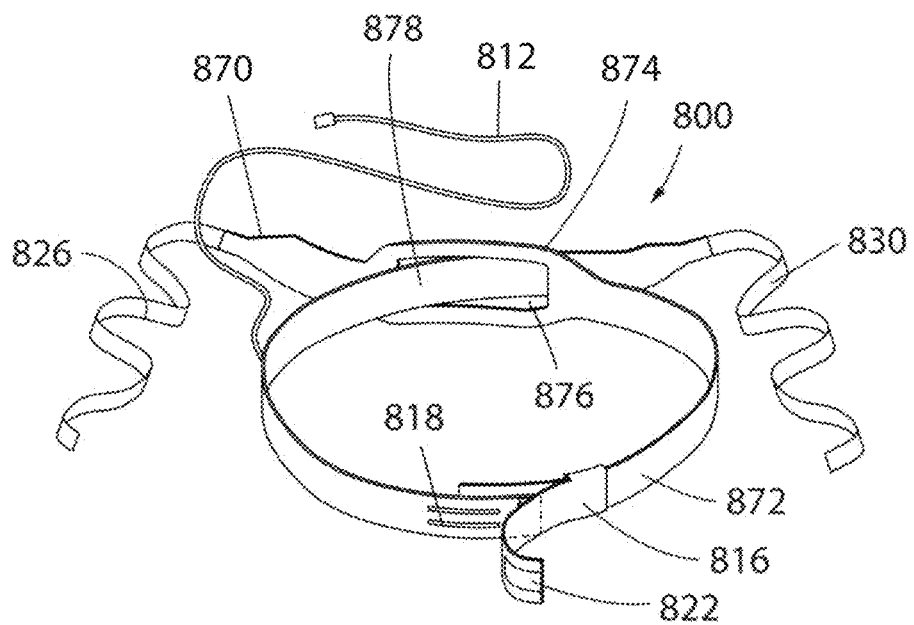
Figure 51:
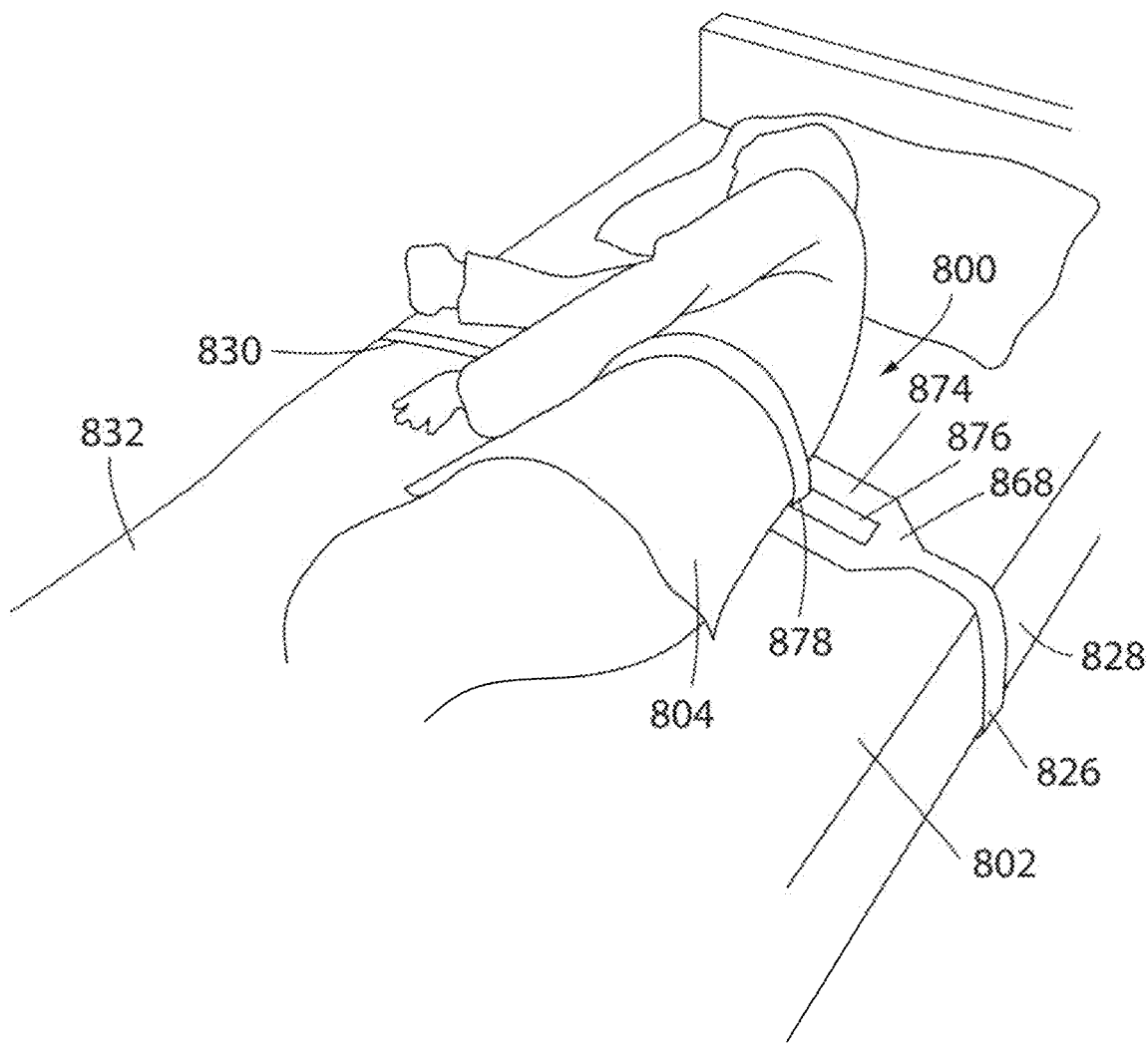

Turning next to FIGS. 49-51, another embodiment is shown. Many of the components in this embodiment are similar to those shown in FIGS. 35-38. Those that are similar to the components found in FIGS. 35-38 will be designated by the same reference numbers as those provided above incremented by 400. In this embodiment, the system 800 includes a first elongated strap 868 and a second elongated strap 878. The first elongated strap 868 has a first end 870, a second end 872, and a middle portion 874 located between the first end 870 and the second end 872. An opening 876 is formed in the middle portion 874 through which the second elongated strap 878 can be threaded. As shown, the first securement strap 826 extends from the first elongated strap 868 and the second securement strap 830 extends form the second elongated strap 878. As a result of the opening 876 and the orientation of the second elongated strap 878 relating thereto, side-to-side movement of the patient is enabled.

All of the systems described above can be used in similar ways to enable health care professionals to monitor a patient's location relative to the device, and more importantly, to sound an audible reminder when a patient begins to disengage the system before he or she can get up from the device. Steps associated with a method of using the system will now be described. Of course, the specific order in which the following steps occur may be varied. Initially, at least one securement strap is secured to the device. For instance, first and second securement straps can be used to secure the belt to either side of the device; for instance, a bed or a frame associated therewith. Thereafter, a patient may be placed on the belt. Once this occurs, the first and second fasteners associated with the first elongated strap can be engaged with one another at a location that is dependent on the size of the patient. Thereafter, the slider may be slid relative to the elongated strap to an appropriate location. Once this occurs, the bottom and top fasteners are engaged with one another. After this, an audible reminder system may be connected to the alarm system using a cord. From here, at least one securement strap that extends from the patient strap can be secured to a side of the device. The relationship of the patient strap and the securement strap allows the patient to move side-to-side relative to the device for added comfort.

The method may also include use of additional components to enable this side-to-side movement. For instance, the system may include a track or tracks and hooks that can slide along the track. As such, the system may include a first track on a first side of the patient strap and a second track on a second side of the patient strap. In such an embodiment, hooks travel along the length of the track, and securement straps extend from the hooks to enable side-to-side movement. Alternatively, the system may include at least one adjustable slider that has a securement strap extending therefrom to also enable side-to-side movement. Further still, the system may include a loop with a securement strap that extends therethrough.

In any of these embodiments, the system may also include multiple releases. For instance, the system may include a first release mechanism and a second release mechanism. When the first release mechanism is released, an audible reminder can be sounded. At this time, the patient is still seated or lying on the device. It is not until the second release mechanism is released that the patient can get up and exit the device.

All the disclosed embodiments are useful in conjunction with patient monitoring. There are virtually innumerable uses for the present invention, all of which need not be detailed here. All the disclosed embodiments can be practiced without undue experimentation.

Although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept.

For example, additional elongated straps, shortened straps, and sliders could be used in conjunction with the straps described above. Similarly, additional fasteners could also be used to increase the amount of time between when the patient begins to remove the belt and when the patient is able to get up from the device. Also, the fasteners need not be in the exact locations described but could be located anywhere about the various straps. In addition, the individual components need not be fabricated from the disclosed materials but could be fabricated from virtually any suitable materials.

Moreover, the individual components need not be formed in the disclosed shapes, or assembled in the disclosed configuration, but could be provided in virtually any shape and assembled in virtually any configuration. Furthermore, all the disclosed features of each disclosed embodiment can be combined with, or substituted for, the disclosed features of every other disclosed embodiment except where such features are mutually exclusive.

It is intended that the appended claims cover all such additions, modifications, and rearrangements. Expedient embodiments of the present invention are differentiated by the appended claims.

What is claimed is:

1. An integrated belt and sensor for alarm system for use with a device holding a patient comprising;
    at least one strap having a first end and a second end, the second end releasably secured to the first end around the patient;
    a cord configured to detect movement of the first end relative to the second end;
    an alarm system connected to the cord, wherein the alarm system is activated before the first end and the second end are separated; and,
    wherein the at least one strap further comprises:
        a first elongated strap having a first end, a second end, and a middle portion;
        a slider wrapped around the first elongated strap and slidable along the middle portion;
        wherein the slider is releasably disengageable from the first elongated strap by pulling the slider in a first direction; and
        wherein the alarm system is triggered when the slider is disengaged from the first elongated strap.

2. The integrated belt and sensor for alarm system of claim 1, further comprising:
    a first fastener on an underside of the slider;
    a second fastener on an upper side of a first end of the first elongated strap;
    a third fastener on an underside of the first end of the first elongated strap;
    a fourth fastener on an upper side of a second end of the first elongated strap;
    the first fastener is releasably attachable to the second fastener;
    the third fastener is releasably attachable to the fourth fastener; and,
    the alarm system is triggered when the third fastener is released from the fourth fastener.

3. The integrated belt and sensor for alarm system of claim 1, wherein the first end and the second end of the first elongated strap are releasable from one another after the slider is disengaged from the first elongated strap and once the alarm system has been triggered.

4. The integrated belt and sensor for alarm system of claim 3, wherein the slider is slidably adjustable relative to the first elongated strap.

5. The integrated belt and sensor for alarm system of claim 3, further comprising:
    a first fastener on an upper side of the first elongated strap at the first end; and
    a second fastener on an underside of the slider;
    wherein the second fastener is configured to releasably fasten to the first fastener; and
    wherein the alarm system is triggered when the first fastener is separated from the second fastener.

6. The integrated belt and sensor for alarm system of claim 5, further comprising:
    a third fastener on the upper side of the first elongated strap at the second end and the middle portion; and
    a fourth fastener on an underside of first elongated strap at the first end;
    wherein the third fastener is configured to releasably fasten to the fourth fastener; and
    wherein the third fastener is released from the fourth fastener after the first fastener is released from the second fastener.

7. The integrated belt and sensor for alarm system of claim 6, further comprising:
    a first release handle associated with the slider adjacent to the first fastener and the second fastener; and
    a second release handle associated with the first elongated strap adjacent to the third fastener and the fourth fastener.

8. The integrated belt and sensor for alarm system of claim 7, wherein the first release handle is mounted parallel to a length of the first elongated strap; and
    wherein the second release handle is mounted perpendicular to the length of the first elongated strap.

9. The integrated belt and sensor for alarm system of claim 8, wherein the first release handle is pulled in a first direction; and
    wherein the second release handle is pulled in a second direction.

10. The integrated belt and sensor for alarm system of claim 9, wherein the slider is movable between:
    a first position in which the slider covers up the second release handle; and
    a second position in which the slider does not cover up the second release handle.

11. The integrated belt and sensor for alarm system of claim 1, further comprising:
    a first securement strap extending from the first elongated strap that is configured to be secured to a first side of the device; and
    a second securement strap extending from the first elongated strap that is configured to be secured to a second side of the device.

12. The integrated belt and sensor for alarm system of claim 11, further comprising:
    at least one fastener associated with the first elongated strap that releasably secures to the first securement strap; and
    at least one fastener associated with the first elongated strap that releasably secures to the second securement strap.

13. The integrated belt and sensor for alarm system of claim 12, wherein the first securement strap extends downwardly and around the first side of the device and secures to itself beneath or on an inside of the device; and
    wherein the second securement strap extends downwardly and around the second side of the device and secures to itself beneath or on the inside of the device.

14. The integrated belt and sensor for alarm system of claim 1, further comprising:
    a first material on an outer side of the first elongated strap; and
    a second material on an inner side of the first elongated strap;
    wherein the first material is more slippery than the second material.

15. An integrated belt and sensor for alarm system for use with a device holding a patient comprising:
    a first elongated strap;
    a slider slidably located on the first elongated strap;
    a cord configured to detect movement of the slider relative to the first elongated strap; and
    an alarm system connected to the cord;
    wherein the alarm system is activated when a portion of the slider is disengaged from the first elongated strap.

16. The integrated belt and sensor for alarm system of claim 15, further comprising:
- a first fastener on an underside of the slider;
- a second fastener on an upper side of a first end of the first elongated strap;
- a third fastener on an underside of the first end of the first elongated strap;
- a fourth fastener on an upper side of a second end of the first elongated strap;
- wherein the first fastener is releasably attachable to the second fastener;
- wherein the third fastener is releasably attachable to the fourth fastener;
- wherein the alarm system is triggered when the first fastener is released from the second fastener.

17. The integrated belt and sensor for alarm system of claim 15, further comprising:
- at least one securement strap extending from the first elongated strap that secures the first elongated strap to the device and enables side-to-side movement of the patient relative to the device.

18. The integrated belt and sensor for alarm system of claim 16, wherein the alarm system is triggered when the third fastener is released from the fourth fastener.

19. The integrated belt and sensor for alarm system of claim 18, wherein the third fastener is released from the fourth fastener before the first fastener is released from the second fastener.

20. The integrated belt and sensor for alarm system of claim 2, wherein the alarm system is triggered when the third fastener is released from the fourth fastener.

21. The integrated belt and sensor for alarm system of claim 20, wherein the third fastener is released from the fourth fastener before the first fastener is released from the second fastener.

22. The integrated belt and sensor for alarm system of claim 1, wherein the alarm system is an audible reminder.

23. A method of using an integrated belt and sensor for alarm system for use with a device holding a patient comprising the steps of:
- wrapping at least one strap temporarily around the patient;
- engaging a first end of the at least one strap with a second end of the at least one strap; sliding a slider relative to the at (east one strap;
- releasably engaging the slider with a portion of the at least one strap;
- connecting an alarm system to the at least one strap; and
- activating the alarm system when the slider is disengaged from the portion of the at least one strap.

24. The method of claim 23, further comprising the steps of:
- securing at least one securement strap that extends from the at least one strap to a side of the device; and
- enabling side-to-side movement of the patient relative to the device.

25. The method of claim 23, further comprising the steps of:
- disengaging the slider from the portion of the at least one strap;
- enabling the alarm system to create an audible reminder; and then further disengaging the first end of the at least one strap from the second end to enable the patient to exit the device.

* * * * *